United States Patent
Terada

(10) Patent No.: US 11,835,361 B2
(45) Date of Patent: Dec. 5, 2023

(54) VEHICLE-SIDE DEVICE, METHOD AND NON-TRANSITORY COMPUTER-READABLE STORAGE MEDIUM FOR AUTONOMOUSLY DRIVING VEHICLE

(71) Applicant: DENSO CORPORATION, Kariya (JP)

(72) Inventor: Ryota Terada, Kariya (JP)

(73) Assignee: DENSO CORPORATION, Kariya (JP)

( * ) Notice: Subject to any disclaimer, the term of this patent is extended or adjusted under 35 U.S.C. 154(b) by 361 days.

(21) Appl. No.: 17/185,694

(22) Filed: Feb. 25, 2021

(65) Prior Publication Data

US 2021/0180987 A1    Jun. 17, 2021

Related U.S. Application Data

(63) Continuation of application No. PCT/JP2019/033210, filed on Aug. 26, 2019.

(30) Foreign Application Priority Data

Aug. 31, 2018  (JP) ................................. 2018-162471
Aug. 2, 2019   (JP) ................................. 2019-143135

(51) Int. Cl.
   *G01C 21/00* (2006.01)
   *H04W 4/44* (2018.01)
   (Continued)

(52) U.S. Cl.
   CPC ....... *G01C 21/3889* (2020.08); *G05D 1/0088* (2013.01); *G05D 1/0274* (2013.01);
   (Continued)

(58) Field of Classification Search
   CPC ............. G01C 21/3889; G05D 1/0088; G05D 1/0274; G05D 1/0276; G05D 2201/0213; G08G 1/20; H04W 4/44
   See application file for complete search history.

(56) References Cited

U.S. PATENT DOCUMENTS 9,188,985 B1 * 11/2015 Hobbs ................ G01C 21/3676
2009/0326810 A1 * 12/2009 Callaghan ............. H04W 4/029
                                                701/532
(Continued)

FOREIGN PATENT DOCUMENTS

CA    2665221 A1 * 11/2009 ............. G01C 21/32
CA    3026666 A1 * 12/2018 .......... B60W 30/182
(Continued)

OTHER PUBLICATIONS

KR 102260975 B1 with English translation. Filed May 2017. Published Jun. 2021. (Year: 2021).*
(Continued)

*Primary Examiner* — Calvin Cheung
(74) *Attorney, Agent, or Firm* — MASCHOFF BRENNAN

(57) ABSTRACT

A system for autonomously driving a vehicle along a road segment using map data including coordinate information of a landmark disposed along a road, includes at least one processor. The map data is distributable from a predetermined server to the vehicle in patch units, which are data sets for different areas. The processor is configured to: acquire a position of the vehicle based on a detection result of a positioning sensor mounted on the vehicle; and set a patch as a download target including a road which has a possibility that the vehicle passes through and is determined based on a current position of the vehicle.

17 Claims, 20 Drawing Sheets

(51) Int. Cl.
G08G 1/00 (2006.01)
G05D 1/02 (2020.01)
G05D 1/00 (2006.01)

(52) U.S. Cl.
CPC ............. G05D 1/0276 (2013.01); G08G 1/20 (2013.01); H04W 4/44 (2018.02); *G05D 2201/0213* (2013.01)

(56) References Cited

U.S. PATENT DOCUMENTS

| | | | |
|---|---|---|---|
| 2010/0125411 A1* | 5/2010 | Goel | G01C 21/3492 701/533 |
| 2013/0297202 A1 | 11/2013 | Tamiya et al. | |
| 2015/0168147 A1* | 6/2015 | Duleba | G01C 21/3484 701/538 |
| 2016/0252358 A1* | 9/2016 | Blumenberg | G01C 21/367 701/420 |
| 2017/0008521 A1 | 1/2017 | Braunstein et al. | |
| 2017/0122749 A1 | 5/2017 | Urano et al. | |
| 2017/0314935 A1* | 11/2017 | Vakharia | G01C 21/3881 |
| 2018/0189323 A1* | 7/2018 | Wheeler | G06F 16/29 |
| 2018/0225835 A1* | 8/2018 | Harada | G06T 7/11 |
| 2018/0340792 A1* | 11/2018 | Kolluru | G01C 21/34 |
| 2019/0086226 A1 | 3/2019 | Hamada et al. | |
| 2019/0095514 A1* | 3/2019 | Anastassov | G06F 16/287 |
| 2019/0156566 A1* | 5/2019 | Chen | G06T 19/20 |

FOREIGN PATENT DOCUMENTS

| | | | | |
|---|---|---|---|---|
| EP | 2658211 A1 * | 10/2013 | ............ | G01C 21/34 |
| JP | 2017-111158 A | 6/2017 | | |
| JP | 2018-4791 A | 1/2018 | | |
| WO | WO-2017079460 A2 * | 5/2017 | ............ | B60Q 1/26 |
| WO | 2020/045317 A1 | 5/2020 | | |
| WO | 2020/045318 A1 | 5/2020 | | |
| WO | 2020/045319 A1 | 5/2020 | | |
| WO | 2020/045322 A1 | 5/2020 | | |
| WO | 2020/045323 A1 | 5/2020 | | |

OTHER PUBLICATIONS

U.S. Appl. No. 17/185,665 and its entire file history, filed Feb. 25, 2021, Fujii et al.
U.S. Appl. No. 17/185,673 and its entire file history, filed Feb. 25, 2021, Matsumoto et al.
U.S. Appl. No. 17/185,678 and its entire file history, filed Feb. 25, 2021, Terazawa et al.
U.S. Appl. No. 17/185,682 and its entire file history, filed Feb. 25, 2021, Kitahara.
U.S. Appl. No. 17/185,686 and its entire file history, filed Feb. 25, 2021, Kitahara et al.

* cited by examiner

VEHICLE-SIDE DEVICE, METHOD AND NON-TRANSITORY COMPUTER-READABLE STORAGE MEDIUM FOR AUTONOMOUSLY DRIVING VEHICLE

CROSS REFERENCE TO RELATED APPLICATION

The present application is a continuation application of International Patent Application No. PCT/JP2019/033210 filed on Aug. 26, 2019, which designated the U.S. and claims the benefit of priority from Japanese Patent Applications No. 2018-162471 filed on Aug. 31, 2018 and No. 2019-143135 filed on Aug. 2, 2019. The entire disclosures of all of the above applications are incorporated herein by reference.

TECHNICAL FIELD

The present disclosure relates to a vehicle-side device, a method and a non-transitory computer-readable storage media for autonomously driving a vehicle using map data.

BACKGROUND

A conceivable technique provides for storing position information such as landmarks using an image captured by a camera mounted on the vehicle, uploading the information to a server or the like to generate a rough map, and determining the position of the own vehicle by downloading the generated rough map.

SUMMARY

According to an example, a system for autonomously driving a vehicle along a road segment using map data including coordinate information of a landmark disposed along a road, includes at least one processor. The map data is distributable from a predetermined server to the vehicle in patch units, which are data sets for different areas. The processor is configured to: acquire a position of the vehicle based on a detection result of a positioning sensor mounted on the vehicle; and set a patch as a download target including a road which has a possibility that the vehicle passes through and is determined based on a current position of the vehicle.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
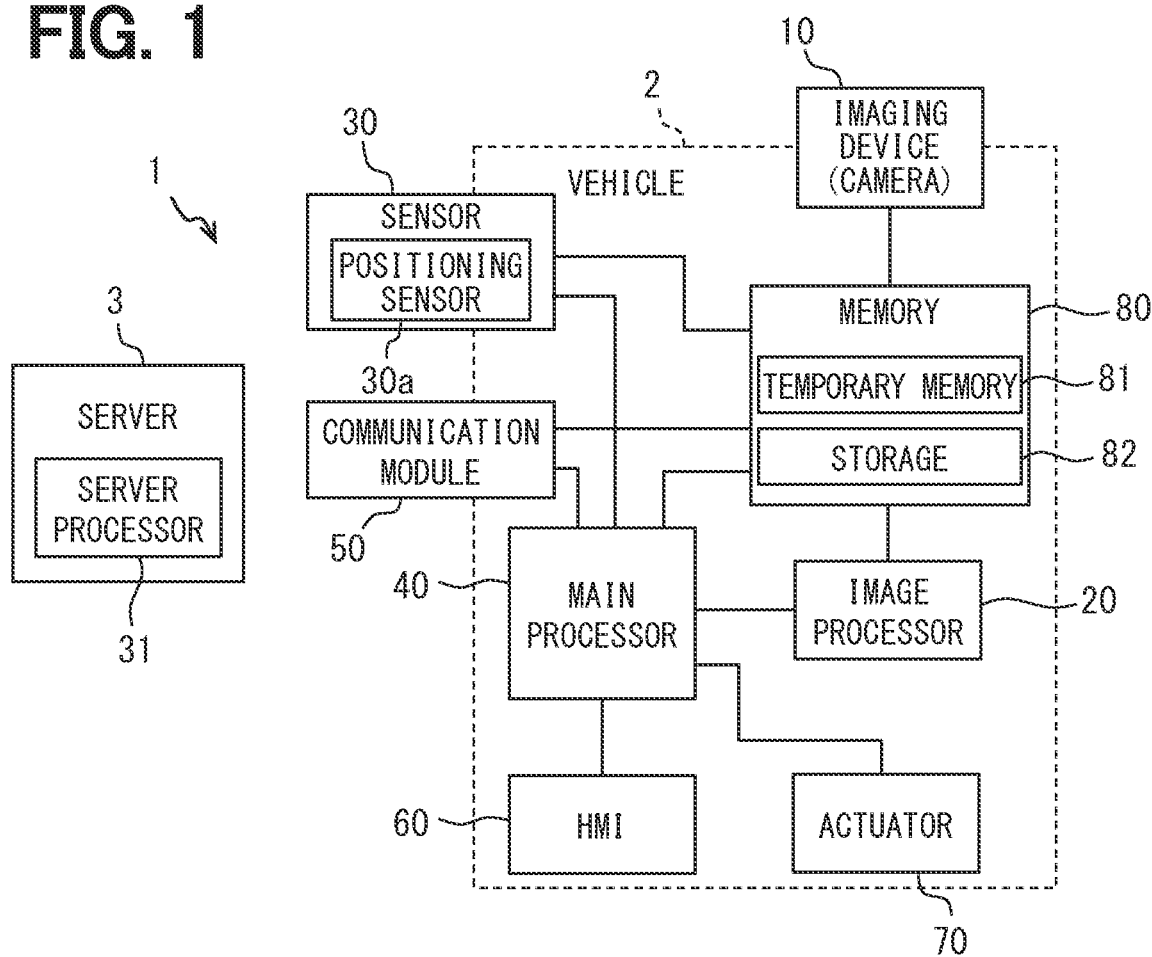
FIG. 1 is a block diagram showing a schematic configuration of a map system.

In a system such as a map system according to a conceivable technique, which specifies the position of the own vehicle based on the landmark information captured by the camera and the downloaded map information, the download of the map information corresponding to the area where the vehicle is travelling must be completed. The download of the map information from the server needs to be executed within the limited communication band between the server and the vehicle, and efficient communication is required.

Therefore, a map system, a method, and a non-transitory computer-readable storage medium are provided for causing a computer to execute them, which can efficiently acquire map information.

One of the vehicle-side devices disclosed in this specification is a vehicle-side device using at least one processor, which autonomously drives a vehicle along a road segment using map data including at least one of the coordinate information of a landmark disposed along the road and the coordinate information of a road edge. The map data is configured to be distributed to the vehicle from a predetermined server in patch units that are obtained by dividing the map registered area. The processor acquires the position of the vehicle based on the detection result of the positioning sensor mounted on the vehicle, downloads the map data in patch units from the server that manages the map data, and sets a patch, including the road which has a possibility that a vehicle may pass through, as a download target which is determined based on the current position of the vehicle.

According to this, in the situation where the destination is set, the map tile to be downloaded is appropriately selected for the main route from the current position to the destination and the branch route having a possibility that the vehicle may travel with separating from the main route.

Hereinafter, embodiments for implementing the present disclosure will be described referring to drawings. In each embodiment, portions corresponding to the elements described in the preceding embodiments are denoted by the same reference numerals, and redundant explanation may be omitted. When only a part of a configuration is described in an embodiment, another preceding embodiment may be applied to the other parts of the configuration. It may be possible not only to combine parts, the combination of which is explicitly described in an embodiment, but also to combine parts of respective embodiments, the combination of which is not explicitly described, if any obstacle does not especially occur in combining the parts of the respective embodiments.

(General Configuration)

First, with reference to FIG. 1, the schematic configuration of the map system 1 to which the present disclosure is applied will be described.

As shown in FIG. 1, the map system 1 includes at least one vehicle equipped with an in-vehicle system 2 described later, and a server 3 in which map information (hereinafter, also referred to as map data) is stored. Although FIG. 1 shows only one block representing a vehicle on which the in-vehicle system 2 is mounted, the map system 1 may include a plurality of system-mounted vehicles. Each vehicle is configured to be capable of wireless communication with the server 3. The vehicle can travel on the road and travels while sequentially collecting probe data as described later. Further, the vehicle is equipped with an automatic driving system or a driving support system, and performs driving control using map data acquired from the server 3.

The vehicle to which the in-vehicle system 2 is applied may be a passenger car, a transportation vehicle such as a truck, or a service vehicle such as a taxi. Service vehicles also include shared buses (in other words, fixed-route buses), long-distance buses, and vehicles used for sharing services such as car sharing and ride sharing. The shared bus may be an autonomous driving bus that automatically travels on a predetermined route.

The map system 1 corresponds to a system for autonomously driving a vehicle along a road segment by using map data including coordinate information of a plurality of features existing along the road according to one aspect. The expression "along the road" includes not only the side of the road but also the upper part of the road and the surface of the road. For example, a direction signboard or a beacon station located 3 meters or more above the road surface also corresponds to a feature arranged along the road. In addition, road markings such as lane markings made of paint or road studs also correspond to features existing along the road. The term "along the road" can be rephrased as on the road and around the road. The above features also include the roadside itself. The level of automatic driving using map data is not limited to level 3 or higher, and may correspond to level 2. In the automation level 2 here, a system including an ECU executes a subtask of vehicle motion control in both the vertical direction and the horizontal direction in a limited area, for example, steering correction for maintaining a lane and speed adjustment are automatically performed. Automation level 3 here is that the system performs all driving operations within a specific location (ODD: Operational Design Domain), while switching authority to the occupant in the driver's seat occupants when it is difficult to continue operation. Automation level 4 is a level at which the duty of monitoring by the driver's seat occupant specified in level 3 is removed. Automation level 5 refers to a level at which fully autonomous driving is possible on all roads.

The in-vehicle system 2 mounted on each vehicle includes a camera 10 as an imaging device, an image processor 20, a sensor 30 as a state acquisition unit for acquiring the state of the vehicle, a main processor 40, a communication module 50, and a human machine interface 60 (hereinafter, HMI), an actuator 70, and a memory 80. The in-vehicle system 2 corresponds to a vehicle-side device or a vehicle control device. Hereinafter, regarding the main processor 40, the vehicle on which the main processor 40 is mounted is also referred to as a subject vehicle.

The map system 1 functions additionally to the function of specifying the position of the subject vehicle such as GPS, and is effective in specifying the position of the subject vehicle with higher accuracy. The map system 1 has roughly two functions, i.e., a map utilization function and a map update function. In map utilization function, the map information stored in the server 3 is downloaded to the vehicle, and the vehicle itself specifies the position of the subject vehicle based on the downloaded map information and the position of a landmark such as a traffic sign included in the image captured by the camera 10. On the other hand, in the map update procedure, the information obtained by the camera 10 and the sensor 30 mounted on the vehicle is uploaded to the server 3 as probe data, and the map information in the server 3 is sequentially updated. As a result, the position of the vehicle is always specified with high accuracy based on the latest map information, and for example, driving assistance and automatic steering operation are realized. After that, the process for determining the detailed position of the subject vehicle on the road on which the subject vehicle is traveling based on the map data acquired from the server 3 and the coordinates of the landmark 63 calculated from the image generated by the camera 10 is defined as a localization process.

The camera 10 is mounted on the vehicle and shoots an image of the environment around the vehicle at a wavelength in the visible light region. The camera 10 captures, for example, the environment in front of the vehicle. Of course, as another aspect, the camera 10 may not be limited to capture the front of the vehicle, and may be configured to capture at least one of the rear and the side of the vehicle. Further, the vehicle may be provided with a plurality of cameras 10. For example, the vehicle may include four cameras 10, i.e., a front camera that captures a predetermined front range, a rear camera that captures a predetermined rear range, a right camera that captures the right side, and a left camera that captures the left side. In addition, the front camera may include a distant camera for capturing a relatively long distance image and a short-range camera for capturing a short distance image. The camera 10 may be a wide-angle camera having an angle of view exceeding 100 degrees. In addition, the wavelength of light captured by the camera 10 may not be limited to visible light, and may include ultraviolet and infrared light. For example, the camera 10 may be an infrared camera. In addition, the vehicle may be equipped with a visible light camera that capture visible light and an infrared camera. The camera 10 is configured as a camera module including, for example, a CMOS image sensor which is an image sensor (not shown) and an image processing engine (not shown). The information on the environment around the vehicle captured by the camera 10 is stored in the memory 80 in the form of a still image or a moving image (hereinafter, these are collectively referred to as an image). The image processor 20, which will be described later, executes various processes based on the data stored in the memory 80. In a configuration in which the vehicle includes a plurality of cameras 10, an image processor 20 may be provided for each camera 10, or one image processor 20 may be configured to process image data taken by the plurality of cameras 10. The configuration and arrangement of functions related to the camera 10 may be changed as appropriate.

The image processor 20 analyzes the image captured by the camera 10. The image processor 20 detects a predetermined feature, for example, by analyzing an image. The feature as a detection target is, for example, a structure required for vehicle control. Further, the feature to be detected corresponds to an element to be recorded in the map data (hereinafter, also referred to as a map element) from another viewpoint. Features detected by the image processor 20 include, for example, road markings (or traffic markings) and landmarks.

Road markings mainly refer to a paint drawn on the road surface for traffic control and traffic regulation. Road markings include regulatory markings and instruction markings. For example, road markings include lane boundaries (so-called line markings, or lane marks) that indicates a boundary of lanes, pedestrian crossings, stop lines, diversion zones, safety zones, regulatory arrows, and the like Road markings also include those realized by road studs such as chatter bars and bot dots.

The landmark 63 includes, for example, a traffic regulation sign, a signboard corresponding to a traffic sign such as a guide sign, a warning sign, an instruction sign, a traffic light, a pole, a guide board, and the like. The guide signboard refers to a direction signboard, a signboard indicating an area name, a signboard indicating a road name, a notice signboard indicating an entrance/exit of an expressway, a service area, etc. The landmark 63 may include street lights, mirrors, utility poles, commercial advertisements, stores, iconic buildings such as historic buildings, and the like. The pole also includes street lights and utility poles. In addition, a part of the road marking (for example, a lane mark or a stop line) can be treated as a landmark. The landmarks also include road pavement, undulations, joints, etc. When extracting a landmark, the image processor 20 separates and extracts the background and the landmark 63 from the captured image based on the image information including the color, the brightness, the contrast related to the color and the brightness, and the like. Further, the landmark 63 may be extracted based on the size, shape, and installation position.

Further, the image processor 20 uses the SfM (Structure from Motion) technology to obtain the state quantity showing the behavior (hereinafter, behavior information) of the vehicle such as the yaw rate acting on the own vehicle, the front-rear direction acceleration, the lateral acceleration, the wiper operating state, and the like from the captured image of the camera 10. The camera 10 corresponds to an example of a peripheral monitoring sensor.

The in-vehicle system 2 of the present embodiment includes a camera 10 as a peripheral monitoring sensor, but the peripheral monitoring sensor constituting the map system 1 may not be limited to the camera 10. The peripheral monitoring sensor may be a millimeter wave radar or LiDAR (Light Detection and Ranging/Laser Imaging Detection and Ranging). The LiDAR may be a scanning type LiDAR or a flash type LiDAR. The LiDAR may be preferably SPAD LiDAR (Single Photon Avalanche Diode Light Detection And Ranging) from the viewpoint of resolution and the like. In addition, various object detection devices such as sonar may be used as peripheral monitoring sensors.

The three dimensional ranging point group data generated by the LiDAR, the detection result of the millimeter wave radar, the detection result of the sonar, and the like correspond to the peripheral object data. The three-dimensional ranging point group data is also defined as a distance image. When the three-dimensional ranging point group data is used as peripheral object data, the detection object may be recognized by using the distance information and the reception intensity information of each ranging point and each direction. Various methods may be used as object recognition methods using LiDAR, millimeter-wave radar, sonar, and the like. In addition, the map system 1 may include a plurality of types of devices as peripheral monitoring sensors. For example, the map system 1 may include, as a peripheral monitoring sensor, a LiDAR configured to cover the front of the vehicle in the detection range in addition to the front camera, which is the camera 10. A technique (so-called sensor fusion technique) in which the detection results of a plurality of types of sensors are used together may be used for recognizing an object corresponding to a landmark. When the front camera and the millimeter wave radar are used in combination, the accuracy of detecting the distance to the landmark can be improved. In addition, even in an environment where the landmark recognition accuracy by the front camera deteriorates, such as at night, the landmark recognition rate can be ensured by using the detection results of the millimeter wave radar in a complementary manner. A camera 10 that captures the front scenery of the vehicle, a millimeter-wave radar, a LiDAR, and the like correspond to a front monitoring device.

The sensor 30 which is a state acquisition unit includes, for example, a speed sensor, an acceleration sensor, a yaw rate sensor (in a broad sense, a gyro sensor), a steering angle sensor, an illuminance sensor, and a positioning sensor (for example, a GPS receiver) 30a. Each of the above sensors acquires, for example, the following vehicle states. The acquired information indicating the state of the vehicle is stored in the memory 80.

The speed sensor acquires the speed of the vehicle. The acceleration sensor acquires the acceleration in the traveling direction of the vehicle and the acceleration in the direction orthogonal to the traveling direction. The yaw rate sensor acquires the yaw rate acting on the vehicle. The steering angle sensor acquires the steering angle of the steering. The illuminance sensor acquires the brightness around the vehicle. The GPS receiver as the positioning sensor 30a sequentially acquires and outputs coordinate information (latitude, longitude, altitude) indicating the current position of the vehicle. The GPS receiver is configured to output data such as the GPS Doppler speed, the number and elevation angles of the acquired positioning satellites, the pseudo distance, the SN ratio of the received satellite signal, and existence or non-existence of the usage of the correction information. Information such as the elevation angle, the SN ratio, and the usage status of the correction information correspond to an index showing the accuracy of the positioning result. Although the aspect of using GPS as a GNSS (Global Navigation Satellite System) is disclosed here as an example, the GNSS used by the vehicle may be GLONASS, BeiDou, Galileo, IRNSS, or the like.

Further, for example, the pavement state and undulations of the road on which the vehicle is traveling, joints between the bridge and other roads, and the like can be detected by a sensor or the like that detects the vibration of the vehicle. These road pavement states, undulations, joints, and the like can also be adopted as landmarks 63 for specifying the position on the map.

The main processor 40 is communicably connected to the image processor 20 and the sensor 30 described above, and calculates and processes various information input from the image processor 20 and the sensor 30. The main processor 40 generates, for example, a travelling trajectory on which the vehicle is predicted to travel based on the speed, acceleration, and yaw rate of the vehicle. That is, the main processor 40 generates a travel plan (so-called pass plan) for autonomous driving. The pass plan includes not only setting of the traveling trajectory, but also determining of the steering control amount at each time point, the target vehicle speed, and the timing of transferring the driving authority to the occupants. As the yaw rate, the acceleration in the front-rear direction, and the acceleration in the lateral direction, values detected by the image processor 20 from the image captured by the camera 10 using the SfM technique may be used. For example, the main processor 40 may be configured to use the output value of the yaw rate sensor as the sensor 30 when the image processor 20 cannot detect the yaw rate. Generally, the yaw rate determined from the image captured by the camera may be more accurate than the yaw rate detected by the yaw rate sensor. Therefore, the main processor 40 can improve the accuracy of dead reckoning, for example, by using the value detected by the image processor 20 as the yaw rate. Here, the yaw rate based on the image analysis and the yaw rate derived from the sensor 30 may be used in a complementary combination manner. Further, the main processor 40 generates a traveling history indicating the actually traveled track based on the history of the own vehicle position specified by dead reckoning or localization described later.

Further, the main processor 40 generates a trajectory (specifically, shape data such as curvature and width) on the travelling road based on the lane mark detected based on the image acquired by the camera 10. Further, the main processor 40 calculates the position coordinates (hereinafter, also referred to as observation coordinates) in the global coordinate system of features such as landmarks 63 and lane marks extracted by the image processor 20.

The position coordinates of the feature may be specified by combining the current position of the own vehicle and the relative position information of the feature with respect to the own vehicle. The relative position (i.e., distance and direction) of the feature with respect to the own vehicle may be specified based on the size and posture (for example, the degree of inclination) of the feature in the image. The main processor 40 roughly estimates the initial coordinates of the vehicle in the global coordinate system by, for example, GPS. Then, the relative coordinates from the initial coordinates of the vehicle calculated by integrating the speed vector of the vehicle are estimated. This gives a rough current position of the vehicle in the global coordinate system. Further, the relative distance and direction of features such as landmarks and lane marks from the vehicle are calculated from an image including SfM (Structure from Motion) information. As a result, the global coordinates of the position where the feature such as a landmark exists can be obtained. The relative distance and direction of the landmark from the vehicle may be calculated using information from a millimeter-wave radar or laser radar (not shown). The coordinate calculation of the feature may be executed by the image processor 20.

Feature information and track information as a result of calculation, processing, or acquisition by the main processor 40 are temporarily stored in the memory 80. The feature information is information indicating the position coordinates, shape, and size of the feature specified by image recognition. In the memory 80, each object is represented by, for example, a group of coordinate points arranged along the contour of the feature. Various modes can be adopted as the expression form of the shape and position of the feature. For example, the shape and position of the feature may be represented by a polynomial.

The feature information can be roughly divided into landmark information and lane mark information. The landmark information includes the type of landmark, coordinate information, color, size, shape and the like. As the type of landmark, a signboard, a traffic signal, a sign, a pole, a pedestrian crossing, a road marking (for example, a stop line), a manhole, and the like can be adopted. The lane mark can also be adopted as a landmark. The lane mark information includes, for example, position information of the lane mark and information indicating whether the lane mark is realized by a solid line, a broken line, or a bot's dot pattern. The position information of the lane mark is expressed as a coordinate group (that is, a point cloud) of the points where the lane mark is formed. As another aspect, the position information of the lane mark may be represented by a polynomial. The position information of the lane mark may be a set of line segments (that is, a group of lines) represented by a polynomial.

In addition, the main processor 40 executes various processes related to map utilization and map update (or generation). As a process related to map update, the main processor 40 executes, for example, downloading map information, uploading probe data, selecting landmarks used for localization, and the like. Some specific examples of various processes related to map utilization and map update (or map generation) will be described in detail later.

The communication module 50 is interposed between the main processor 40 and the server 3 so that the main processor 40 and the server 3 described later can communicate with each other. The communication module 50 transmits the probe data input from the main processor 40 to the server 3. Further, the communication module 50 receives the map information and related information stored in the server 3 and stores them in the memory 80. The main processor 40 is configured to execute various controls such as steering control, acceleration, and braking of the vehicle based on the map information received via the communication module 50 and stored in the memory 80.

The HMI 60 is a user interface for notifying the user of various information and for the user to transmit a predetermined operation to the vehicle. As the HMI 60, for example, a display attached to a car navigation device, a display built in an instrument panel, a head-up display projected on a windshield, a microphone, a speaker, and the like can be adopted. Furthermore, a mobile terminal such as a smartphone that is communicably connected to the vehicle can also be an HMI 60 in the map system 1.

In addition to visually obtaining the information displayed on the HMI 60, the user can also obtain the information by voice, warning sound, or vibration. In addition, the user can request the vehicle device to perform a desired operation by touch operation of the display or voice operation.

For example, when the user intends to receive a service of advanced driving support such as automatic steering by utilizing the map information, the user activates the function via the HMI 60. For example, tapping the "Map Link" button shown on the display activates the map utilization function and starts downloading map information. In another example, the map utilization function is enabled by inputting a voice command. The map information related to the map update may be uploaded at all times while the communication between the vehicle and the server 3 is established, or while the map utilization function is effective by tapping the "Map linkage" button. It may be enabled by another UI that reflects the user's requests.

The actuator 70 includes, for example, a braking device (so-called brake actuator), an electronic throttle, a steering actuator, and the like. The actuator 70 is a hardware element relating to at least one of acceleration, deceleration, and steering of the vehicle.

The memory 80 is realized by using a volatile memory such as RAM. The memory 80 may be realized by using a non-volatile memory such as a flash memory. The memory 80 may include both a volatile memory and a non-volatile memory. Here, as an example, the memory 80 includes a temporary storage unit 81 using a volatile memory and a storage unit 82 using a non-volatile memory. The storage unit 82 stores a program (hereinafter, a vehicle program) for causing the main processor 40 to execute processing such as generation of probe data. The vehicle program may be stored in a non-transitory tangible storage medium.

[Localization]

The main processor 40 identifies (i.e., localizes) the detailed position of the own vehicle by checking the landmark coordinates calculated based on the image captured in real time with the landmark coordinates included in the map information downloaded from the server 3.

For example, the main processor 40 performs longitudinal localization using landmarks such as direction signs, traffic lights, road signs, and stop lines. The longitudinal direction here corresponds to the front-rear direction of the vehicle. In addition, the longitudinal direction corresponds to the direction in which the road extends when viewed from the own vehicle (hereinafter, also referred to as the road extension direction) in the straight road section. The localization in the longitudinal direction corresponds to the process of specifying the position of the own vehicle in the road extension direction. For example, as a result of image analysis, in a situation where the distance to the direction signboard existing in front of the own vehicle is specified as 100 meters, for example, it is determined that the own vehicle exists at the position deviated from the position coordinates of the direction signboard registered in the map data by 100 meters to the own vehicle side. By performing such longitudinal localization, the detailed remaining distance to the feature point (in other words, POI) on the road such as intersections, curve entrances/exits, tunnel entrances/exits, and the end of traffic jams can be obtained.

Further, the main processor 40 performs lateral localization using landmarks such as lane marks, road edges, and guardrails. Lateral localization refers to specifying of the driving lane and specifying of the detailed position of the own vehicle in the driving lane (i.e., the amount of offset from the center of the lane to the left and right). The lateral direction here refers to the vehicle width direction and the road width direction. Lateral localization is achieved, for example, based on the distance from the left and right road edges/lane markings recognized by the image processor 20. For example, when the distance from the left side road edge to the vehicle center is specified as 1.75 meters as a result of image analysis, it is determined that the own vehicle exists at a position shifted by 1.75 meters to the right from the coordinates of the left side road end. The vehicle position as a result of localization may be represented by a coordinate system (for example, latitude, longitude, altitude) similar to the map data. The vehicle position information can be expressed in any absolute coordinate system such as WGS84 (World Geodetic System 1984). Further, the vehicle position information may be represented by a local coordinate system indicating a position in the map tile described later.

Here, as an example, the type of landmark used for longitudinal localization and the type of landmark used for lateral localization are different. Here, as another aspect, the main processor 40 may be configured to perform longitudinal and lateral localization using one landmark. When a plurality of landmarks are detected, localization may be performed using the landmark closest to the own vehicle. For example, when the main processor 40 detects a plurality of landmarks (for example, direction signs) in front of the own vehicle, the main processor 40 uses the one closest to the own vehicle among the plurality of landmarks to perform longitudinal localization. As for the recognition accuracy of the type and distance of an object based on an image or the like, the closer the object is to the vehicle, the higher the recognition accuracy. That is, when a plurality of landmarks are detected, the position estimation accuracy can be improved by the configuration in which the landmark closest to the vehicle is used for localization.

The main processor 40 sequentially localizes at predetermined position calculation intervals as long as the landmarks can be detected (in other words, captured). The position calculation interval is, for example, 100 milliseconds. The position calculation interval may be 200 milliseconds or 400 milliseconds. The position calculation interval may be dynamically changed according to the type of road on which the own vehicle is traveling (hereinafter, the traveling road), the vehicle speed, and the external environment. For example, when traveling on a road section where the remaining distance to a curve or intersection is within 0.5 km, the interval may be set to a value (for example, 100 milliseconds) shorter than a predetermined standard interval (for example, 200 ms). In the vicinity of curves and intersections, it is necessary to maintain highly accurate position information of the own vehicle with respect to those features. In a scene where relatively advanced/precise vehicle control (for example, steering control) is performed such as a curve or an intersection, it is possible to improve the accuracy of the own vehicle position information by setting the position calculation interval to be shortly. That is, by providing a mode in which the position calculation intervals are made short, it is possible to more appropriately perform vehicle control based on the own vehicle position information in a scene where relatively high/precise vehicle control such as on a curve is performed. On the other hand, by providing a mode in which the position calculation interval is long, the processing load of the main processor 40 can be reduced.

The main processor 40 sequentially performs localization when the map utilization function is enabled by the user and detailed map data near the current position can be acquired. Whether or not the main processor 40 performs localization may be changed according to the type of the traveling path. For example, when the driving road is a motorway, localization may be performed, but when the driving road is a general road, localization may not be performed. The motorway here is a road where pedestrians are prohibited from entering in principle, and includes toll roads such as expressways, for example. Automobile roads also include general roads where traffic other than automobiles is prohibited. The execution/non-execution of localization by the main processor 40 may be determined by the main processor 40 or controlled by the server 3 based on the state of maintenance of map data, the type of travel path, and the like.

The main processor 40 performs a dead reckoning process (i.e., Dead Reckoning or autonomous navigation) using the yaw rate and the vehicle speed when localization cannot be performed (for example, when no landmark is detected) or when the map utilization function is not enabled. The yaw rate used for the dead reckoning may be a yaw rate recognized by the image processor 20 using SfM technology, or may be detected by a yaw rate sensor.

The main processor 40 outputs a corresponding instruction to the actuator 70 for operating the hardware mounted on the vehicle based on the current position and map data of the own vehicle specified by localization or dead reckoning. As a result, automatic driving and driving support are realized. The main processor 40 also controls lighting of lamps such as turn signals, hazard lamps, and headlights according to a travel plan generated by the main processor 40 itself or another ECU (for example, an autonomous driving ECU).

[Example of Vehicle Control by Utilizing Maps]

By acquiring POI information of a toll gate or the like located a certain distance (for example, 200 meters) ahead of the current position from the map data, the main processor 40 can control the vehicle such as lane change and deceleration with a sufficient margin (in other words, more safely). The POI here refers to a point that should be noted from the viewpoint of vehicle control and pass plan. For example, the POI includes map elements that affect vehicle travel control, such as curve entrances/exits, tunnel entrances/exits, and the beginning and end of traffic jams. The POI includes a static POI corresponding to static map information and a dynamic POI corresponding to dynamic map information. Dynamic POI refers to the end position or the top position of a traffic jam.

Here, as an example, the usefulness of map utilization will be described by taking the case of automatically driving a vehicle using map data as an example. In addition, there is ACC as an application (hereinafter, also referred to as an application) related to automatic control of a vehicle. ACC is an abbreviation for Adaptive Cruise Control, and refers to a function of automatically driving a vehicle so that the distance between the vehicle and the preceding vehicle is constant within a range in which the traveling speed of the vehicle does not exceed a predetermined upper limit value. In addition, the application related to automatic vehicle control (hereinafter, also referred to as the vehicle control application) includes an application that drives the vehicle so as to maintain the center of the lane (hereinafter referred to as the lane keeping application), or a function for supporting or automatically executing operations related to lane change (hereinafter, lane change application).

For example, in the lane keeping application, it is necessary to detect the lane shape (such as curvature, and the like) in front of the vehicle in advance and adjust the steering operation amount. However, when the front of the vehicle is a blind corner or the field of view is obstructed by the preceding vehicle in front, the camera 10 may not be able to recognize the shape of the lane in front. In addition, it may be difficult for the camera 10 to recognize the shape of the lane in front due to weather conditions such as rain or snow that impairs the visibility ahead. In such cases, by acquiring the curvature of the road ahead using map data and complementing the recognition result of the camera 10, the risk of the lane keeping application being interrupted can be reduced (in other words, the application can continue to be executed).

Further, in ACC, it is necessary to detect the curvature of the road ahead of the vehicle in advance and adjust the speed. For example, control to decelerate to a predetermined target speed may be executed before the curve so that the vehicle can travel smoothly and safely on the curve. However, as described above, it may be difficult for the camera 10 to recognize the front lane shape depending on the preceding vehicle, weather conditions, and road shape. In response to such a difficulty, according to the configuration in which the curvature of the road ahead is acquired in advance using map data, even if the curvature of the road ahead cannot be detected by the camera 10, by the time the vehicle enters the curved section, it is possible to automatically decelerate to the target speed according to the curvature of the forward curve.

Further, when the ACC function is turned on, the vehicle may be traveling at a speed lower than a predetermined target speed according to the speed of the preceding vehicle. Under such circumstances, when the preceding vehicle moves due to a lane change or the like (in other words, when the preceding vehicle leaves the front of the own vehicle), the ACC function usually accelerates the vehicle to a predetermined target speed. However, there are some sections, such as before the toll gate and the exit route of the expressway, where acceleration due to the disappearance of the preceding vehicle may not be proper. In response to such a situation, according to the map utilization function, it is possible to determine whether the current position is disposed in a road section in which acceleration is preferable based on the map data. When the current position is in front of the toll gate (for example, within 200 meters), the acceleration to the target speed can be canceled. That is, by utilizing the map data, the risk of performing unnecessary acceleration can be reduced. The section where acceleration to the ACC set speed is not preferable refers to the vicinity of a toll gate, the exit route of an expressway, the vicinity of an intersection, a sharp curve, or the like.

Although various examples have been disclosed above, vehicle control by utilizing a map is not limited to the above. The map data is also useful when the driver's seat occupant (so-called a driver) has the driving authority. The POI information such as traffic jams that are disposed at a certain distance away from the current position may be notified to the driver as support information for driving operations.

[Generation of Probe Data by the Main Processor]

The main processor 40 transmits a data set including the travel trajectory information, the travelling route information, and the feature information stored in the memory 80 to the server 3 as probe data. The traveling trajectory information is information indicating the trajectory on which the own vehicle has traveled. For example, the traveling trajectory information is expressed as a sequence of points of the own vehicle position. The travelling route information is information indicating the travelling route of the end and the center line of the travelling path. The end of the traveling path and the like may also be represented by a group of coordinate points. The travelling route information directly or indirectly indicates the road shape such as the curvature and width of the road.

Specifically, the main processor 40 sequentially acquires feature information, travelling route information, and own vehicle position coordinates (hereinafter, recognition results) obtained by image recognition or the like, and stores the information in the memory 80 in chronological order so as to connect to the acquisition time (in other words, observation time). The recognition result of the feature information or the like is sequentially provided by, for example, the image processor 20 (for example, every 100 milliseconds). The feature information may be sequentially generated by the main processor 40 in collaboration with the image processor 20.

The recognition result data at each time stored in the memory 80 are collectively uploaded at predetermined upload intervals. The upload interval is set to, for example, K (K is a natural number) times the execution cycle of the image recognition process. When an equation of K≥2 is satisfied, the main processor 40 uploads the data in which the recognition result within a certain period of time stored in the memory 80 is packaged as probe data. Here, as an example, K=4 is set. That is, the main processor 40 uploads the data in which the recognition result within 400 milliseconds is packaged as probe data. The data including the vehicle positions at a plurality of time points corresponds to the above-mentioned traveling trajectory information.

The probe data sequentially transmitted by the vehicle is stored in the server 3 in a predetermined storage/management format. For example, the server 3 stores probe data sequentially transmitted by the same vehicle to combine in a length including a predetermined number of landmarks. The length of the probe data may correspond to a unit of road segments. A road segment is a road management unit in map data. A road segment is a division of roads according to predetermined rules. The road segment may correspond to, for example, a road link. The road link here refers to a road section connecting road nodes indicating intersections and end points of roads. Alternatively, the road segment may be a further subdivision of the road link. The road segment may be a road segmented by a predetermined length (for example, every 10 meters).

Here, as an example, it is defined that each vehicle (actually, the in-vehicle system 2) uploads data expressing the vehicle's traveling trajectory and road edge and the like in a coordinate point sequence, alternatively, as another aspect, the traveling trajectory and road edges, lane center lines, and the like may be represented by polynomials. Further, instead of the vehicle position information, the main processor 40 may upload the positioning result by GPS, the SfM information, and the vehicle speed information, and the server 3 may be configured to calculate the vehicle position at each time point based on the information. The feature information and the travelling trajectory information included in the probe data correspond to the information for the server 3 to generate the static map (hereinafter, static information) in one aspect.

In addition, the probe data may include dynamic information indicating the behavior of the vehicle (hereinafter referred to as vehicle behavior information) such as the vehicle speed within the latest predetermined time interval, steering angle, yaw rate, blinker operation information, lane ID, and relative position with respect to the lane. The vehicle behavior information includes wiper operation information, shift position, vehicle body orientation, vehicle body pitch angle, roll angle, inter-vehicle distance from the preceding vehicle, and the like. The relative position information with respect to the lane refers to the amount of offset to the left and right with respect to the lane center line, whether the vehicle body straddles the lane, and the like.

By acquiring vehicle behavior information, the server 3 acquires POI information corresponding to quasi-dynamic map information, such as a congested section or a point where there is an obstacle such as a falling object or a parked vehicle on the street. For example, the server 3 adopts the end of the vehicle group whose vehicle speed is equal to or less than a predetermined threshold value as the tail end of the traffic jam section, and sets the point corresponding to the tail end as the dynamic POI related to the traffic jam. Further, the head position of the vehicle group whose vehicle speed is equal to or less than a predetermined threshold value is adopted as the head position of the traffic jam section, and the head position is set to the dynamic POI. Further, the server 3 defines a point where a certain number of vehicles (for example, 10 vehicles) or more are temporarily traveling across lanes or changing lanes, as a place where there are obstacles such as falling objects and vehicles parked on the street (hereafter, it is regarded as an obstacle existence point). Then, the obstacle existence point is set to the dynamic POI.

Figure 2:
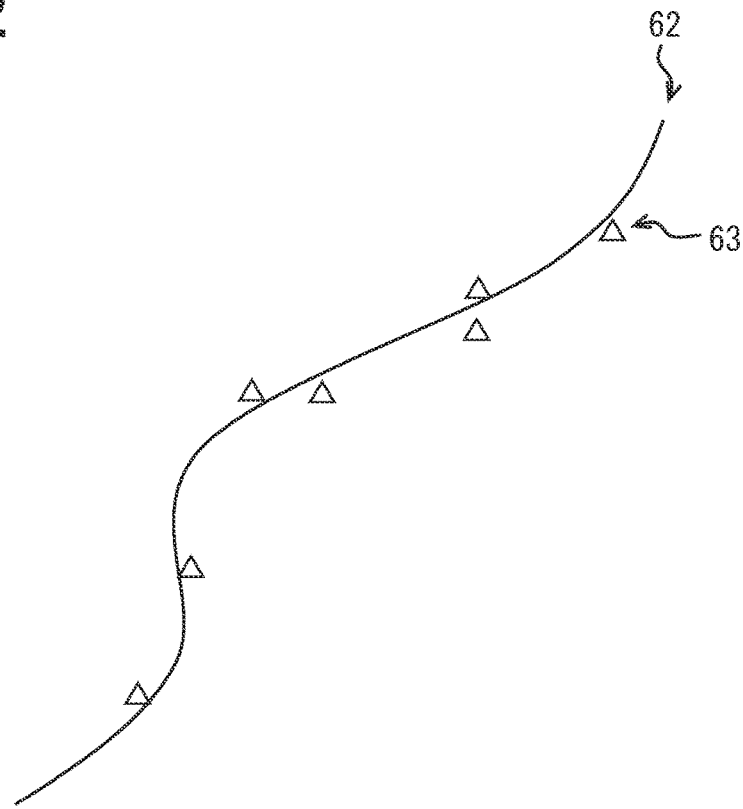
FIG. 2 is a diagram showing an example of information included in map data.

The map data stored in the server 3 includes a road segment 62 in which the shape of the road is represented by a cubic spline curve and a landmark 63 existing around the road segment 62, as shown in FIG. 2, for example. Road segment 62 and landmark 63 have latitude, longitude and altitude values, respectively. The landmark 63 includes, for example, a traffic sign, and information obtained in real time by the camera 10 and various sensors 30 as a state acquisition unit, as well as information whose position has already been determined, is integrally configured on the map. Map information is updated sequentially based on the information obtained in real time.

Figure 3:
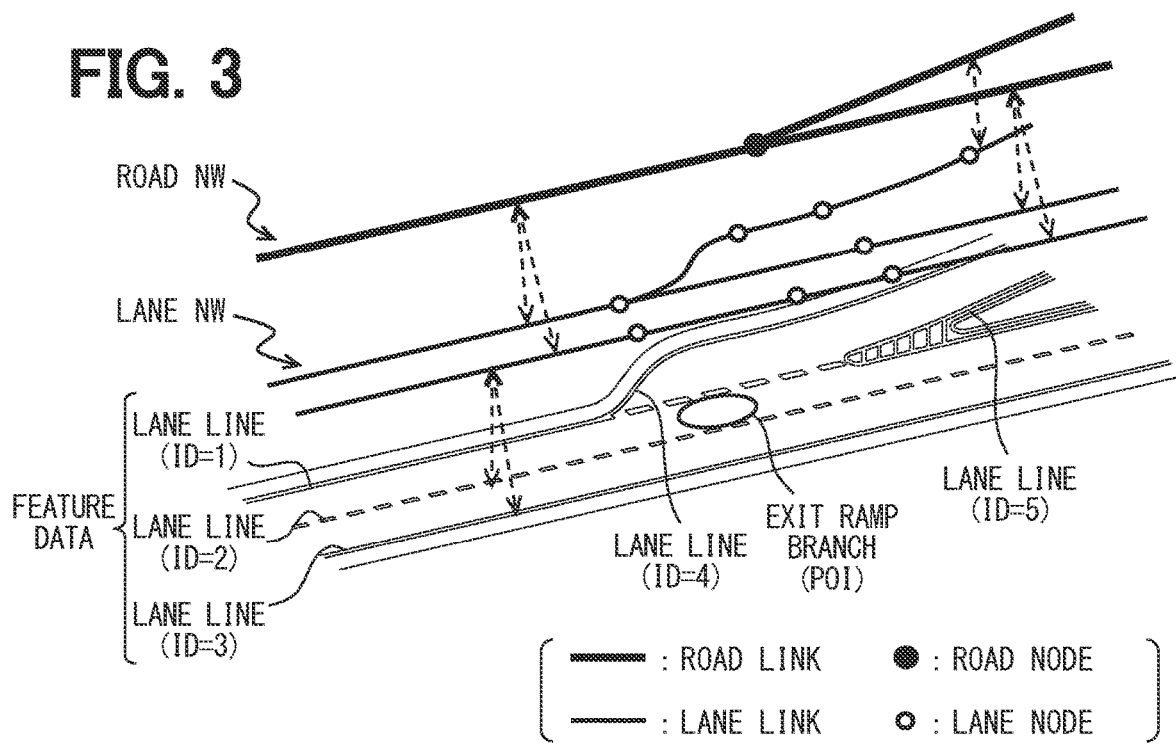
FIG. 3 is a conceptual diagram showing an example of the feature of map data.

FIG. 3 conceptually shows an example of the structure of map data. As shown in FIG. 3, the map data includes road network data, lane network data, feature data, and POI data. Each data is hierarchically organized. The road network data includes link ID, link length, number of lanes, and connection node information (for example, node ID) for each road link, and node ID, position coordinates, and connection link information (for example, link ID) for each road node. The lane network data includes lane ID, link ID at lane level, link length, and connection node information, and node ID, position coordinates, and connection link information (for example, link ID) for each lane node. The link information at the lane level included in the lane network data is associated with the road link included in the road network data.

The feature data includes lane marking data and landmark data. The lane marking data includes a lane marking ID for each lane marking and a group of coordinate points representing an installation portion. The lane marking data includes pattern information such as broken lines, solid lines, and road tacks. The lane marking data is associated with lane information (e.g., lane ID or link ID at the lane level). The landmark data represents the position and type of each landmark. The shape and position of each object are represented by a group of coordinate points. POI data is data indicative of the position and the type of the feature which affects vehicle travel plans such as branch points for exiting the main highway, junctions, speed limit change points, lane change points, traffic jams, construction sections, intersections, tunnels, toll gates, etc. POI data includes type and location information.

In addition, the map data may include a traveling trajectory model. The travel trajectory model is track data generated by statistically integrating the travel trajectories of a plurality of vehicles. The travel trajectory model is, for example, an average of traveling trajectories for each lane. The traveling trajectory model corresponds to data indicating a traveling track that serves as a reference during automatic driving.

The map data may include static map information and dynamic map information. The static map information here is information about features that are unlikely to change, such as road networks, road shapes, road markings, structures such as X guardrails, and buildings (for example, information about features that need to be updated within one week to one month). Static map information is also called a base map. Dynamic map information refers to information about map elements whose state changes in a relatively short period of time, such as road construction information and traffic regulation information. The dynamic map information may be classified into quasi-static information, quasi-dynamic information, and dynamic information (hereinafter, hyper dynamic information) that changes in seconds according to the expected value of the duration of the state (in other words, the speed of change). Quasi-static information is, for example, information that is required to be updated within one to several hours. Road construction information, traffic regulation information, traffic congestion information, and wide area weather information correspond to the quasi-static information. Semi-dynamic information is, for example, information that is required to be updated every 10 minutes. The tail end position of traffic jam, accident information, narrow area weather information, falling objects on the road, and the like correspond to the semi-dynamic information. The hyper dynamic information includes, for example, position information of a moving body such as a vehicle or a pedestrian, and ITS (Intelligent Transport Systems) information such as a lighting state of a traffic light.

Here, as an example, the map data handled by the map system 1 may include static map information, quasi-static map information, and quasi-dynamic information. Alternatively, the map information handled by the map system 1 may only include static map information. It may also include hyperdynamic information. The static map information and the dynamic map information may be configured to be managed (i.e., updated and distributed) separately.

The server 3 stores the map information and updates the map information by the server processor 31 attached to the server 3. All map data corresponding to all map recording areas are divided into a plurality of patches and managed. Each patch corresponds to map data for different areas. In addition, each patch may partially overlap at the corresponding region with the adjacent patch.

For example, the map data is stored in units of map tiles in which the map recording area is divided into 2 km square rectangles. Hereinafter, for convenience, the real space range (i.e., a rectangular divided area) to be recorded by the map tile is also simply referred to as the map tile. A plurality of map tiles are stored in the server 3 together with the corresponding latitude, longitude, and altitude information. Each map tile is given a unique ID (hereinafter, tile ID). Map tiles correspond to the subordinate concept of the patch described above.

The size of the map tile can be changed as appropriate, and is not limited to a 2 km square rectangle. It may have a rectangular shape of 1 km square or 4 km square. Further, the map tile may be hexagonal or circular. Each map tile may be set to partially overlap adjacent map tiles. The size of the map tiles may vary from layer to layer. For example, the tile size of static map data may be set to 2 km square, while the tile size of dynamic map data (particularly map data related to quasi-dynamic information) may be set to 1 km square. The tile size may differ depending on the type of road, such as an expressway and a general road. The tile size of a general road may be preferably set smaller than the tile size of an expressway. In addition, general roads may also be distinguished by trunk roads and narrow streets. In that case, it may be preferable that the tile size of the narrow street is set smaller than that of the trunk road. The map recording area may be the entire country where the vehicle is used, or may be only a part of the area. For example, the map recording area may be limited to an area where automatic driving of a general vehicle is permitted or an area where an automatic driving operation service is provided.

Further, here, as an example, the server 3 manages (i.e., generates, updates, and distributes) map data in units of map tiles in which the map recording area is divided into rectangular shapes of uniform size, alternatively, it is not limited to this. The size and shape of the map tiles may be non-uniform. That is, the size and shape of the patch-corresponding area, which is the range of the real world corresponding to each patch (in other words, the range as a registration target), may be uniform or various. For example, a map tile in a rural area where the density of map elements such as landmarks is likely to be relatively sparse may be larger than a map tile in an urban area where map elements such as landmarks are likely to be densely present. For example, the map tiles in the rural area may have a rectangular shape of 4 km square, while the map tiles in the urban area may have a rectangular shape of 1 km square or 0.5 km square. The urban area here refers to, for example, an area where the population density is equal to or larger than a predetermined value or an area where offices and commercial facilities are concentrated. Rural areas may be areas other than urban areas. Rural areas may be defined as countryside areas. The classification mode of the area may not be limited to the two stages of urban area and rural area. The map recording area may be divided into four stages in descending order of population density: urban area, rural area, countryside area, and depopulated area. In addition to population density, the number of companies, the usage of the area designated by the government, and the land usage rate may be adopted as the criteria for dividing the area. The degree of urbanity in a region may be determined by combining multiple types of indicators.

In addition, the division mode of all map data may be defined by the data size. In other words, the map recording area may be divided and managed within a range defined by the data size. In that case, each patch is set so that the amount of data is less than a predetermined value. According to such an aspect, the data size in one delivery can be set to a certain value or less. The real space range supported by the patch in the urban area may be narrower than the real space range supported by the sub blocks in the rural area. As mentioned above, it is expected that map elements such as landmarks and lane marks will be more densely present in urban areas than in rural areas.

While the map coordination (in other words, map utilization) function is turned on, the vehicle travels based on the downloaded map data while sequentially obtaining the information of the map tile to which the passing road belongs from the server 3. Regarding the handling of the map data downloaded to the in-vehicle system 2, various rules can be applied in consideration of the capacity of the memory 80 and the like. For example, when the capacity of the memory 80 is relatively small, the main processor 40 may be configured to delete the map data of the map tile on which the own vehicle has already left, as soon as the vehicle leaves or at a timing when the vehicle is far away by a predetermined distance or more. According to such a configuration, the in-vehicle system 2 can be realized by using the memory 80 having a small capacity. That is, the introduction cost of the in-vehicle system 2 can be reduced.

Further, the map data downloaded to the memory 80 may be configured to be deleted at a timing when a predetermined time (for example, one day) has elapsed from the time of downloading. Map data of roads used on a daily basis, such as commuting roads and school roads, may be configured to be cached in the memory 80 as much as possible (for example, unless the free space becomes a predetermined value or less). The retention period of the downloaded map data may be changed according to the attributes of the data. For example, static map data is stored in the storage unit 82 up to a certain amount. On the other hand, for example, dynamic map data such as construction information may not be stored in the storage unit 82, but be deleted from the temporary storage unit 81 when the vehicle passes through the area corresponding to the dynamic map data.

Here, as an example, all the map data in the memory 80 is deleted at least when the travelling power source is turned off. The traveling power source here is a power source for the vehicle to travel, and refers to an ignition power source when the vehicle is a gasoline vehicle. When the vehicle is an electric vehicle or a hybrid vehicle, it refers to the system main relay.

[Probe Data Upload Control]

Figure 4:
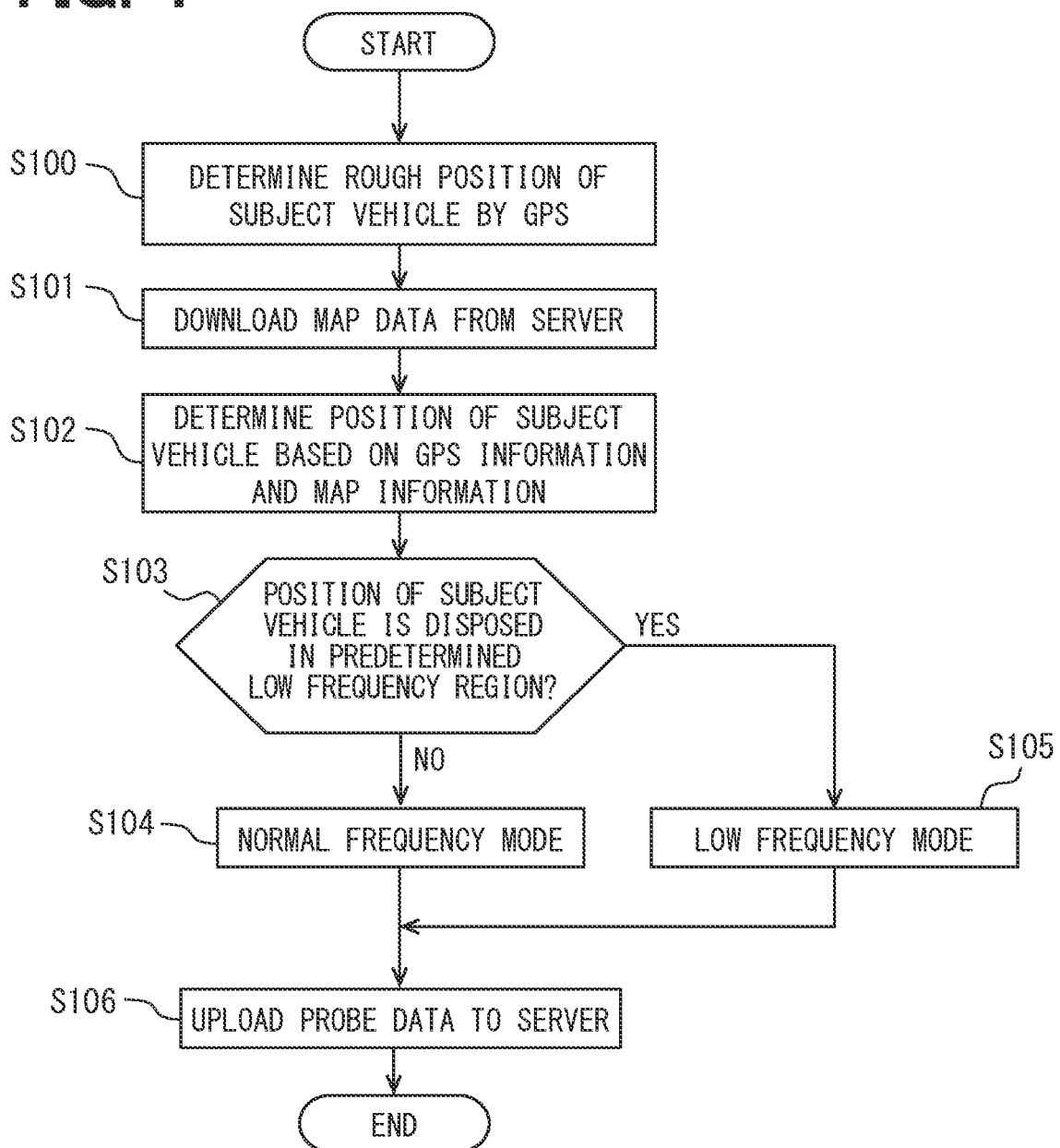
FIG. 4 is a flowchart showing upload control of probe data by the main processor.

The map system 1 uploads information about the map collected by the vehicle to the server 3 included in the map system 1, and the map information stored in the server 3 can be updated. Uploads are usually performed at a predetermined frequency. For example, the normal upload interval is set to 400 milliseconds. Of course, the upload interval may be 200 milliseconds, 500 milliseconds, 1 second, 2 seconds, or the like. However, under predetermined conditions, the main processor 40 may have an operation mode in which uploading of probe data is stopped, the frequency thereof is reduced, or the type of information to be uploaded is limited. In the following, a feature in which the main processor 40 has a low frequency mode in which the upload frequency is lower than the normal frequency in addition to the normal mode in which the upload is executed at the normal frequency will be described with reference to FIG. 4. FIG. 4 shows an example of a processing flow executed by the main processor 40. The normal mode corresponds to the first mode, and the low frequency mode corresponds to the second mode.

As shown in FIG. 4, first, step S100 is executed. Step S100 is a step in which the main processor 40 determines a rough position of the own vehicle based on the information of the positioning result by GPS.

Next, step S101 is executed. Step S101 is a step in which the main processor 40 downloads map information corresponding to the rough position of the own vehicle from the server 3. The determination and acquisition of map information corresponding to the rough position of the own vehicle will be described later.

Next, step S102 is executed. Step S102 is a step in which the main processor 40 determines the detailed position of the own vehicle. The detailed position of the own vehicle is the global coordinates including latitude, longitude and altitude on the earth. The main processor 40 determines the detailed global coordinates of the own vehicle based on the map information downloaded from the server 3 together with the rough position information using, for example, GPS.

Next, step S103 is executed. Step S103 is a step of determining whether or not the situation in which the own vehicle is placed satisfies a predetermined low frequency condition. Specifically, it is a step in which the main processor 40 determines whether or not the position of the own vehicle exists in a predetermined low frequency area determined in advance. That is, the low frequency condition in the example shown in FIG. 4 is whether or not the position of the own vehicle exists in a predetermined low frequency area determined in advance.

Figure 5:
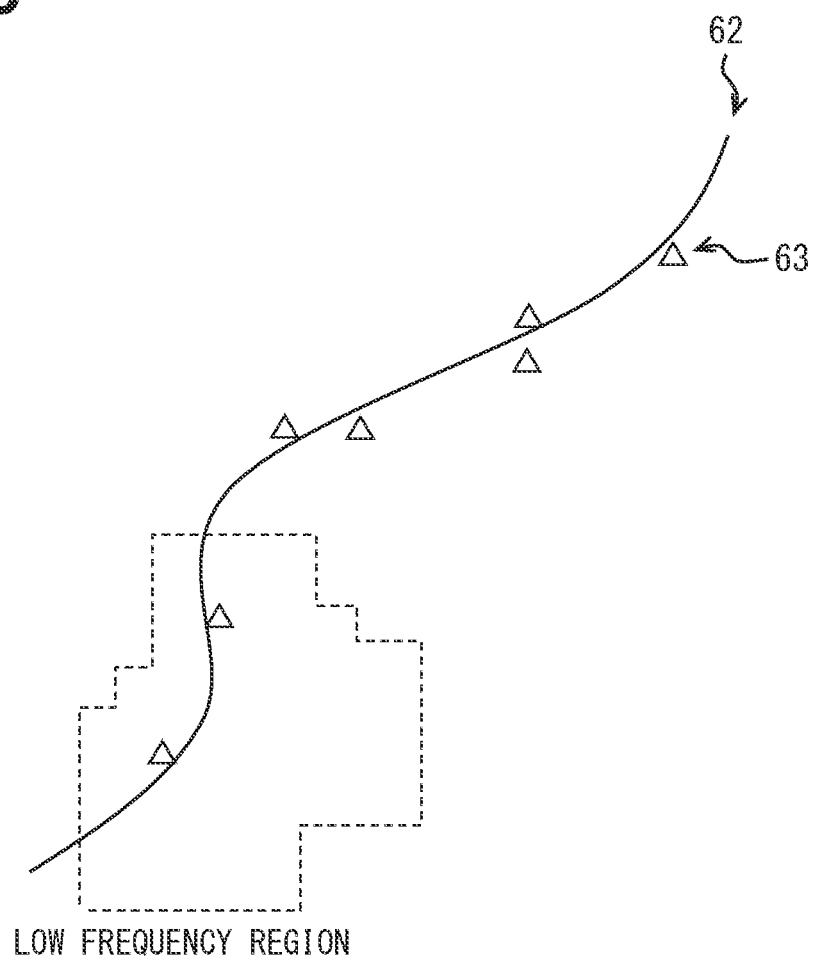
FIG. 5 is a diagram showing a low frequency area (or a prohibited area)

When the situation in which the own vehicle is placed satisfies a predetermined low frequency condition, that is, when the position of the own vehicle exists in a predetermined low frequency area determined in advance, the determination in step S103 is YES, and the process proceeds to step S104. The low frequency area is predetermined on the map as shown in FIG. 5. The low frequency area may be set as a line along the road segment 62, or may be set as a plane having a predetermined area as illustrated in FIG. 5.

On the other hand, when the situation in which the own vehicle is placed does not satisfy the predetermined low frequency condition, the process proceeds to step S105. Step S105 shows a normal frequency mode in which the upload frequency is performed at a normal frequency.

As described above, when the position of the own vehicle exists in a predetermined low frequency area, the process proceeds to step S104, and as shown in FIG. 4, the map system 1 is in the low frequency mode. The process proceeds to step S106 through step S104 or step S105. Step S106 is a step of transmitting probe data including map information to the server 3. The probe data is uploaded to the server 3 at a predetermined frequency according to the frequency mode related to the upload of the probe data set in step S104 or step S105. After that, this flow ends.

The low frequency mode will be described in detail below. When the low frequency mode is enabled, the amount of communication data related to the map information between the communication module 50 and the server 3 is reduced as compared with the normal frequency mode. Therefore, the load on the communication line can be reduced, and the cost related to communication can be reduced.

A low-frequency area means a region that is disposed in the environment where there are many other vehicles around the own vehicle, for example, a trunk road in an urban area, and a sufficient amount of map information can be uploaded to the server 3 from many other vehicles. In such an area, since a large amount of map information is uploaded from other vehicles, it is possible to secure a sufficient amount of information for updating the map information even if the upload frequency of the own vehicle is reduced.

Another example is an area where the frequency of change of landmarks 63 such as traffic signs and road markings is relatively low, such as a motorway. In such areas, the update of landmark 63 itself as hardware on and near the road is expected to be infrequent, so even if the upload frequency of the own vehicle is reduced, a sufficient amount of information can be secured to update the map information.

In addition, the frequency of uploads can be reduced to zero in low frequency mode. The state in which the upload frequency is zero is a state in which uploading of map information to the server 3 is substantially prohibited, and is particularly referred to as a prohibition mode. That is, the low frequency mode includes the prohibition mode.

The prohibited area, which is a low frequency area where the prohibition mode is enabled, is a region in a facility that is not suitable for steering based on automatic steering and has a road that can be driven by a vehicle such as a safari park, or in a facility having a highly confidential building such as a military facility or a private company facility. In such a prohibited area, uploading of map information from the vehicle to the server 3 is prohibited, and the map is not generated on the server 3 either. Therefore, the download for vehicle control is not performed.

Regarding the predetermined condition in which the low frequency mode is enabled, in the above example, whether or not the position of the own vehicle exists in a predetermined low frequency area is adopted, alternatively, another condition may be adopted.

For example, the normal frequency mode may be changed to the low frequency mode at night. At night, it tends to be more difficult for the camera 10 to recognize traffic signs and road markings than during the daytime, and the reliability of determining the position of the landmark 63 is lower than during the daytime. Therefore, it may be preferable to reduce the frequency of uploading the location information of the landmark 63 to the server 3. It may be advisable to set in advance a time zone in which the vehicle is placed at night or in a low illuminance environment equivalent thereto, and set the upload frequency to the low frequency mode in that time zone. Further, in an area where a season exists, the time zone defined as nighttime differs depending on the season, so it may be preferable to make the time zone defined as nighttime variable according to the season. For example, in an area with a midnight sun, the time zone at night is relatively short, and there is little chance that the surrounding environment of the vehicle has extremely low illuminance. In such areas, the low frequency mode is also enabled for a shorter period of time.

Further, the normal frequency mode may be changed to the low frequency mode based on the weather conditions in the area where the vehicle travels. For example, in bad weather such as heavy rain, heavy snowfall, heavy fog, and sandstorm, it may tend to be difficult to recognize traffic signs and road markings, and the reliability of determining the position of landmark 63 may be lower than in fine weather. Therefore, it may be preferable to reduce the frequency of uploading the location information of the landmark 63 to the server 3. As a method of determining the weather conditions of the vehicle, for example, the reflectance of the road surface is measured using an image captured by the camera 10, or the weather is determined based on the contrast of the image. In addition, based on information published by a public institution, areas that meet predetermined weather conditions such as heavy rain, heavy snowfall, heavy fog, and sandstorms may be designated as low-frequency areas in real time. The setting of the low frequency area itself may be dynamically changed according to the weather conditions, the time zone, and the collection status of probe data (in other words, the degree of accumulation) of the server 3. Areas that are not infrequent areas (hereinafter referred to as normal areas) may also be set as infrequent areas when the probe data is sufficiently collected in bad weather or at night. The setting change of the area may be carried out by the server 3 or by the vehicle side device.

Further, the upload frequency may be gradually reduced based on the years of use of the main processor 40 and the image processor 20 (in other words, the total operating time). The performance of the main processor 40 and the image processor 20 is evolving day by day, and it is presumed that the newer the processor, the shorter the time required for image processing and uploading, and the higher the accuracy. Therefore, the longer the processor has been used, the less frequently the map information should be uploaded. On the contrary, the map information can be efficiently collected by actively uploading the map information to the processor having been used for a short period of time.

As described above, the mode of changing the upload frequency of the probe data based on the traveling area, the weather condition, the time zone, and the number of years of use of the image processor 20 has been disclosed. Alternatively, the map system 1 may be configured as follows. The main processor 40 includes a full transmission mode and a suppression transmission mode as operation modes. The full transmission mode corresponds to an operation mode in which a data set including information about all items specified in advance to be transmitted as probe data is uploaded as probe data. On the other hand, the suppression transmission mode is an operation mode in which only a part of all the items set as upload targets in the full transmission mode is uploaded as probe data. The full transmission mode corresponds to the first mode in which a predetermined type of feature is to be uploaded, and the suppression transmission mode corresponds to the second mode in which the number of features to be uploaded is smaller than the full transmission mode as the first mode.

The type of information to be uploaded in the suppression transmission mode may be set in advance or may be specified by the server 3. The type of information to be uploaded to the vehicle in the suppression transmission mode may be, for example, an item that is insufficient from the viewpoint of generating/updating map data. The number of items uploaded in the suppression transmission mode may be zero. The suppression transmission mode may also include a prohibition mode. If the information to be uploaded in the full transmission mode includes both static information and dynamic information, the information to be uploaded in the suppression transmission mode may be only dynamic information.

In the above configuration, the server processor 31 instructs the vehicle existing in the predetermined upload suppression section to operate in the suppression transmission mode. Further, the server processor 31 instructs the vehicle existing in the section other than the upload suppression section to operate in the full transmission mode. The main processor 40 of each vehicle operates in the operation mode instructed by the server 3.

The upload suppression section may be, for example, a road segment in which a sufficient amount of probe data necessary for generating/updating map data has been already collected. According to this setting, the server 3 instructs the vehicle traveling on the road segment where a sufficient amount of probe data is collected to the suppression transmission mode and uploads only the dynamic information, or only a part of feature information.

In addition, the upload suppression section may be a road segment with bad weather. According to this setting, the risk of uploading inaccurate probe data can be reduced. The upload suppression section may be dynamically changed according to the degree of collection of probe data, the time zone, and the weather conditions. The upload suppression section may be determined by the server processor 31. The server processor 31 may distribute the determined upload suppression section information to the vehicle, and the vehicle side may determines whether or not the current position corresponds to the upload suppression section and determine the operation mode. According to such a configuration, it is not necessary for the server processor 31 to specify the operation mode for each vehicle, and the processing load of the server processor 31 can be reduced. The main processor may be configured to spontaneously switch operating modes based on at least one of the vehicle's travel area, weather conditions, and time zones. The main processor 40 may be configured to shift from the first mode to the second mode based on at least one of the instruction from the server 3, the traveling area of the vehicle, the weather condition, and the time zone.

According to the suppression transmission mode, the types of information as a reporting target are reduced as compared with the case of the full transmission mode. As a result, the amount of communication from the vehicle to the server 3 can be reduced for the entire system. Further, since uploading of unnecessary items can be suppressed, the load on not only the communication equipment but also the main processor 40 and the server processor 31 can be reduced.

In addition, when a plurality of vehicles exist in a predetermined upload suppression section, the server processor 31 sets any one of the plurality of vehicles as the transmission assignment vehicle, and probe data is uploaded only by the transmission assignment vehicle. According to such a configuration, the vehicles other than the transmission assignment vehicle traveling in the upload suppression section does not upload the probe data. Therefore, the amount of data communication from the vehicle to the server 3 can be reduced for the entire system.

The transmission assignment vehicle in charge of transmission may be, for example, a vehicle having a sufficient distance from the preceding vehicle, a tall vehicle such as a truck, or the like. According to these vehicles, it is easy to recognize feature information. Therefore, it is possible to efficiently collect high-quality feature information. Further, the transmission assignment vehicle may be a vehicle corresponding to the leading vehicle or a vehicle using the image processor 20 having the best object recognition performance or a vehicle having the highest positioning accuracy by GPS among a plurality of vehicles (hereinafter referred to as a vehicle group) constituting one group. The transmission assignment vehicle in charge of transmission may be determined by the server 3 based on the position information sequentially reported from each vehicle. Here, as another aspect, it may be determined by each transmission assignment vehicle in charge of transmission sharing information by vehicle-to-vehicle communication. In the configuration in which the server 3 appoints the transmission assignment vehicle, under a precondition, each vehicle sequentially reports vehicle information such as position information, the performance of the image processor 20, and information indicating GPS positioning accuracy to the server 3. With the above configuration, the amount of data communication from the vehicle to the server 3 can be reduced. The vehicle group may be preferably set for each lane. A set of vehicles in which the inter-vehicle distance is less than a predetermined threshold value can be defined as one vehicle group. The above configuration corresponds to a configuration such that the server 3, as an operation mode, includes a collection mode in which the server 3 requests all vehicles located on the road segment to transmit probe data, and a save mode in which the server 3 does not request a part of the vehicles to transmit probe data.

The operating mode of the server 3 may vary from road segment to road segment or map tile to map tile. The operation mode of the server 3 for each road segment/map tile may be determined according to the collection status of probe data for the road segment/map tile. For example, the server 3 may operate in the collection mode for a road segment with insufficient probe data, and may operate in a save mode for a road segment in which a necessary and sufficient amount of data is collected. The server 3 may update the map data in units of map tiles, or may update the map data in units of road segments. When the map is updated in units of map tiles, the above-mentioned concept of upload suppression section may be extended to the concept of map tiles. That is, the upload suppression tile corresponding to the upload suppression section may be appropriately set. Each vehicle may be configured to operate in suppression mode based on its presence in the upload suppression tile.

[Map Generation Processing]

Figure 7:
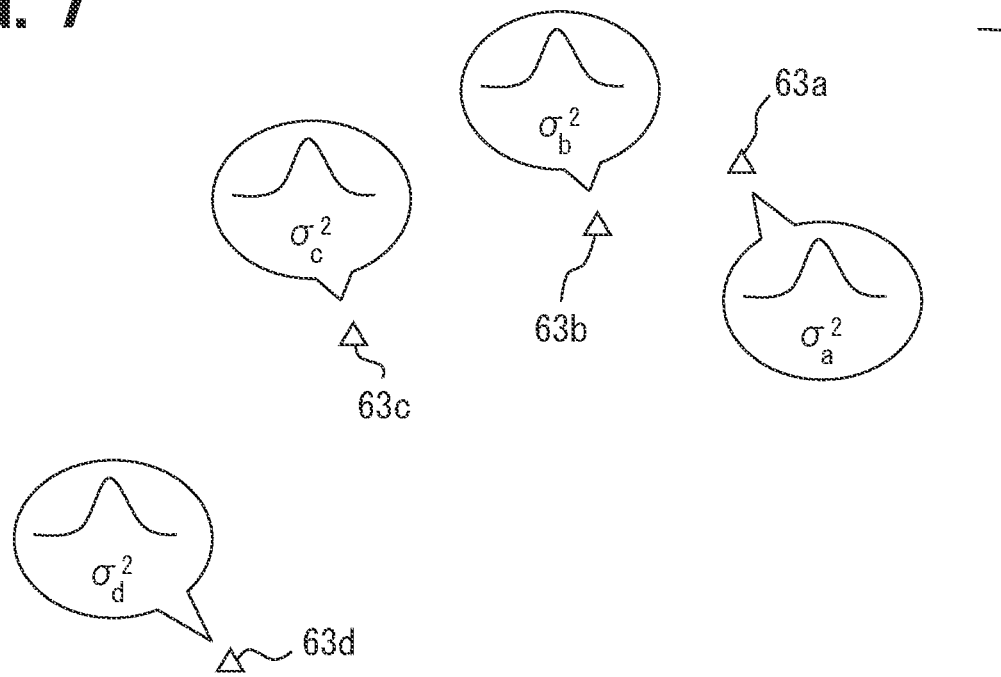
FIG. 7 is a diagram showing the dispersion of landmarks.
Figure 8:
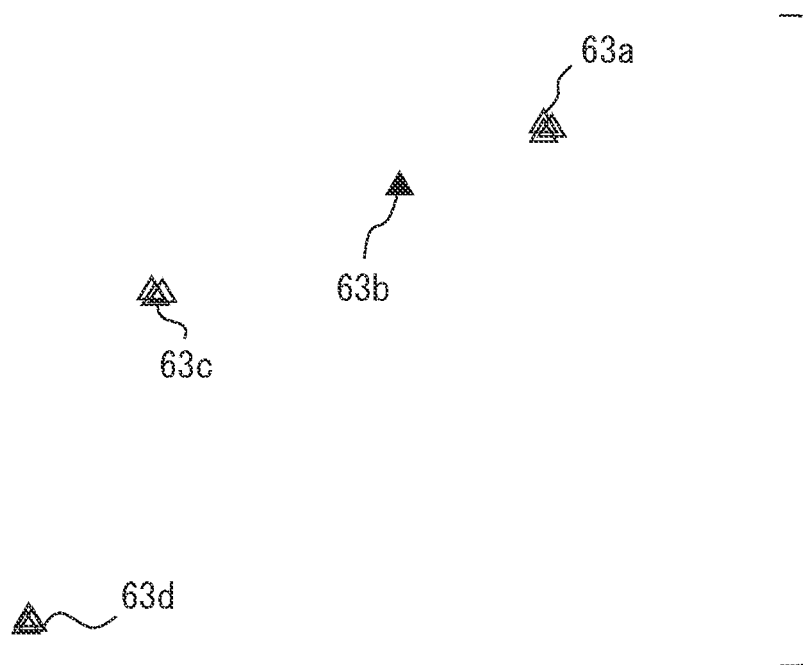
FIG. 8 is a diagram showing a relationship between a reference mark and other landmarks.

An example of the flow when the server processor 31 generates a map based on the probe data transmitted to the server 3 via the communication module 50 will be described with reference to FIGS. 6 to 8.

Here, there is a vehicle traveling in an area corresponding to a certain map tile, and the vehicle constitutes the map system 1. That is, at least one image representing the environment of the vehicle is acquired by the camera 10 mounted on the vehicle, the global coordinates of the landmarks included in the image are calculated, and the images are uploaded to the server 3.

Figure 6:
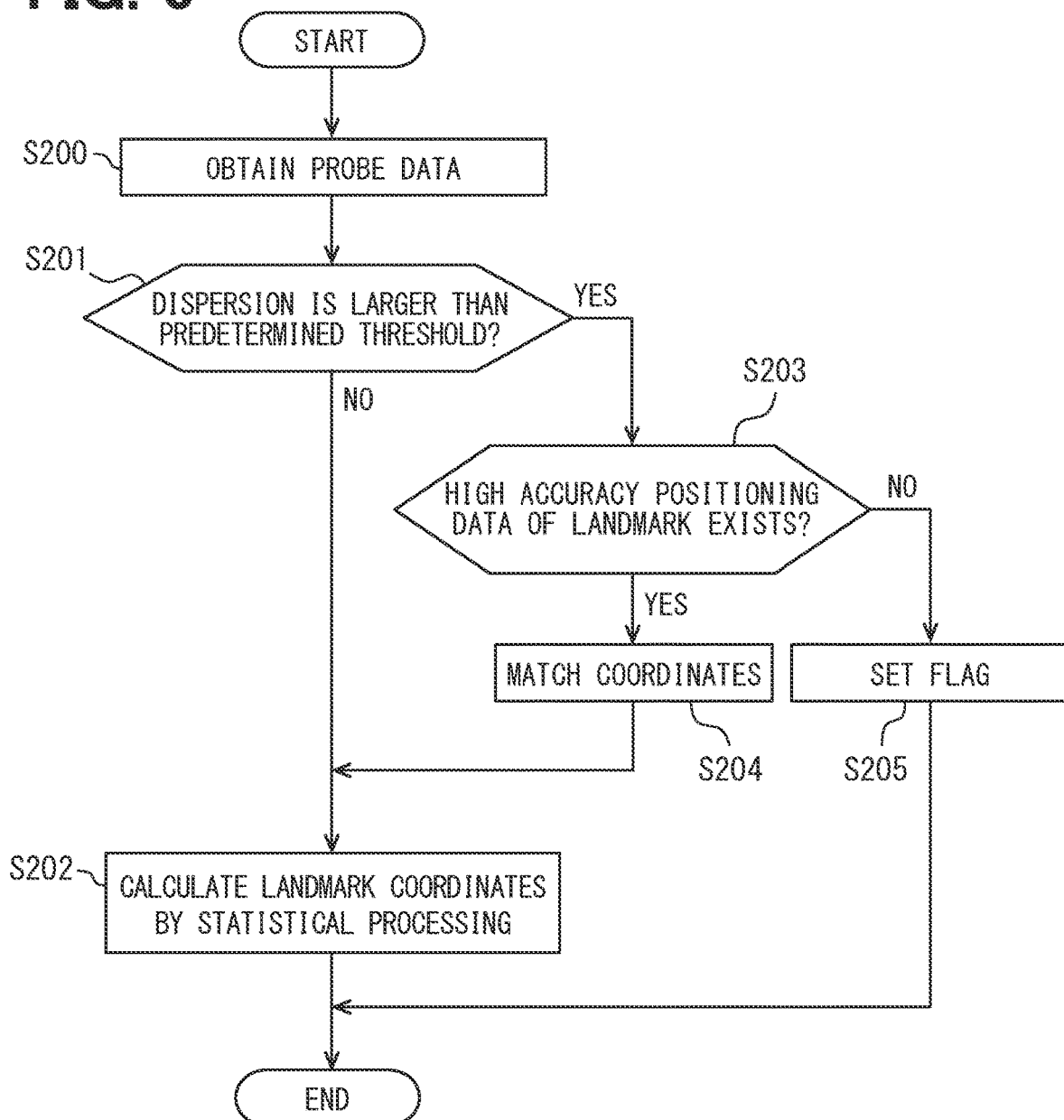
FIG. 6 is a flowchart showing an example of control executed by a server processor.

As shown in FIG. 6, first, step S200 is executed. Step S200 is a step in which the server processor 31 constituting the server 3 acquires probe data. The server processor 31 acquires probe data from a plurality of vehicles traveling on the same map tile. That is, the server processor 31 acquires a plurality of coordinate data for one landmark. Probe data is sequentially uploaded to the server 3 from a plurality of vehicles. The server processor 31 stores the probe data provided by each vehicle in a state of being connected or divided into a predetermined length for each provider.

Next, step S201 is executed. Step S201 is a step in which the server processor 31 calculates the variance of the coordinates for each landmark and determines whether or not the calculated variance is larger than a predetermined threshold value. The variance is calculated for each coordinate of latitude, longitude and altitude, and each variance is compared to a pre-specified threshold. As shown in FIG. 7, the server processor 31 calculates the variance $\sigma^2$ of each landmark 63 based on the probe data received from the plurality of vehicles. In the example shown in FIG. 7, four landmarks 63a to 63d exist in the map tile, and the variances $\sigma_a^2$, $\sigma_b^2$, $\sigma_c^2$, and $\sigma_d^2$ are calculated for each landmark.

In step S201, when the variance of the coordinates of all the landmarks 63 is equal to or less than a predetermined threshold value, the determination in this step is "NO", and the process proceeds to step S202.

Step S202 is a step in which the server processor 31 statistically calculates the coordinates of each landmark 63. When the variance of the coordinates of each landmark 63 is equal to or less than a predetermined threshold value, it means that the coordinates of the landmark 63 can be detected with a certain degree of accuracy. That is, it means that the map can be generated with relatively high accuracy even when the coordinates of each landmark 63 are statistically calculated without using the reference mark described later. In step S202, probe data received from a plurality of vehicles is used to perform, for example, a process of obtaining an average for each landmark 63, and calculate global coordinates. Then, this flow ends.

On the other hand, in step S201, when the variance of at least one landmark 63 is larger than a predetermined threshold value, the determination is "YES", and the process proceeds to step S203. Step S203 is a step of determining whether or not high-precision positioning data exists for the landmark 63 whose variance is larger than a predetermined threshold value. The high-precision positioning data is coordinate data measured by a method different from the probe data, such as real-time kinematics (i.e., RTK) and precision independent positioning (i.e., PPP). High-precision positioning data refers to data generated by a dedicated mobile mapping system vehicle equipped with a laser radar (Li-DAR), optical camera, GNSS receiver, acceleration sensor, and the like, or positioning operations. Hereinafter, the coordinate data determined by precise measurement will be referred to as reference coordinates. Further, the landmark 63 to which the reference coordinates are given is referred to as a reference mark or a reference landmark. The reference mark plays a role as a ground reference point (GCP: Ground Control Point). The reference mark is a point where the above-mentioned high-precision positioning is performed. For example, signboards equivalent to traffic signs such as regulatory signs and guide signs, toll gates on expressways, connection points between expressways and general roads, and corners (i.e., edges) of structures such as buildings may be used as reference marks. In addition, feature points such as corners of lane markings, branching/merging points with other lane markings, and ends of guardrails may also be adopted as reference marks. Points where lanes increase or decrease may also be used as reference marks. The reference mark may be preferably a fixed three-dimensional structure. Here, as an example, a feature such as a guide sign, which is arranged at a position relatively higher than the road surface and is arranged at a position where the camera 10 can easily take a picture, is set as a reference mark. Hereinafter, for convenience, features other than the reference mark will also be referred to as normal features.

As described above, step S203 is a step of determining whether or not the reference coordinates are assigned to the corresponding landmark 63. Here, for example, the reference coordinates exist at the landmark 63b shown in FIG. 7 (indicated by the black-painted triangular mark in FIG. 8). That is, the landmark 63b is a reference mark. When the reference mark is present, the determination in step S203 is "YES", and the process proceeds to step S204.

Step S204 is a step in which the server processor 31 matches the coordinates of the landmark 63b as the reference mark measured in real time by the camera 10 and the sensor 30 with the reference coordinates. Here, the reference coordinates exist at the landmark 63b, and, for example, the reference coordinates are defined as Xref. When the coordinates of the landmark 63b on the probe data measured in real time are defined as X, the coordinates X match the coordinates Xref. That is, it is displaced parallel by a value of "Xref−X". By this operation, the coordinates of the landmarks 63b as all the reference marks recorded in the plurality of probe data become Xref. On the other hand, as shown in FIG. 8, the coordinates of the landmarks 63a, 63c, 63d other than the landmark 63b are also displaced parallel by a value of "Xref−X". Although the coordinates are expressed as one dimension here for convenience, they are actually calculated in three dimensions of latitude, longitude, and altitude.

After step S204, step S202 is executed. The coordinates of the landmark 63b as the reference mark match the reference coordinates. Further, for the coordinates of the other landmarks 63a, 63c, 63d, for example, a process of obtaining an average thereof is performed to calculate global coordinates. Then, this flow ends.

When the reference mark does not exist in step S203, the process proceeds to step S205. Step S205 is a step in which the server processor 31 sets a flag indicating that there is no reference mark. By setting a flag for the landmark 63 for which the variance larger than the threshold value is calculated, the possibility that high-precision positioning is necessary can be visualized. After that, this flow ends.

By adopting the above flow, the map system 1 uses high-precision positioning data as reference coordinates for the landmark 63 whose coordinate accuracy cannot be obtained only by accumulating GPS and probe data so that coordinates can be calculated with high accuracy even for other landmarks 63 that do not have accurate positioning data. As a result, the accuracy of the map tile to which the corresponding landmark 63 belongs can be improved.

From the server's point of view, the above configuration corresponds to the configuration of: acquiring probe data including observation coordinates of a plurality of map elements associated with information about a traveling road segment from a plurality of vehicles; correcting the observed coordinates of the map element included in the probe data that includes observed coordinates of the reference mark so that the observed coordinates of the map element defined as the reference mark match the absolute coordinates of the reference mark or the deviation degree from the absolute coordinates of the reference mark is minimized; and determining the coordinates of the map element by statistically processing the observed coordinates of the corrected map element.

Figure 9:
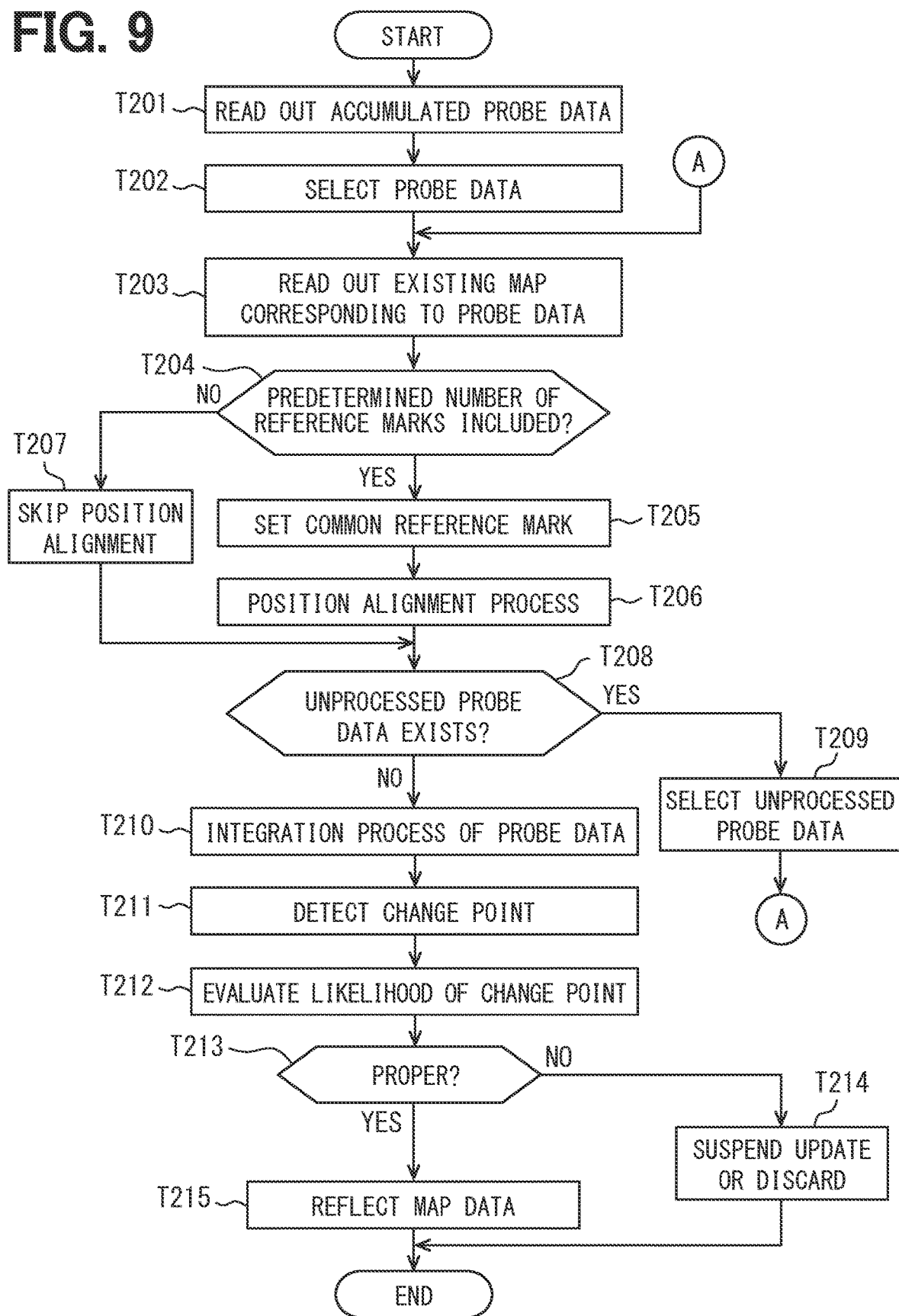
FIG. 9 is a flowchart showing a correction process using a reference mark.

In the above, the process for registering/updating landmark information has been described. Alternatively, the target of the above process can be applied to various features (in other words, map elements) such as lane marks. The server processor 31 may be configured to update the coordinate information of features such as landmarks and lane markings according to the procedure shown in FIG. 9. The process shown in FIG. 9 (hereinafter, map data update process) may be executed periodically for each map tile, for example. For example, the process shown in FIG. 9 is executed every day at midnight. Of course, the process shown in FIG. 9 may be executed at the timing when a predetermined number or more of probe data for the map tile as the process target are accumulated. The map data may be updated for each road segment. The map data update process shown in FIG. 9 includes steps T201 to T215.

First, in step T201, a plurality of probe data are provided from a plurality of vehicles traveling on the same road segment, and the plurality of probe data stored in a database (not shown) are read out, and the process proceeds to step T202. Whether or not the plurality of probe data are probe data for the same road segment may be determined based on the movement trajectory information and GPS coordinate information included in the probe data.

In step T202, any one of the plurality of probe data extracted in step T201 is selected and the process proceeds to step T203. In step T203, the map data of the corresponding road segment is extracted based on the coordinate information of various features included in the selected probe data, and the process proceeds to step T204.

In step T204, it is determined whether or not the probe data includes a predetermined number (for example, three) or more of reference mark information based on the map data read out in step T203. The predetermined number here may be preferably 3 or more for the convenience of the positioning process in the subsequent stage. As another aspect, the number of reference marks to be included may be set to 4, 5, or the like. As an example, the server processor 31 executes step T205 when the probe data includes information of three or more reference marks. On the other hand, when the probe data includes less than three reference marks, step T207 is executed. In step T205, a reference mark (hereinafter, common reference mark) common to the map data and the probe data is set, and step T206 is executed.

In step T206, the alignment process for the probe data is performed using the common reference mark. The alignment process is a process of correcting the observed position coordinates of various features included in the probe data by using the observed coordinates of the common reference mark and the map registration coordinates. The map registration coordinates here refer to the coordinates registered in the current (latest) map data. The observed coordinates here are the coordinates calculated by the vehicle and refer to the coordinates described in the probe data.

As a method for correcting probe data, an ICP (Iterative Closet Point) method can be adopted. The ICP method is a method in which parallel movement and rotation of each point group are repeated so that the two point groups are most consistent as a whole. Specifically, the method includes: a step of searching and associating the nearest point in the other point group (hereinafter, the second point group) from each point in the point group on one side (hereinafter, the first point group); and a step of adjusting the position and orientation of the coordinate system of each point group so as to minimize the difference between the associated points. As a method of calculating a vector for rotating and displacing parallel each point group, SVD (Singular Value Decomposition), the steepest descent method, or the like can be adopted. According to SVD, it is possible to obtain a rotation matrix and a parallel displacement vector for bringing a certain point group closer to a target point group (for example, an average point group of a first point group and a second point group). Further, according to the steepest descent method, the minimum value of the function representing the mean square error of the distance between the corresponding points can be searched, and the rotation matrix and the parallel displacement vector can be obtained.

The method of correcting the position coordinates of the features included in the probe data based on the position coordinates of the common reference mark may not be limited to the above method. As the correction method for the probe data, the correction method described in Japanese Patent Application No. 2018-163076, which is separately filed, may be adopted. That is, the center of gravity point of the observed coordinates of the common reference mark (hereinafter referred to as the first center of gravity point) is calculated, and a plurality of common reference marks are planar approximated by, for example, the least squares method. Then, the normal vector (hereinafter, the first normal vector) with respect to the approximate plane is calculated. Further, the server processor 31 calculates the center of gravity point (hereinafter, the second center of gravity point) of the map registration coordinates of the common reference mark, and also calculates the approximate plane corresponding to the common reference mark. Then, the normal vector (hereinafter, the second normal vector) with respect to the approximate plane is calculated. Next, the position coordinates of the feature in the probe data are translated in parallel so that the first center of gravity point coincides with the second center of gravity point. In addition, the position coordinates of each object in the probe data are rotated so that the first normal vector coincides with the second normal vector. Then, the position coordinates of the feature in the probe data are rotationally moved around the first normal vector passing through the first center of gravity so that the sum of squares of the errors of the common reference mark is minimized, and the alignment process is completed.

The server processor 31 acquires probe data corrected for the position and orientation of the feature by completing the alignment process. Such an alignment process corresponds to a process of correcting the position coordinates of various features included in the probe data based on the position coordinates of the common reference mark. The observation coordinates of the normal feature related to the observation coordinates of a certain reference mark refer to the observation coordinates of the normal feature detected and uploaded by the same vehicle. In other words, the observed coordinates of a normal feature associated with a reference mark refer to the observed coordinates of a normal feature provided by the vehicle that provides the observed coordinates of the reference mark.

In step T207, the alignment process for the selected probe data is omitted, and the process proceeds to step T208. The probe data including less than three reference marks may be preferably excluded from the target of the integration process described later. Alternatively, the server processor 31 may be configured to divide/connect the various probe data into data having a length that includes 3 or 4 or more reference marks. In step T209, it is determined whether or not unprocessed probe data remains in the probe data read out in step T201. When unprocessed probe data remains, the process proceeds to step T209, and the processes after step T203 are executed for unprocessed probe data. On the other hand, when there is no unprocessed probe data, step T210 is executed.

In step T210, the corrected probe data integration process is performed. The probe data integration process is a process of statistically calculating the coordinates of the feature, as in S201. For example, the variance of the coordinates of each feature is calculated, and when the variance is less than a predetermined threshold value, the median/mean value is adopted as the coordinates of the feature. Further, for a feature whose variance is equal to or higher than a predetermined threshold value, for example, a verification flag is set. The verification flag corresponds to a flag indicating that the data is uncertain to be registered as a map. The server processor 31 may calculate the coordinates for each landmark after excluding deviated values so that the variance becomes equal to or less than a predetermined threshold value during the probe data integration process. Moreover, the evaluation of the variance in the integrated processing may not be essential and may be omitted. By the above processing, the position coordinates of each object are statistically determined after being corrected by using a predetermined reference landmark. For example, the server processor 31 corrects the coordinates of the lane mark included in each probe data by using a predetermined reference landmark, and then statistically processes a plurality of coordinate information to determine the position coordinates of the lane mark.

In the following step T211, the change point is detected by comparing the data indicating the statistical position coordinates of each object (hereinafter, integrated data) generated in step T210 with the map data. The integrated data itself or the map data reflecting the contents of the integrated data corresponds to the provisional map data. The change point here refers to a part of the integrated data that differs from the current map data and indicates a place where the feature may have been relocated, added, or deleted. For example, among the features included in the integrated data, the amount of deviation with respect to the position coordinates in the map data and the statistically determined position coordinates are calculated for the features that have landmarks corresponding to the current map data (that is, existing features). Then, when the deviation amount of the position coordinates exceeds a predetermined error range, it is detected as a feature suspected of being relocated. Here, as an example, when the deviation amount of the position coordinates is within a predetermined error range (for example, less than 3 cm), it is regarded as an observation error and is not detected as a change point of the map. According to such a configuration, it is possible to reduce the possibility that the map data is frequently updated due to the observation error. Of course, as another aspect, a deviation of 1 cm or more may be detected as a change point. The amount of error allowed can be changed as appropriate.

In addition, features that are included in the integrated data and are not registered in the map data are detected as features that may have been newly created. In addition, features that are registered in the map data and are not included in the integrated data are detected as features that may have been deleted. When the process in step T211 is completed, step T212 is executed.

In step T212, the validity of the change point is determined. When the number of probe data providing the feature detected as a change point is equal to or greater than a predetermined threshold value, or when it is continuously detected for a predetermined period (for example, 3 days), it is determined that the change point is not temporary, but it is appropriate so that the change point is reflected in the map data. Further, when the deletion of the lane marking is detected as a change point, it is determined whether or not the deletion section is, for example, less than a predetermined distance (for example, 5 meters). Since the lane markings are usually extended continuously, the possibility that only a part of the section is deleted is small. In addition, if an object (vehicle, puddle, snow) is temporarily present on the lane marking, the lane marking may not be detected. That is, when the deleted section is less than a predetermined distance, for example, it is highly possible that the originally existing lane marking is not detected due to a temporary event such as parking on the street, snow cover, or rainfall. By introducing the above determination logic, it is possible to reduce the risk of erroneously determining that the lane markings have been deleted although the actual lane marking are not deleted. As a result, the risk of erroneously updating the lane line information of the map data can be reduced.

When a change point is detected over a wide area, such as when the deleted section is longer than a predetermined distance, it may be determined that the change point has been changed (that is, appropriate) due to road construction or the like. In addition, at the change point, when the construction information indicating that the construction was carried out within the latest predetermined period (for example, within 3 days) can be acquired from an external server or detected from the probe data, it may be determined that the change point is appropriate. The above idea can be applied not only to lane markings but also to other features such as signboards. The change points judged to be valid are reflected in the map data (at step T215). In addition, for change points that are judged to be invalid, measures such as suspending the update or setting a verification flag are taken. According to the configuration that is configured to judge the validity of the change point based on the duration and scale of the change point and the presence or absence of construction information in the vicinity of the change point, the risk of updating the contents of the map data erroneously due to temporary factors can be reduced.

The above description discloses a mode in which the position coordinates of various features are calculated by integrating multiple probe data after aligning each feature using a reference mark for each probe data. The procedure for calculating the coordinates of the positions of features may not be limited to this. Instead of correcting the coordinates of features in each probe data unit, it may be configured to generate integrated data that statistically calculates the position coordinates of each feature, and then correct the coordinate information of each feature based on the reference mark.

For example, the server processor 31 statistically obtains the coordinates of each feature by the method described in S201 or step T210 based on the plurality of probe data as the next step of the probe data reading out process corresponding to step T201. At that time, the server processor 31 may be configured to adjust the observation data to be used so that the variance is equal to or less than a predetermined threshold value. The statistically calculated coordinates correspond to the representative observation coordinates. The representative observation coordinate refers to the average value or the median value of a plurality of observation coordinates. Next, the server processor 31 corrects the representative observation coordinates of various landmarks included in the integrated probe data based on the coordinate information of the reference mark. As the method of correction, the same method as in step T206 can be used. Even with such a configuration, the accuracy of the coordinates of each object can be improved.

The map system 1 that generates and distributes the traveling trajectory model as map data may be configured to handle the traveling trajectory data included in the probe data as a map element for generating the traveling trajectory model. For example, the server processor 31 may correct the traveling trajectory of each vehicle by using the reference mark associated with the traveling trajectory, and then integrate and process a plurality of corrected traveling trajectory data to obtain a traveling trajectory model. According to the configuration in which each traveling trajectory is corrected using the reference mark and then integrated to generate a traveling trajectory model, it is possible to generate a traveling trajectory for autonomous driving with higher accuracy. Here, the server processor 31 may be configured to generate a traveling trajectory model obtained by averaging the traveling trajectories of a plurality of vehicles, and then correct the traveling trajectory model by using a reference mark. The various processes described above may be configured to be shared and executed by a plurality of servers/processors. For example, the probe data integration process may be configured to be performed by a server different from the server that acquires and corrects the probe data.

The map system 1 described above corresponds to a system that corrects the observation coordinates of the same feature provided by a plurality of vehicles by using the observation coordinates of the reference mark and the map registration coordinates, and also statistically processes (for example, averages) the corrected observation coordinates of the feature so as to determine the coordinates of the feature. A plurality of observation coordinates for the same feature may be provided by a plurality of different vehicles, or may be generated by the same vehicle passing through the same point multiple times. The observation coordinates of various features included in the probe data are corrected so that the observation coordinates of the reference mark match the absolute coordinates of the reference mark as the map registration coordinates. Alternatively, the means of the matching here is not limited to the perfect. Alternatively, approximate match may be also included. The above correction may be performed so that the degree of deviation between the observation coordinates of the reference mark and the absolute coordinates is minimized. The correction process described above may be executed in units of road segments or in units of map tiles.

[Vehicle Control Mode Based on Map Accuracy]

Since the coordinates of the landmark 63 included in the map tile are calculated based on a plurality of probe data, there may be statistical variation. The map system 1 assigns an accuracy level based on statistical variability for each map tile. Then, the application that uses the map information is restricted according to the accuracy level. The operation flow of the map system 1 will be described with reference to FIG. 10.

Figure 10:
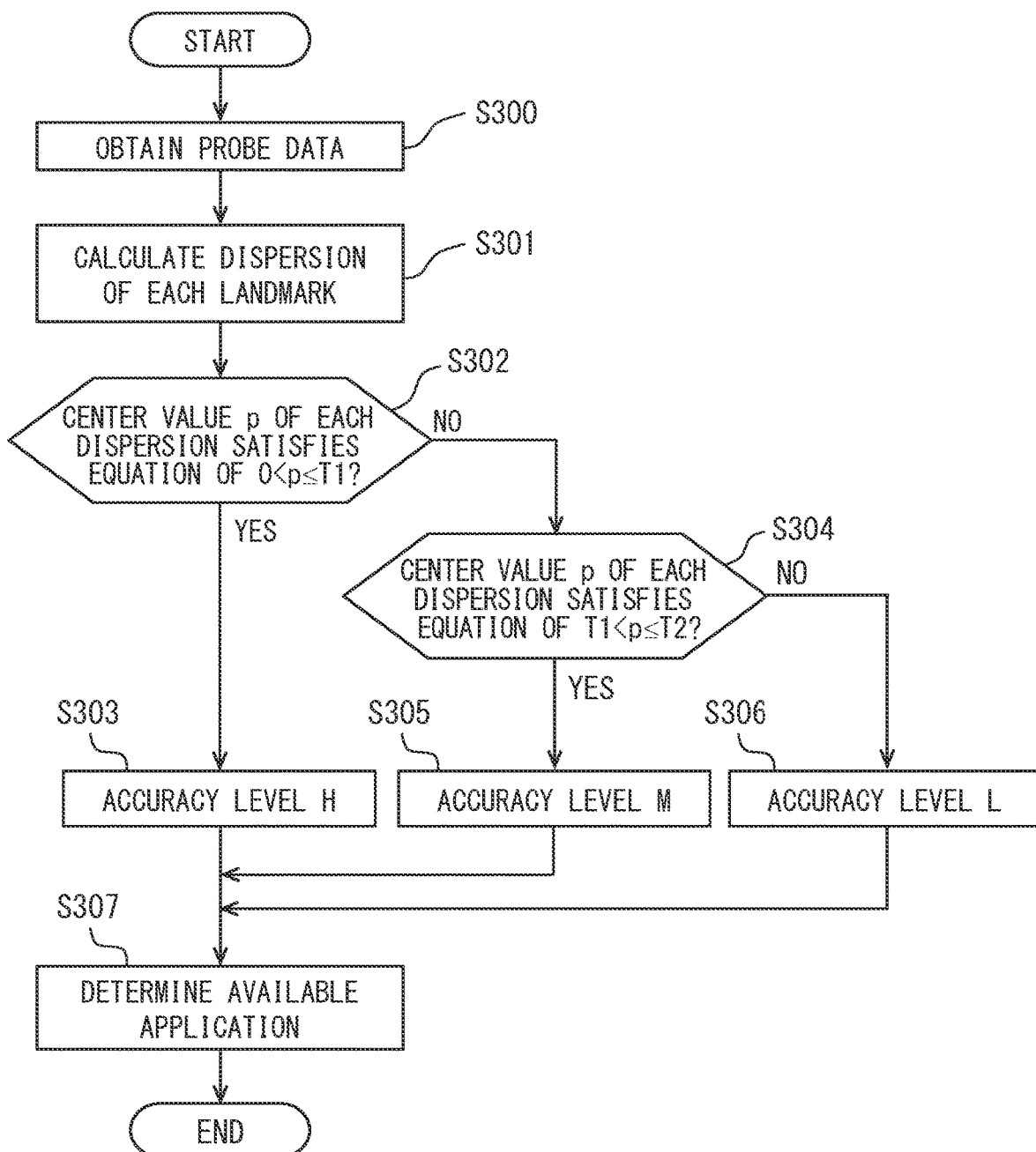
FIG. 10 is a flowchart showing an example of control executed by a server processor.

As shown in FIG. 10, first, step S300 is executed. Step S300 is a step in which the server processor 31 constituting the server 3 acquires probe data. The server processor 31 acquires probe data from a plurality of vehicles traveling on the same map tile. That is, the server processor 31 acquires a plurality of coordinate data for one landmark.

Next, step S301 is executed. Step S301 is a step in which the server processor 31 calculates the coordinate variance for each landmark. The variance is calculated for each coordinate of latitude, longitude and altitude. As shown in FIG. 7, the server processor 31 calculates the variance $\sigma^2$ of each landmark 63 based on the probe data received from the plurality of vehicles. In the example shown in FIG. 7, four landmarks 63a to 63d exist in the map tile, and the variances $\sigma_a^2$, $\sigma_b^2$, $\sigma_c^2$, and $\sigma_d^2$ are calculated for each landmark.

Next, step S302 is executed. Step S302 is a step in which the server processor 31 calculates the median value p of the calculated variances $\sigma_a^2$, $\sigma_2^2$, $\sigma_c^2$, and $\sigma_d^2$ and compares it with the predetermined threshold value T1. Here, the median value of the variance is calculated as an example, and any value may be used as long as it can statistically index the degree of variation in the coordinates of the landmarks belonging to the map tile. For example, the average value may be used. When the median value p satisfies the relationship of $0 < p \leq T1$ with the predetermined threshold value T1, the determination in step S302 is "YES", and the process proceeds to step S303.

Step S303 is a step of assigning the accuracy level of "High" to the map tile that is determined to be "YES" in step S302. The map tile to which the accuracy level of "High" is given is the map tile determined to have the highest accuracy.

On the other hand, when the determination is "NO" in step S302, the process proceeds to step S304. Step S304 is a step in which the server processor 31 calculates the median value p (or which may be an average value) and compares it with the predetermined threshold values T1 and T2. When the median value p satisfies the relationship of $T1 < p \leq T2$ with the predetermined threshold values T1 and T2, the determination in step S304 is "YES", and the process proceeds to step S305.

Step S303 is a step of assigning the accuracy level of "Middle" to the map tile that is determined to be "YES" in step S302.

On the other hand, when the determination is "NO" in step S304, the process proceeds to step S306. Step S306 is a step of assigning the accuracy level "Low" to the map tile for which the "NO" determination is made in step S304. The map tile to which the accuracy level of "Low" is given is the map tile determined to have the lowest accuracy.

The accuracy level of the map tile is higher in the order of "High", "Middle", and "Low". The higher the accuracy level, the more accurately the current position of the vehicle can be determined, and more advanced driving support can be realized. That is, while traveling in an area corresponding to a map tile having a high accuracy level, it can be used for advanced driving support such as autonomous driving. On the other hand, while driving in an area corresponding to a map tile with a low accuracy level, the application is restricted so that it is not used for automatic driving. More specifically, the main processor 40 allows the automatic driving application to use the map data of the map tile whose accuracy level is set to the highest level. For map data of map tiles set to a low level of the accuracy level, the automatic driving application is prohibited from using the map data. As a result, the map tiles obtained with high accuracy can be effectively used, and the map tiles with low accuracy can be prevented from being accidentally used for applications requiring more safety such as an automatic driving application. When the use of the application is restricted due to the accuracy level of the map tile, it may be preferable that the main processor 40 notifies the user via the HMI 60 to that restriction. Prohibiting the provision of map data to an application indirectly corresponds to prohibiting of the execution of the application itself or degenerating of the function.

[Alternative Means of Satellite Positioning System]

When identifying the position of the own vehicle, the map system 1 identifies the rough position of the own vehicle by positioning with a satellite such as GPS, and determines the detailed position of the own vehicle based on the map information downloaded from the server 3 and the coordinates of the landmark 63 calculated from the image captured in real time by the vehicle. However, there are situations where it is difficult to specify the position by the satellite since the vehicle is in a tunnel or between tall buildings.

As the positioning sensor 30a, the map system 1 can employ, for example, a radio wave detector that detects the radio wave intensity provided in the wireless LAN. Positioning by radio waves emitted from a wireless LAN base station (i.e., an access point) corresponds to an alternative positioning means. Among the base stations that transmit the radio waves of the wireless LAN, the vehicle receives one of the radio waves whose global coordinates where the base station is installed are known. As a result, the position of the own vehicle is estimated based on the coordinates of the base station and the intensity of the received radio wave. The operation flow of the map system 1 will be described with reference to FIG. 11.

Figure 11:
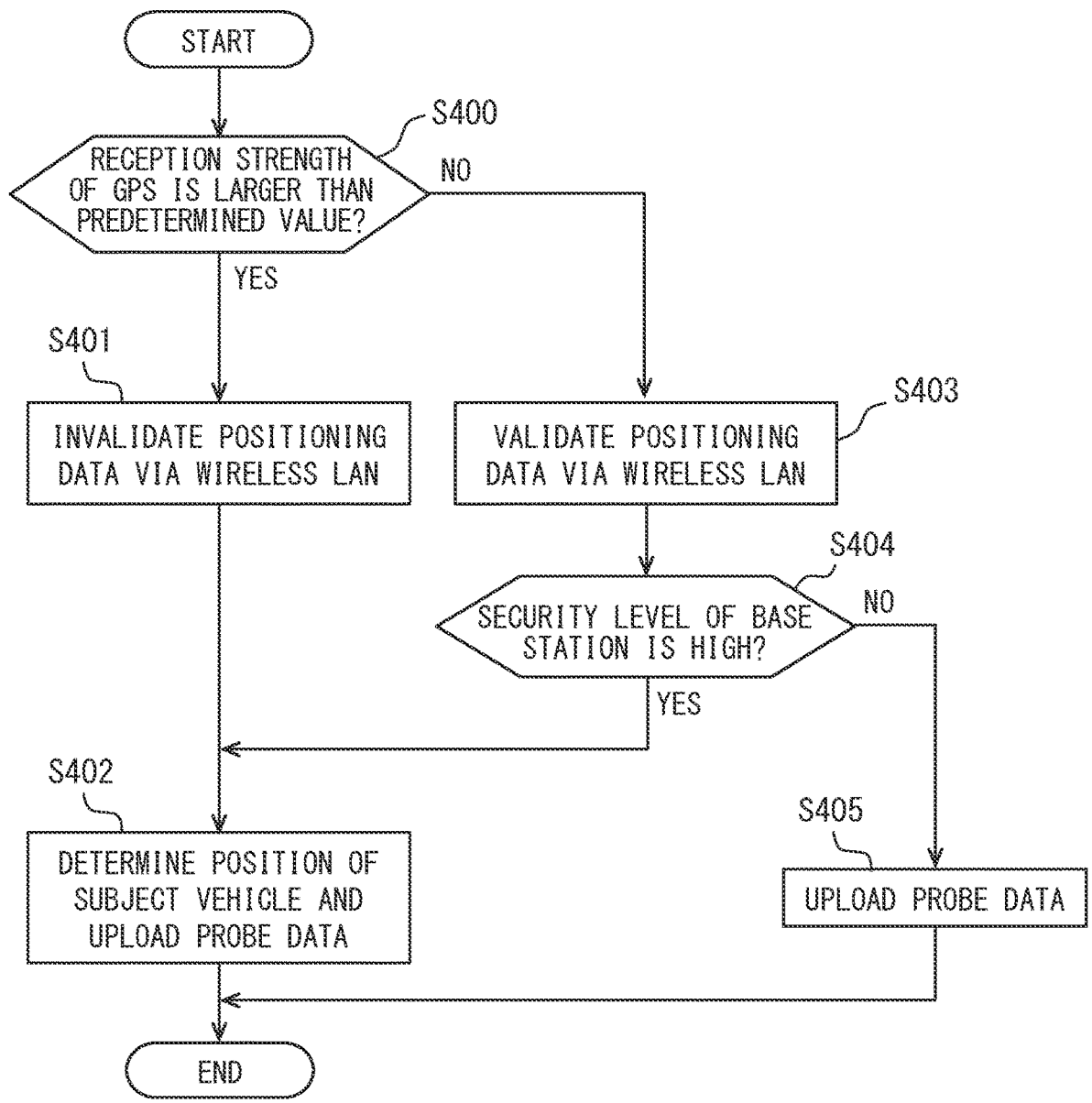
FIG. 11 is a flowchart showing an example of control executed by a main processor.

As shown in FIG. 11, first, step S400 is executed. Step S400 is a step in which the main processor 40 compares the reception intensity of radio waves from GPS satellites with a predetermined threshold value. As the threshold value, for example, the radio wave intensity of GPS is determined as the threshold when the position of the own vehicle can be sufficiently specified by the positioning by GPS and the map information obtained by downloading. When the reception intensity of the radio wave from the GPS satellite is larger than this threshold value, this step is determined to be "YES", and the process proceeds to step S401. That is, the radio wave detector of the wireless LAN radio wave is invalidated as an alternative positioning means. Then, the process proceeds to step S402, and the position of the own vehicle is specified by the positioning by GPS and the map information obtained by downloading. Further, the map information such as the landmark 63 obtained by the camera 10 is uploaded to the server 3. After the position of the own vehicle is specified, the position of the own vehicle is used for driving support such as automatic steering.

On the other hand, in step S400, when the reception intensity of the radio wave from the GPS satellite is equal to or less than this threshold value, the determination in this step is "NO", and the process proceeds to step S403. That is, the radio wave detector of the wireless LAN radio wave is validated as an alternative positioning means. Then, the process proceeds to step S404.

Step S404 is a step of determining, by the main processor 40, the security level of the base station which emits radio waves of the wireless LAN. The security level is an index of trust in the information emitted by the base station. When the security level is high, the main processor 40 relies on the coordinates of the installation location of the base station, and specifies the current position of the own vehicle based on the global coordinates of the base station, the reception strength of the radio waves received by the radio wave detector mounted on the vehicle, and the position prediction of the own vehicle by the SfM. For example, the distance from the base station is estimated based on the reception strength, and it is determined that the distance from the base station installation position is within the estimated distance. When signals from multiple base stations can be received, the distance to each base station is estimated based on the reception strength of the signals from each base station, and the current position is calculated using the installation position of each base station and the distance from each base station. Position estimation methods using radio waves emitted by base stations include various method such as the AOA (i.e., Angle Of Arrival) method, which uses the direction of arrival of radio waves, the arrival time (TOA or Time of Arrival) method, and the arrival time difference (TDOA or Time Difference of Arrival). The security level can be set arbitrarily. The security level can be set arbitrarily. For example, it can be inferred that the security level may be high for base stations provided by public institutions and public infrastructure companies. On the other hand, it can be inferred that the security level of a base station provided by an individual may be low.

When it is determined in step S404 that the security level of the base station or the security level of the alternative positioning means is low, this step is determined to be "NO", and the process proceeds to step S405. In step S405, the map information such as the landmark 63 obtained by the camera 10 is uploaded to the server 3. When the GPS reception strength is sufficiently secured or the positioning by the alternative positioning means having a high security level is realized, the positioning information by the alternative positioning means is utilized for specifying the position of the own vehicle as in step S402. On the other hand, when only positioning by an alternative positioning means having a low security level can be realized, the position of the own vehicle is not specified, and the positioning information is provided only by uploading the map information to the server 3.

The step of determining the level of security of the alternative positioning means is optional and is not always necessarily performed. That is, step S404 in FIG. 11 may not be performed. In such an aspect, when positioning by satellite cannot be sufficiently performed and positioning is performed by an alternative positioning means, it may be preferable that the positioning information is provided only by uploading the map information to the server 3.

By the way, the alternative positioning means may not be limited to the positioning by the radio wave emitted from the wireless LAN base station whose installation position coordinates are known. Alternatively, the positioning by the radio wave emitted from the short-range wireless communication base station whose installation position coordinates are known, the positioning by IMES, the positioning by geomagnetism, and the like may be adopted.

The radio wave detector that receives radio waves from wireless LAN, short-range wireless communication, and IMES, and the magnetic detector that detects geomagnetism may not necessarily be fixed to the vehicle. For example, when a mobile device such as a smartphone is equipped with a detector as described above and the mobile device is linked to the map system 1, the positioning information obtained by the mobile device is used for the map system 1.

[Method for Updating Map Data]

When identifying the position of the own vehicle, the map system 1 identifies the rough position of the own vehicle by positioning with a satellite such as GPS, and determines the detailed position of the own vehicle based on the map information downloaded from the server 3 and the coordinates of the landmark 63 calculated from the image captured in real time by the vehicle. However, there are situations in which the map information does not exist on the server 3 or the map information is old and the current situation is not accurately reflected.

Based on such circumstances, three modes of "no map", "map exists but old", and "latest map exists" are set for each map tile. The update flag may be set on the map tile for the two modes of "no map" and "map exists but old". Map tiles corresponding to the area where the update flag is set may be preferentially to generate a map or to updated the map. The operation flow of the map system 1 corresponding to the technical idea will be described with reference to FIG. 12.

Figure 12:
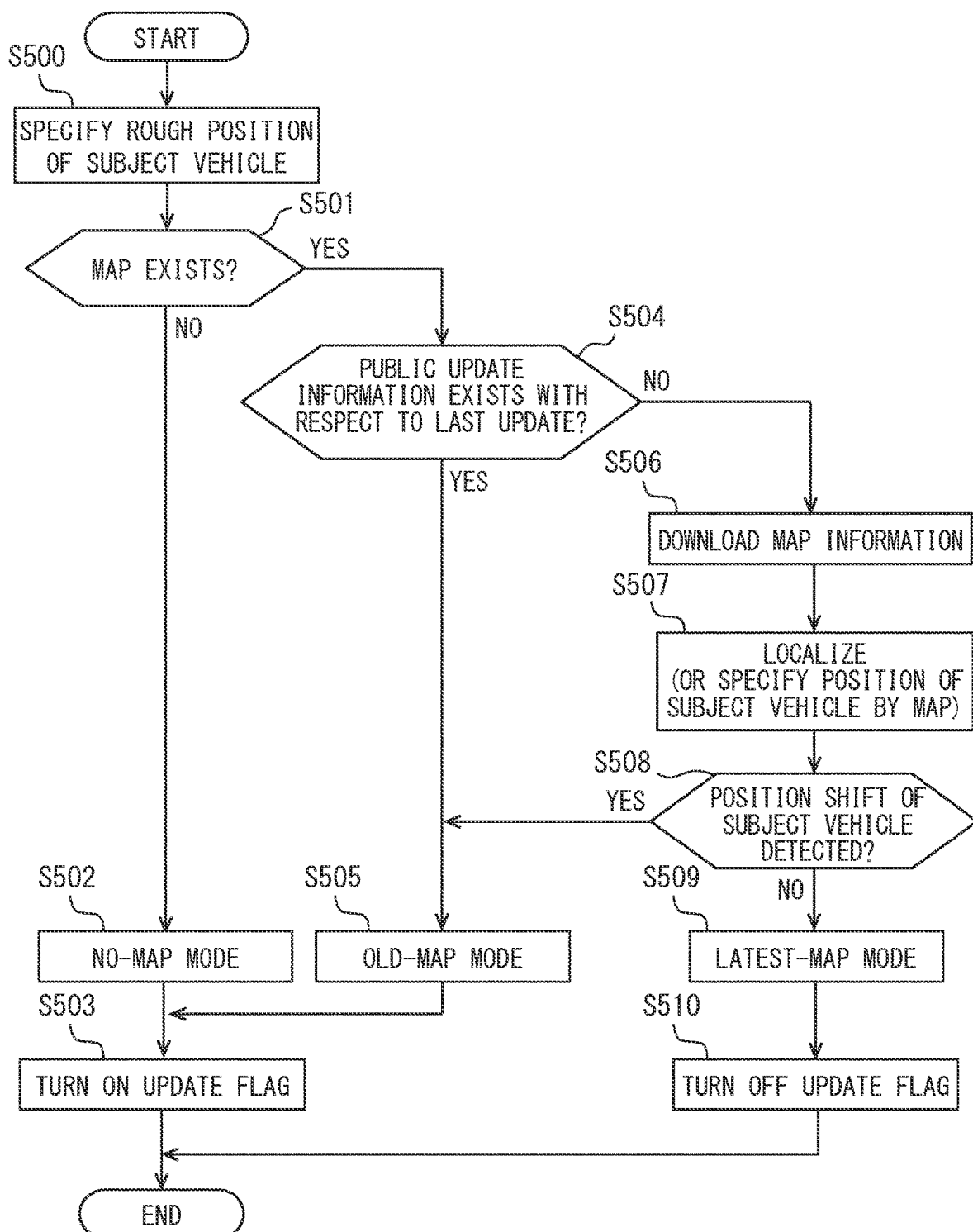
FIG. 12 is a flowchart showing an example of control executed by a main processor.

As shown in FIG. 12, first, step S500 is executed. Step S500 is a step in which the main processor 40 identifies a rough position of the own vehicle by GPS or the like. By this step, the area where the own vehicle exists is grasped.

Next, step S501 is executed. Step S501 is a step in which the main processor 40 determines whether or not the map information of the map tile corresponding to the area where the own vehicle exists is stored in the server 3. For example, the main processor 40 transmits the current position information of the own vehicle to the server 3. When the map information of the map tile of the area where the vehicle exists, the server 3 returns a signal indicating that the map information exists. When the server 3 does not have the map tile of the area where the vehicle exists, the server 3 returns a signal indicating that the server 3 does not have the map data of the requested area. As described above, step S501 may be performed by coordinating with the main processor 40 and the server 3. When the map information is not stored as a map tile, this step is determined as "NO", and the process proceeds to step S502. When there is no map data of the map tile in which the vehicle exists, the case where the map data of the map tile has expired is also included.

Step S502 is a step in which the main processor 40 sets the map tile corresponding to the area to be the "no map" mode. Then, the process proceeds to step S503.

Step S503 is a step in which the main processor 40 sets the update flag to be "ON" for the map tile corresponding to the area. When the update flag is set to "ON", the main processor 40 sequentially uploads feature information such as lane line information as probe data. As a result, for the map tile corresponding to the area in which the update flag is set to "ON", the map is preferentially generated by the server processor 31. This flow ends through step S503. As a more preferred embodiment, the main processor 40 uploads vehicle behavior information in addition to feature information while traveling on the map tile in which the update flag is set to "ON".

In step S501, when the map information exists in the map tile corresponding to the area where the own vehicle exists, this step is determined to be "YES", and the process proceeds to step S504.

Step S504 is a step of determining whether or not the latest information is publicly disclosed with respect to the map information recorded on the map tile. In the case of Japan, public disclosure is, for example, map information released by the Geographical Information Authority of Japan in the Ministry of Land, Infrastructure, Transport and Tourism. Here, when the difference between the landmark coordinates in the map information stored in the server 3 and the landmark coordinates in the map information published by the Geographical Information Authority of Japan is a predetermined distance (for example, 10 cm) or more, it is determined that the latest information is publicly available. In addition to the map information provided by the Geospatial Information Authority of Japan, map information provided by a certain map vendor may also be used as public map information. Public disclosure may not be limited to disclosure by government agencies, but also include semi-public disclosure by designated map vendors. In addition, even when it is not made public, the difference between the coordinates of the landmarks in the map information stored in the server 3 and the coordinates of the measured landmarks is equal to or larger than a predetermined distance (for example, 10 cm) by the fixed point surveying instrument owned by the Geospatial Information Authority of Japan, or high-precision GPS positioning, and the like, it is determined that the latest information is publicly disclosed. In such a case, the determination in this step is "YES", and the process proceeds to step S505. The step S504 may be performed by either the vehicle or the server. The main processor 40 or the server processor 31 communicates with an external server managed by a map vendor or a government agency to determine whether or not the latest map information is published for the map tile in which the vehicle exists.

Step S505 is a step in which the main processor 40 sets the map tile corresponding to the area to be the "map exists but old" mode. Then, the process proceeds to step S503.

Step S503 is a step in which the main processor 40 sets the update flag to be "ON" for the map tile corresponding to the area. As for the map tile corresponding to the area where the update flag is set to "ON", the feature information is sequentially uploaded from the vehicle to the server 3, so that the map is updated preferentially. This flow ends through step S503.

When it is determined in step S504 that the latest information is not publicly disclosed with respect to the map information recorded in the map tile, this step becomes a NO determination and proceeds to step S506.

Step S506 is a step in which the main processor 40 downloads the map information of the map tile corresponding to the current position from the server 3.

Next, step S507 is executed. In step S507, the main processor 40 verifies the coordinates of the landmark 63 included in the map information downloaded from the server 3 with the coordinates of the landmark 63 calculated based on the image captured in real time, so that the position of the subject vehicle is identified (that is, localized).

Next, step S508 is executed. Step S508 is a step of determining whether or not the main processor 40 has detected a deviation in the coordinates of the own vehicle (hereinafter, also referred to as a positional deviation).

The position of the own vehicle specified based on the coordinates of the landmark 63 included in the map information downloaded from the server 3 and the relative coordinates of the landmark 63 with respect to the own vehicle position calculated from the image captured in real time by the camera 10 is referred to as the first position. On the other hand, the position of the own vehicle specified by using the GPS radio wave that does not depend on the map information stored in the server 3 is referred to as a second position. The means for calculating the coordinates of the landmark 63 in real time may not be limited to that by the camera 10, and for example, a radar or LiDAR may be used. Further, the means for identifying the position of the own vehicle without depending on the map information may not be limited to GPS, for example, odometry, dead reckoning, wireless LAN or short-range wireless communication, position identification using IMES radio waves, and geomagnetism may be adopted as an identifying means.

The detection of the deviation of the coordinates of the own vehicle means that, for example, it is detected that the deviation between the first position and the second position is equal to or greater than a predetermined distance. Alternatively, the detection of the deviation of the coordinates of the own vehicle indicates that a state in which the deviation between the first position and the second position is equal to or greater than a predetermined distance has occurred a predetermined numerical number of times. The numerical number of times and frequency of misalignments of the positioning correspond to index information (in other words, an error signal) indicating that the map data needs to be updated. In addition, the position misalignment corresponds to an event for transmitting index information (hereinafter referred to as a transmission event). The position deviation detection (in other words, the detection of the transmission event) may be performed by the main processor 40 itself or by another device (for example, the image processor 20). When another device detects it, the main processor 40 may detect that the position misalignment (in other words, a transmission event) has occurred by inputting a signal indicating that the position misalignment has occurred from the device.

Another example of detecting the coordinate deviation of the own vehicle may be a determination such that the deviation of the coordinates of the own vehicle is detected when the driver's steering intervention occurs with a predetermined amount or at a predetermined frequency while driving assistance such as automatic driving or lane keeping is executed using map information. A point where the driver's steering/deceleration operation intervenes when driving assistance such as automatic driving or lane keeping is being executed using map information is also defined as an inconsistence point. Similar to the steering intervention, the speed adjustment intervention such as depressing the brake pedal can also be adopted as a judgment index for the occurrence of position misalignment. The amount and frequency of operation interventions such as steering intervention and deceleration operation by the driver correspond to index information indicating that the map data needs to be updated. Further, the driver's operation intervention during automatic driving corresponds to an event for transmitting index information to the server 3.

When the position shift of the own vehicle is detected in step S508, the determination in this step is "YES" and the process proceeds to step S505. It may be configured such that the number of times the misalignment is detected is counted up, and when the number of times the misalignment is detected exceeds a predetermined threshold value, step S508 is determined to be "YES" and step S505 is executed.

As described above, step S505 is a step of setting the map tile corresponding to the area to the "map exists but old" mode, and then the update flag is set to "ON" through step S503. The state in which the position misalignment of the own vehicle is detected may be assumed to a situation in which the land form or the position of the landmark 63 has changed before the information is officially updated due to, for example, a natural disaster. By setting the update flag to "ON" through step S508, it may be possible to promote the update of the map information stored in the server 3 prior to the official map update.

On the other hand, when the position deviation of the subject vehicle is not detected, the determination in step S508 is "NO", and the process proceeds to step S509.

Step S509 is a step in which the main processor 40 sets the map tile corresponding to the area to be the "latest map exists" mode. Then, the process proceeds to step S510.

Step S510 is a step in which the main processor 40 sets the update flag to be "OFF" for the map tile corresponding to the area. Map tiles corresponding to areas where the update flag is set to "OFF" do not require the latest map update and can be actively used for driving support and the like. This flow ends through step S510. When the update flag is set to "OFF", the main processor 40 uploads vehicle behavior information without sending feature information such as lane line information as probe data. According to the configuration for uploading vehicle behavior information, the server 3 can detect the occurrence of traffic congestion and the like.

As described above, the main processor 40 sets one of the three modes of "no map" mode, "exists but old" mode and "the latest map exists" mode for the map tile corresponding to the area where the own vehicle exists, based on the predetermined conditions related to step S501, step S504, and step S508, and sets the update flag corresponding to each mode. For map tiles with "no map" mode and "map exists but old" mode, the update flag is set to "ON", so that the updating or generating map information included in the map tile can be executed preferentially.

In the above, the configuration for determining the necessity of updating the map data on the vehicle side has been disclosed, but the configuration may not be limited to this feature. The server 3 may determine whether or not the map data of each map tile needs to be updated based on the probe data from a plurality of vehicles. For example, when the main processor 40 detects a position misalignment or an occupant's operation intervention for the automatic driving of the vehicle in step S508, the processor 40 reports the detection to the server 3. Alternatively, a signal indicating that the update is necessary is transmitted to the server 3.

The server processor 31 sets the update flag of the map tile, in which the number of times the misalignment is detected exceeds a predetermined threshold value, to "ON". Then, the vehicle traveling in the area where the update flag is set to "ON" is requested to transmit the probe data including the feature information. Even with such a configuration, the map data can be updated quickly. The unit of updating the map data may not be limited to the map tile unit. The necessity of renewal may be managed for each road segment. For example, ON/OFF of the update flag may be set for each road segment.

Further, the map data generated/updated based on the probe data may be provisionally distributed to each vehicle as temporary map data. The provisionally distributed map is verified, for example, whether it can be used for automatic control in a plurality of vehicles. For example, the main processor 40 of each vehicle verifies the temporary map based on whether or not the position shift is detected when the position of the own vehicle is calculated using the temporary map data, whether or not the driver's operation intervention is performed, and so on. The tentative map data may be verified based on whether or not the traveling trajectory planned based on the image recognition result and the traveling track planned using the tentative map match. It may be preferable that the provisional map data is not used for actual automatic driving until the verification is completed and it becomes the official map data. As the method for verifying the provisional map data, the method described in Japanese Patent Application No. 2018-163077, which is separately applied for, may be used. When each vehicle determines that there is no difficulty as a result of verifying the provisional map data, it reports the determination to the server 3. When it is determined that the temporary map data has a difficulty, it notifies the server 3 of the difficulty. The server 3 finally determines whether there is a difficulty with the temporary map data based on the verification results of a plurality of vehicles, and when it is determined that there is no difficulty, the server 3 adopts the temporary map data as the official map. The map data adopted as the official map will be distributed to each vehicle. The vehicle to which the temporary map data has been distributed may be notified that the temporary map data is used as the official map data.

In the map system 1, the update flag indicating that the map information needs to be updated is set based on a predetermined condition determined in advance, so that it is possible to clearly distinguish whether or not the map information needs to be updated. It may be particularly effective when the coordinates of the landmark 63 suddenly change due to a natural disaster or the like.

[Countermeasure when a Landmark Cannot be Detected]

When identifying the position of the own vehicle, the map system 1 identifies the rough position of the own vehicle by positioning with a satellite such as GPS, and determines the detailed position of the own vehicle based on the map information downloaded from the server 3 and the coordinates of the landmark 63 calculated from the image captured in real time by the vehicle. However, there may be obstacles around the own vehicle that hinder the imaging of the landmark 63, and there may be situations in which the coordinates of the landmark 63 cannot be specified.

The map system 1 may control the behavior of the vehicle so that, when the own vehicle is in the above situation, there is at least one landmark 63 that is not obstructed by obstacles within the angle of view of the camera 10 that is an imaging device. Here, the operation flow of the map system 1 based on the technical idea will be described with reference to FIG. 13. Here, as an example, a camera 10 installed for photographing the environment in front of the vehicle will be described as an example. In addition to the camera 10 that monitors the front, a rear camera that is responsible for rear monitoring and a camera 10 that is responsible for side monitoring (that is, a left/right camera) may be arranged together. Further, the preceding vehicle will be described as an example of an obstacle blocking the landmark 63. Here, the obstacle may be a following vehicle corresponding to the rear monitoring camera 10 or a parallel running vehicle corresponding to the side monitoring camera 10. Objects other than vehicles may act as obstacles. As the peripheral monitoring sensor constituting the map system 1, a part or all of the front camera, the rear camera, and the side camera can be adopted. A rear camera that captures a predetermined rear range corresponds to a rear monitoring device.

Figure 13:
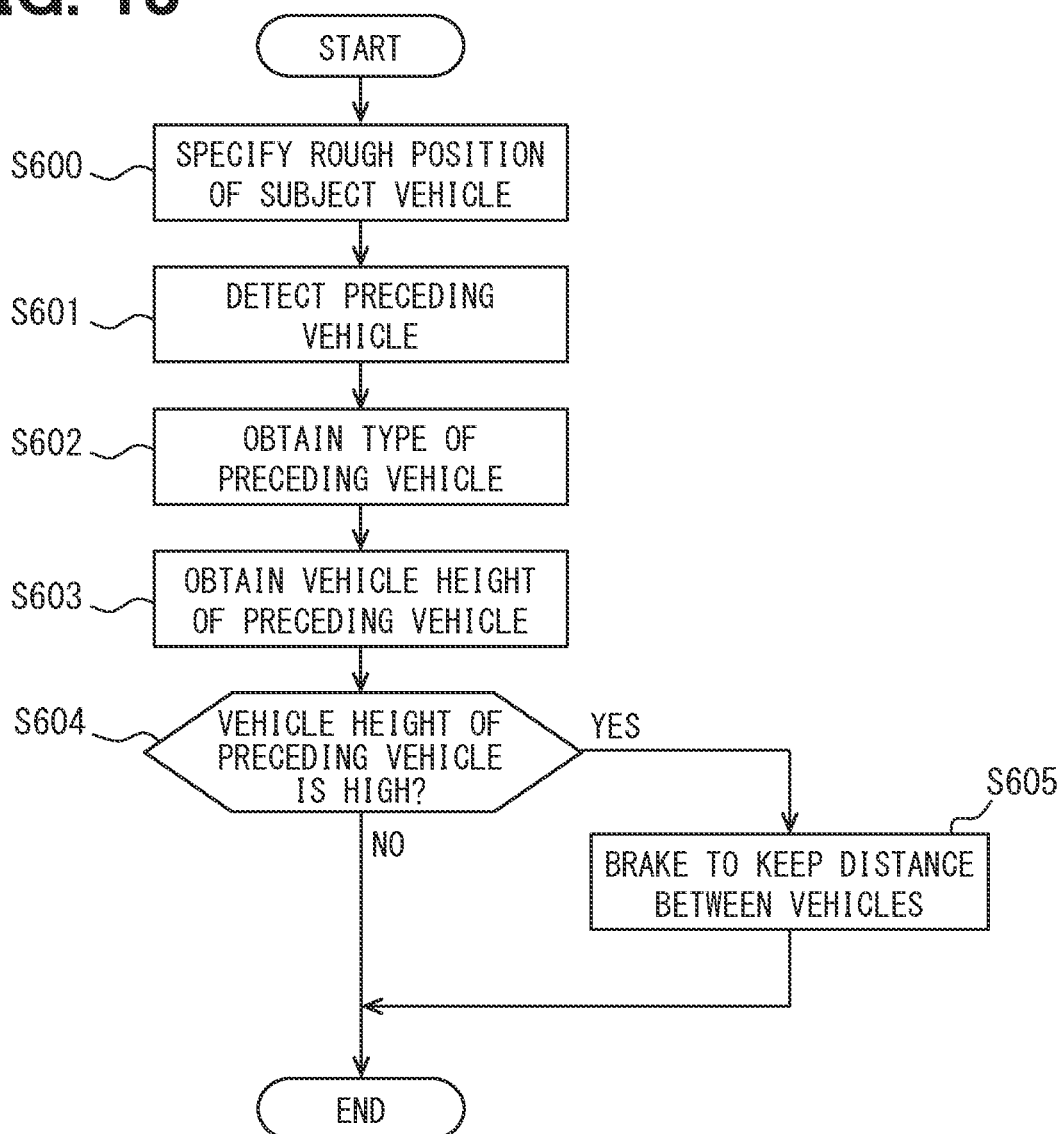
FIG. 13 is a flowchart showing an example of control executed by a main processor.

As shown in FIG. 13, first, step S600 is executed. Step S600 is a step in which the main processor 40 identifies a rough position of the own vehicle by GPS or the like. By this step, the area where the own vehicle exists is grasped.

Next, step S601 is executed. Step S601 is a step in which the main processor 40 detects the preceding vehicle based on the image captured by the camera 10.

Next, step S602 is executed. Step S602 is a step in which the main processor 40 acquires the vehicle type of the preceding vehicle. The vehicle type is recorded in a database stored in the memory 80 or the server 3, and the type is determined from the silhouette information of the target obtained from the image and the like.

Next, step S603 is executed. Step S603 is a step in which the main processor 40 acquires the vehicle height of the preceding vehicle that becomes an obstacle based on the vehicle type. The vehicle height information is linked to the vehicle type, and the vehicle height corresponding to the vehicle type of the preceding vehicle is acquired. The vehicle height information may be calculated from the captured image.

Next, step S604 is executed. Step S604 is a step in which the main processor 40 determines whether or not the preceding vehicle as an obstacle is a tall vehicle. In the determination of whether or not the preceding vehicle is a tall vehicle, for example, the vehicle height acquired in step S603 is compared with a predetermined threshold value, and when the vehicle height is higher than the threshold value, it is determined that the preceding vehicle is a tall vehicle. Alternatively, in another example, the vehicle type classified as a tall vehicle may be determined in advance, and when the preceding vehicle is the corresponding vehicle type, it may be determined to be a tall vehicle. When determining whether or not the vehicle is tall according to the vehicle type, step S603 for acquiring the vehicle height can be omitted. The vehicle type determined to be a tall vehicle includes, for example, a truck or a fire engine. When it is determined in step S604 that the preceding vehicle is a tall vehicle, the process proceeds to step S605.

Step S605 is a step in which the main processor 40 controls the actuator 70 to change the relative position between the own vehicle and the obstacle so that the landmark 63 can be recognized by the camera 10. Specifically, for example, the actuator 70 is a braking device, and the main processor 40 drives the braking device to brake the own vehicle. As a result, the distance between the own vehicle and the preceding vehicle, which is an obstacle, becomes large, and the area occupied by the preceding vehicle with respect to the angle of view becomes small. Therefore, since it is possible to realize a situation in which the landmark 63 such as a sign is easily reflected within the angle of view, the main processor 40 can recognize the landmark 63 and can calculate the coordinates of the landmark 63. When the preceding vehicle is a tall vehicle, the traffic light, the destination display, and the like are likely to be blocked by the preceding vehicle and the camera 10 cannot be recognized. Therefore, the detection frequency of the landmark 63 is improved by going through step S605. Along with this, the frequency of calculation of the coordinates of the landmark 63 from the image is also improved, so that the coordinates of the landmark 63 held by the map information can be checked for a longer period of time, and the position of the own vehicle can be specified more accurately. Control that increases the distance between the vehicle and the preceding vehicle by deceleration or the like corresponds to an example of vehicle control that makes it easier for the peripheral monitoring sensor to detect landmarks.

The actuator 70 controlled by the main processor 40 may not be limited to the braking device, and may be, for example, a steering operation. Specifically, when the preceding vehicle is a tall vehicle, the main processor 40 may control the steering to change lanes to create a situation in which there is no preceding vehicle that becomes an obstacle in front of the own vehicle.

After step S605, this flow ends. Further, in step S604, when it is determined that the preceding vehicle is not a tall vehicle, this flow is similarly terminated.

By adopting the above configuration, the map system 1 also improves the calculation frequency of the coordinates of the landmark 63 from the image, so that it is possible to verify with the coordinates of the landmark 63 held by the map information for a longer period of time so that the position of the own vehicle can be specified more accurately.

[Countermeasure when Landmark Cannot be Detected (Modification Example)]

In the above, an example of acquiring the vehicle type of the preceding vehicle, which is an obstacle, and controlling the vehicle based on the vehicle type has been described. As another aspect, the map system 1 may control the vehicle so that the landmark 63 can be recognized based on the inter-vehicle distance measured in real time and the vehicle height calculated by image recognition. An operation example of the map system 1 based on the technical idea will be described with reference to FIGS. 14 to 16. Here, a camera 10 installed for capturing an image of the environment in front of the vehicle will be described as an example. In addition to the camera 10 that monitors the front, the camera 10 that is responsible for rear monitoring and side monitoring may coexist. Further, the preceding vehicle will be described as an example of an obstacle blocking the landmark 63. Here, the obstacle may be a following vehicle corresponding to the rear monitoring camera 10 or a parallel running vehicle corresponding to the side monitoring camera 10. Obstacles may also be objects other than vehicles.

Figure 14:
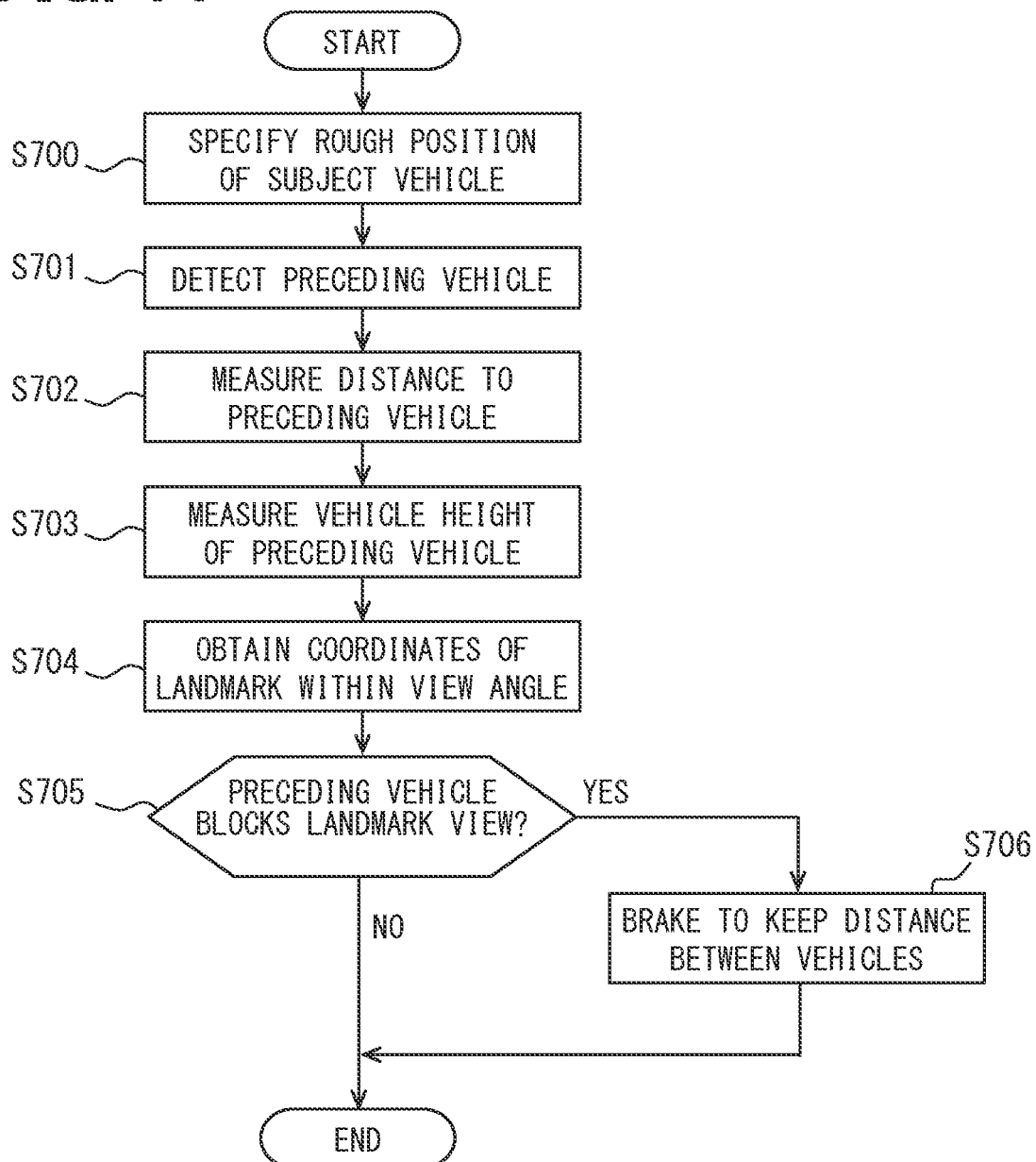
FIG. 14 is a flowchart showing an example of control executed by a main processor.

As shown in FIG. 14, first, step S700 is executed. Step S700 is a step in which the main processor 40 identifies a rough position of the own vehicle by GPS or the like. By this step, the area where the own vehicle exists is grasped.

Next, step S701 is executed. Step S701 is a step in which the main processor 40 detects the preceding vehicle based on the image captured by the camera 10.

Next, step S702 is executed. Step S702 is a step in which the main processor 40 measures the distance to the preceding vehicle, that is, the inter-vehicle distance. The inter-vehicle distance can be measured by radar, LIDAR, or a fusion configuration of them and an imaging device.

Next, step S703 is executed. Step S703 is a step in which the main processor 40 measures the height of the preceding vehicle. The height of the preceding vehicle is uniquely measured based on the distance to the preceding vehicle acquired in step S702 and the V-direction coordinates on the image of the upper end of the preceding vehicle projected in the image captured by the camera 10.

Next, step S704 is executed. Step S704 is a step in which the main processor 40 acquires the coordinates of the landmark 63 that is assumed to exist within the angle of view from the map information. The main processor 40 identifies the area where the vehicle exists from the rough position of the own vehicle specified in step S700, and reads the map tile corresponding to the area. Then, the coordinates of the landmark 63 recorded on the map tile are acquired. Here, the landmark 63 includes a white line (in other words, a lane mark). Alternatively, it may be more effective when it is a target that is difficult to image with the camera 10 due to the large size of the preceding vehicle, and it may be more effective for a traffic light or a destination indication, a speed limit sign, etc. The coordinates of the landmark 63 include the coordinate information of the four corners forming the rectangle, for example, when the landmark 63 has a rectangular plate shape orthogonal to the traveling direction of the vehicle.

Figure 15:
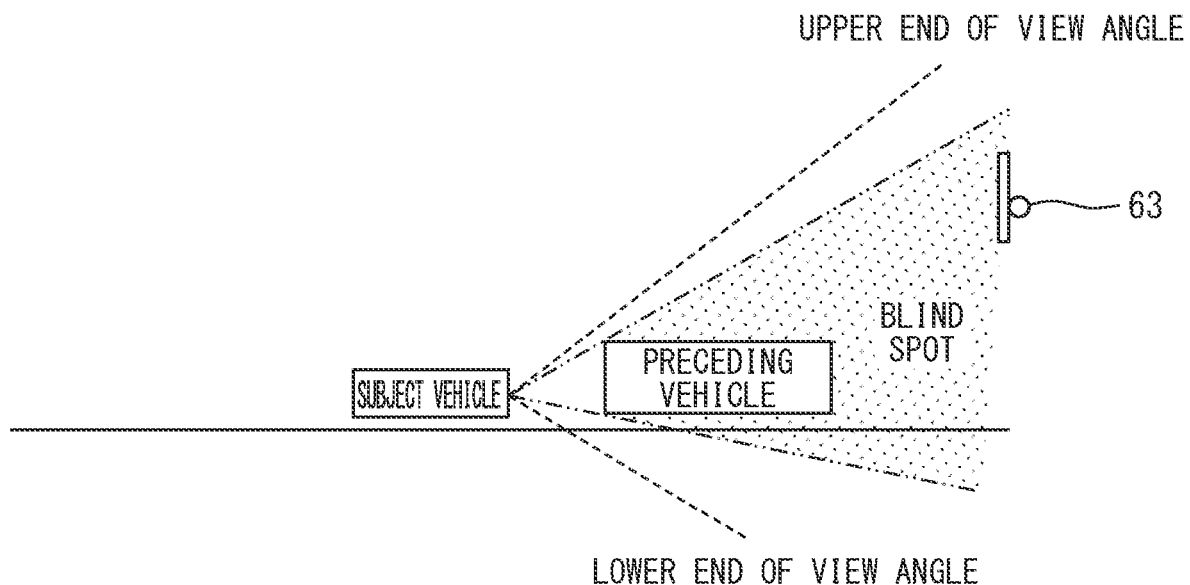
FIG. 15 is a diagram showing a blind spot when the distance between the own vehicle and the preceding vehicle is short.

Next, step S705 is executed. Step S705 is a step of determining whether or not the preceding vehicle exists at a position that blocks the landmark 63 that would be disposed within the angle of view. As shown in FIG. 15, a portion (the hatched portion in FIG. 15) that becomes a blind spot of the camera 10 is determined based on the inter-vehicle distance acquired in step S702, the vehicle height of the preceding vehicle acquired in step S703, and the angle of view of the camera 10 mounted on the own vehicle. When the blind spot includes at least a part of the coordinates constituting the landmark 63, it is determined that the preceding vehicle blocks the landmark 63, and this step is a "YES" determination. The example shown in FIG. 15 is an example in which all the landmarks 63 are included in the blind spots created by the preceding vehicle, and this step is a "YES" determination.

When the determination in step S705 is "YES", the process proceeds to step S706. Step S706 is a step in which the main processor 40 controls the actuator 70 to change the relative position between the own vehicle and the obstacle so that the landmark 63 can be recognized by the camera 10. Specifically, for example, the actuator 70 is a braking device, and the main processor 40 drives the braking device to brake the own vehicle.

Figure 16:
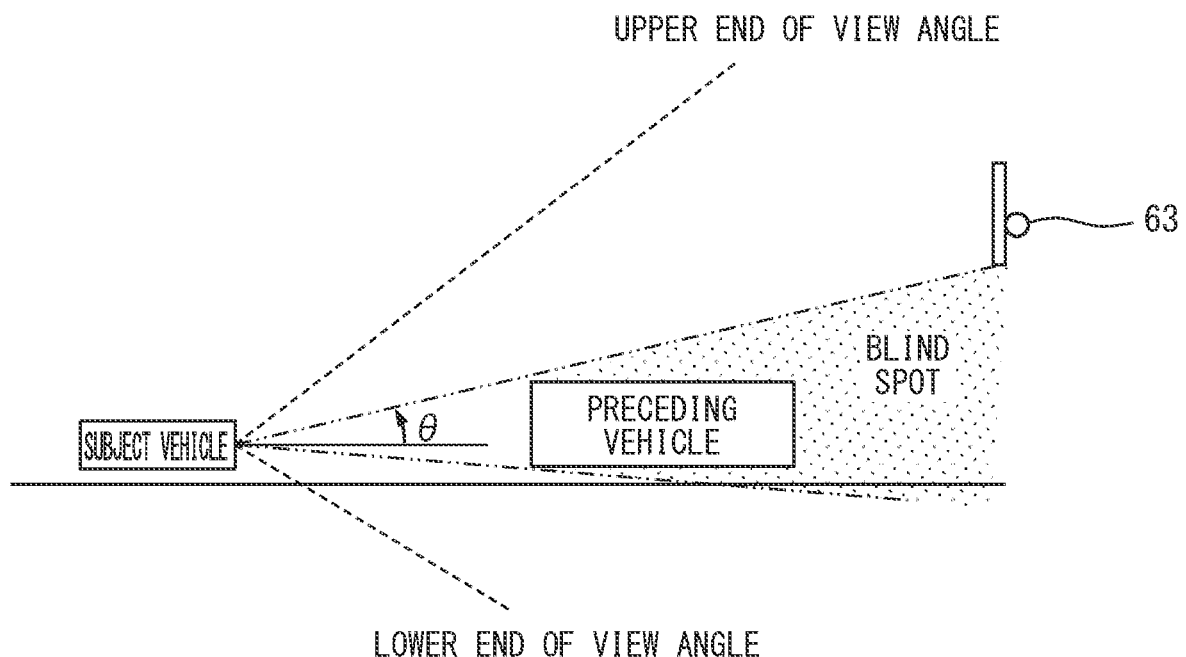
FIG. 16 is a diagram showing a blind spot when the distance between the own vehicle and the preceding vehicle is relatively long.

As shown in FIG. 16, the main processor 40 increases the inter-vehicle distance between the own vehicle and the preceding vehicle so that the landmark 63 is completely removed from the blind spot portion by this braking. Specifically, the vehicle is braked until the vehicle has the inter-vehicle distance such that everything from the upper end to the lower end of the landmark 63 can be visually recognized above the upper end of the preceding vehicle. As will be described later, it may be also possible to brake until a part of the landmark 63 can be visually recognized. As a result, the main processor 40 can recognize the landmark 63, and the coordinates of the landmark 63 can be calculated based on the image.

In the map system 1, the landmark 63 can be easily recognized without acquiring the vehicle type. This is particularly effective when sufficient time for acquiring the vehicle type of the preceding vehicle cannot be secured due to a sudden interruption or the like, or when an obstacle other than the vehicle suddenly jumps in front of the vehicle.

The actuator 70 controlled by the main processor 40 may not be limited to the braking device, and may be, for example, a steering operation. Specifically, when the preceding vehicle is a tall vehicle, the main processor 40 may control the steering to change lanes to create a situation in which there is no preceding vehicle that becomes an obstacle in front of the own vehicle. Various controls such as deceleration, lane change, and position change in the lane can be adopted as vehicle control (hereinafter, detection rate improvement control) for facilitating the detection of landmarks by the peripheral monitoring sensor. The detection rate improvement control corresponds to the control for reducing the possibility that the landmark cannot be recognized continuously.

Further, an example of determining that the preceding vehicle is blocking the landmark 63 when the blind spot of the preceding vehicle includes a part of the landmark 63 has been described. Alternatively, even when a part of the landmark 63 can be visually recognized outside the blind spot, it may be determined that the preceding vehicle does not block the landmark 63. Alternatively, these determination criteria may be variable depending on the type of landmark 63.

When the own vehicle is equipped with a plurality of peripheral monitoring sensors and at least one of the plurality of peripheral monitoring sensors can capture the landmark, the vehicle control for facilitating the peripheral monitoring sensor to detect the landmark easily may not be carried out. For example, even when the preceding vehicle is a tall vehicle or the preceding vehicle is located at a position that blocks the landmark in front of the own vehicle, in a case where the landmark behind the vehicle can be imaged by the rear camera, it may be configured not to carry out vehicle control such as expansion of inter-vehicle distance or lane change.

Further, the case of implementing the detection rate improvement control may not be limited to the case where the preceding vehicle is a tall vehicle or the case where the landmark in front of the own vehicle is blocked by the preceding vehicle. More specifically, it may be configured to execute the detection rate improvement control when the inter-vehicle distance to the preceding vehicle is less than a predetermined distance (for example, 20 meters). This configuration corresponds to a configuration in which detection rate improvement control is executed when a preceding vehicle as an obstacle exists in a predetermined region (here, an region within 20 meters in front of the vehicle) within the imaging range of the camera 10. Further, when the angle formed by the straight line from the camera 10 toward the upper end of the rear surface of the preceding vehicle with respect to the road surface (hereinafter, the looking-up angle θ) is equal to or higher than a predetermined threshold value (for example, 15 degrees), the detection rate improvement control such as deceleration or the like may be performed. When the ratio occupied by the portion corresponding to the preceding vehicle in the image frame is equal to or more than a predetermined threshold value (for example, 30% or more), the detection rate improvement control such as deceleration may be executed.

In addition, in a case where the vehicle is traveling in a section where the landmark should be observed, when the landmark detection fails for a predetermined number of times (for example, 5 times) or for a predetermined time interval (for example, 3 seconds) continuously, it may be configured to execute the detection rate improvement control. Further, it may be configured to execute the detection rate improvement control when the detection success rate for the landmark that should be originally observed becomes less than a predetermined threshold value. The detection success rate may be expressed by the ratio of the number of attempts to detect the landmark within a certain period of time to the number of successful detections.

The conditions for executing the detection rate improvement control can be changed as appropriate. In addition, the main processor 40 may be configured to acquire the current position of the other vehicle and the peripheral image acquired by the other vehicle from the other vehicle by vehicle-to-vehicle communication as the detection rate improvement control. According to such a configuration, the main processor 40 can detect landmarks based on peripheral images provided by other vehicles. In addition, the own vehicle can be indirectly localized based on the position information of the landmark, the position information of the other vehicle, and the relative position of the own vehicle with respect to the other vehicle.

Further, the main processor 40 may be configured to acquire the localization result (that is, detailed position information of the other vehicle) of the other vehicle (for example, the preceding vehicle) by vehicle-to-vehicle communication as the detection rate improvement control.

According to such a configuration, the main processor 40 indirectly localizes the subject vehicle based on the detailed position information of the other vehicle (hereinafter referred to as the reference vehicle) that provides the localization result as a provision source and the relative position of the own vehicle with respect to the reference vehicle. The relative position of the own vehicle with respect to the reference vehicle may be specified based on the detection result of the peripheral monitoring sensor such as the camera 10.

Further, the main processor 40 normally performs localization using landmarks existing in front of the own vehicle (in other words, using a front camera image). On the other hand, when the field of view of the front camera is obstructed by the preceding vehicle, the localization may be performed using the image of the rear camera as the rear monitoring device. That is, as the detection rate improvement control, the peripheral monitoring sensor used for detecting the landmark may be changed. Changing the number and combination of peripheral monitoring sensors used to detect landmarks is also an example of detection rate improvement control.

The above control may be configured to be executed on condition that the own vehicle is traveling on a predetermined road (for example, a general road). On general roads, the distance between vehicles and other vehicles is shorter than when driving on highways, and therefore, it may be difficult to view landmarks. Therefore, the above control may be more useful when driving on a general road than when driving on a highway. Further, from the opposite viewpoint, the main processor 40 may be configured not to execute the above control when the traveling road corresponds to a predetermined road type (for example, an automobile-only road). It may be low possibility that other vehicles will make it difficult to detect landmarks while driving on motorways such as highways. The load on the main processor 40 can be reduced by canceling the detection rate improvement control while traveling on the motorway.

In addition, the main processor 40 may be configured to set the ACC distance longer when the map utilization function is enabled than when the map utilization function is not enabled. According to this configuration, the risk of difficulty in detecting landmarks can be further reduced.

[Operations in Dark Environment Such as at Night]

The situation in which the coordinates of the landmark 63 are difficult to specify may not be limited to the case where there is an obstacle in the vicinity of the own vehicle that obstructs the imaging of the landmark 63. For example, even when the surrounding environment of the vehicle is relatively dark, such as in a tunnel or at night, it may be difficult for the camera 10 to detect the landmark 63 and calculate the coordinates.

The map system 1 may be configured to facilitate the detection of landmarks 63 and the calculation of coordinates even when the surrounding environment of the vehicle is relatively dark, and thus to more accurately identify the position of the own vehicle.

Hereinafter, the operation of the map system 1 based on such a technical idea will be described with reference to FIG. 17. Here, as an example, the control of a headlight installed to irradiate the illumination light in front of the vehicle will be described as an example. In addition to the light that illuminates the front of the vehicle, the light that illuminates the rear of the vehicle and the side of the vehicle may coexist, and the object of control may be the light that illuminates the rear of the vehicle and the side of the vehicle.

Figure 17:
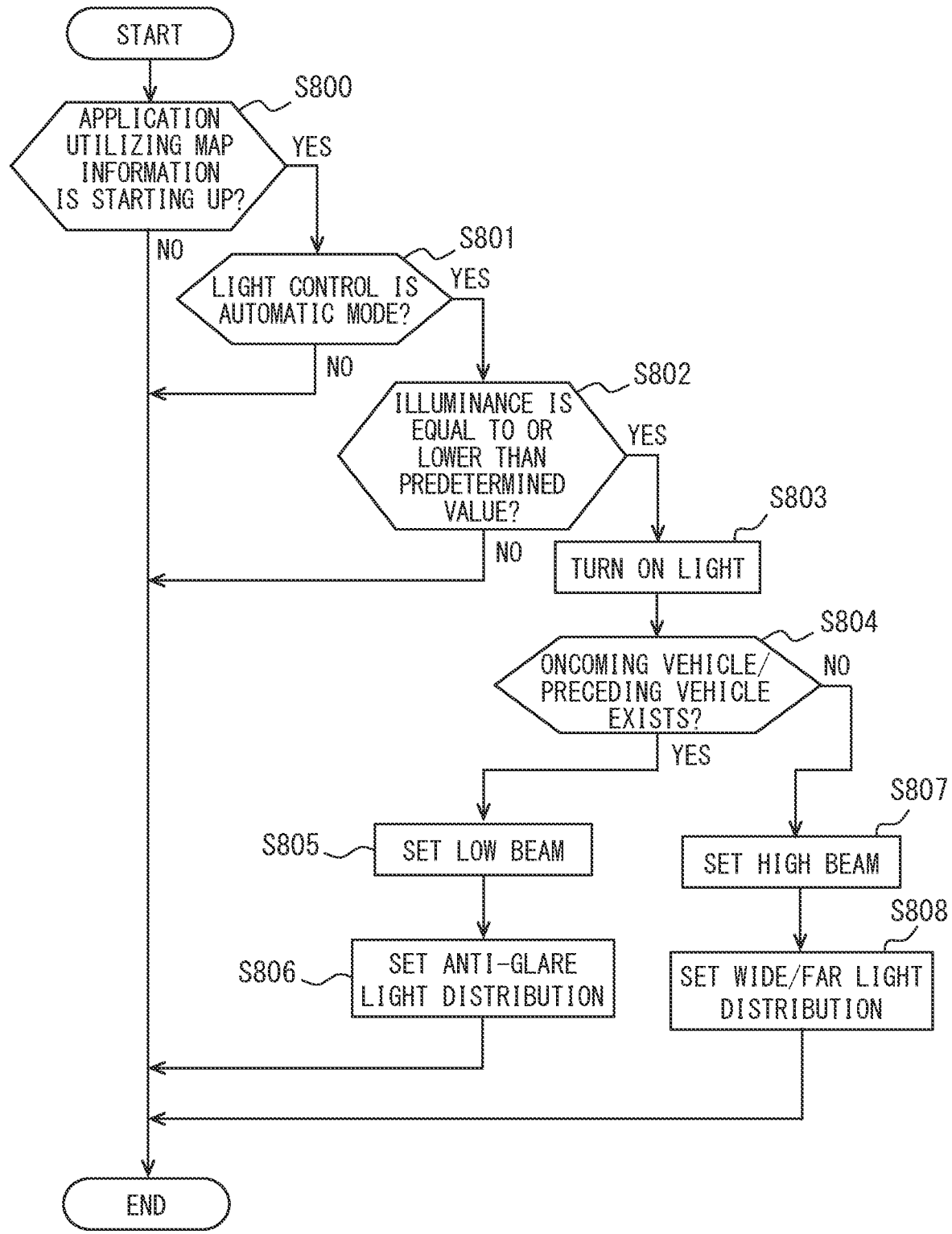
FIG. 17 is a flowchart showing an example of control executed by a main processor.

As shown in FIG. 17, first, step S800 is executed. Step S800 is a step of determining whether or not an application that uses map information is being started. The application that uses the map information is, for example, automatic steering realized by checking the coordinates of the landmark 63 calculated based on the image with the map information and specifying the position of the own vehicle. When the application that uses the map information is not executed, this step is judged as "NO", and this flow ends. When the application is executed, this step is determined to be "YES", and the process proceeds to step S801.

Step S801 is a step of determining whether or not the control of the headlight in the vehicle is set to the automatic mode. The automatic mode is set to a state in which light distribution control such as up/down or left/right of the headlight is automatically set, for example, an active high beam system (AHS). When the headlight control is in the manual mode, this step is judged as "NO" and this flow ends. On the other hand, when the headlight control is in the automatic mode, this step is a YES determination and the process proceeds to step S802.

Step S802 is a step in which the main processor 40 determines whether or not the brightness of the surrounding environment of the vehicle is equal to or less than a predetermined threshold value. Specifically, the illuminance detected by the illuminance sensor mounted on the vehicle is compared with a predetermined threshold value. When the illuminance is larger than the threshold value, it is determined that it is not always necessary to turn on the headlights, so that this step is determined to be "NO" and the present flow ends. On the other hand, when the illuminance is equal to or less than the threshold value, the process proceeds to step S803 to turn on the headlight.

Next, step S804 is executed. Step S804 is a step in which the main processor 40 determines whether or not there is a preceding vehicle or an oncoming vehicle with respect to the own vehicle. For example, the presence of the preceding vehicle is recognized by detecting the light of the rear light from the image captured by the camera 10. Alternatively, the presence of the preceding vehicle is recognized by the fusion configuration of the camera 10 and the radar or LIDAR. Further, the presence of the oncoming vehicle is recognized by detecting the light of the headlight from the image captured by the camera 10, for example. Alternatively, the presence of the oncoming vehicle is recognized by the fusion configuration of the camera 10 and the radar or LIDAR.

When the presence of an oncoming vehicle or a preceding vehicle is detected in step S804, this step is determined to be "YES" and the process proceeds to step S805. Step S805 is a step of setting the irradiation mode of the headlight to the low beam. In the low beam mode, in order to suppress the glare of the driver of the preceding vehicle or the oncoming vehicle, the irradiation direction of the head light is controlled such that the headlights are irradiated so as not to directly irradiate the corresponding vehicle at least in the direction in which the preceding vehicle or the oncoming vehicle exists.

Figure 18:
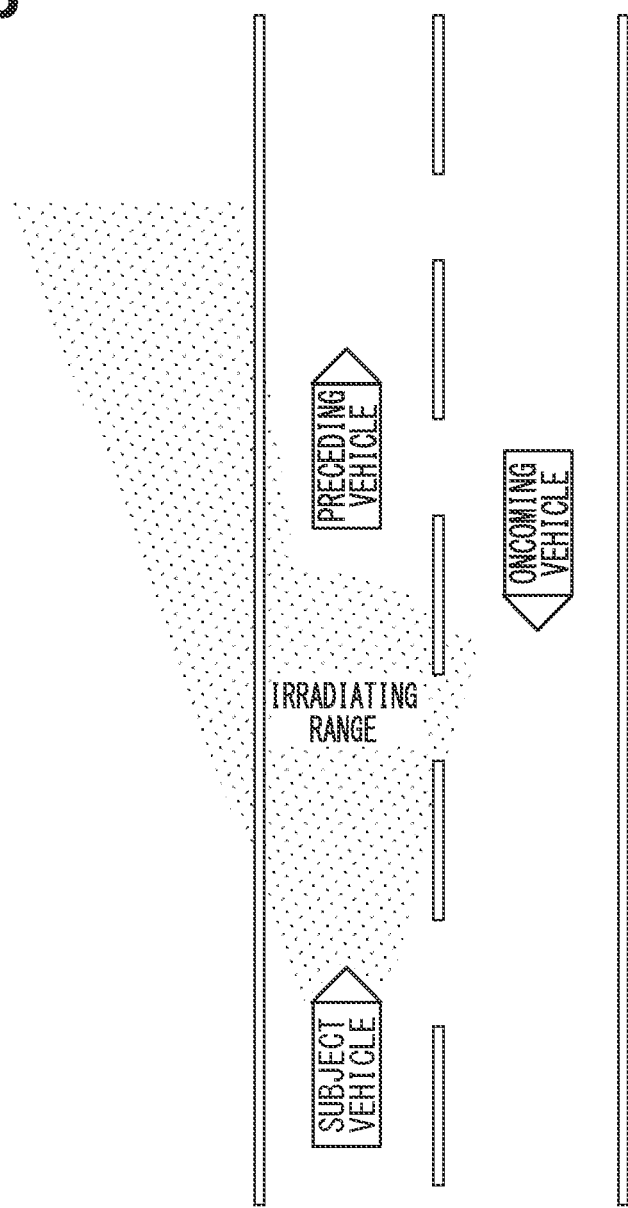
FIG. 18 is a diagram showing a light distribution state in antiglare light distribution.

After that, step S806 is executed. Step S806 is a step in which the main processor 40 controls the light distribution of the headlights so as to selectively irradiate the illumination light in the direction in which the landmark 63 is assumed to be present. As an example, as shown in FIG. 18, it is assumed that a preceding vehicle and an oncoming vehicle exist on an oncoming two-lane road traveling on the left side. At this time, the main processor 40 controls the headlight, which is the actuator 70, to maintain the headlight on the right side of the vehicle with a low beam so that the oncoming lane side in which the oncoming vehicle travels is not excessively irradiated with the illumination light. On the other hand, the light distribution of some light sources of the headlights on the left side of the vehicle is controlled so that the preceding vehicle is not excessively illuminated, and the low beam is maintained for the irradiation around the preceding vehicle. Further, the light distribution of a part of the light source of the headlight on the left side of the vehicle is controlled to be high beam so that the illumination light of the headlight is irradiated outside the lane where the mark 63 should be present, that is, outside the lane including the road shoulder on the lane side on which the own vehicle travels. As a result, it is possible to irradiate the illumination light of the headlight in the direction in which the presence of the landmark 63 is assumed while suppressing the glare of the driver of the oncoming vehicle or the preceding vehicle. According to this, the detection frequency of the landmark 63 is increased, and the calculation frequency of the coordinates of the landmark 63 from the image is also improved. Therefore, it is possible to collate with the coordinates of the landmark 63 held by the map information for a longer period of time, so that the position of the own vehicle can be specified more accurately.

When the presence of an oncoming vehicle or a preceding vehicle is not detected in step S804, this step is determined to be "NO" and the process proceeds to step S807. Step S807 is a step of setting the irradiation mode of the headlight to the high beam. In the high beam mode, since there are no preceding vehicles or oncoming vehicles around the own vehicle, the headlight irradiation direction is adjusted so that a distant field can be visually recognized.

After that, step S808 is executed. Step S808 is a step in which the main processor 40 controls the light distribution of the headlights so as to selectively irradiate the illumination light in the direction in which the landmark 63 is assumed to be present. In this step, for example, wide light distribution or distant light distribution can be adopted for the light distribution of the headlights. The wide light distribution is a light distribution mode that illuminates a wider area than the irradiation range in the left-right direction in the high beam or the high beam. As a result, the landmark 63 outside the lane including the road shoulder can be detected more easily. Further, the distant light distribution is a light distribution mode in which the illumination light is concentrated farther than the high beam and reaches the distant area when traveling at high speed. As a result, the landmark 63 such as the destination sign can be detected more easily even when traveling at high speed.

In the above map system 1, an example of implementing a light distribution that is easy to detect the landmark 63 is described on the condition that the light control is in the automatic mode. Alternatively, in a case where the light control may not be automatic and the driver operates the light, when the headlights are set to low beam and the illuminance of the environment around the vehicle is below a predetermined threshold, the map system 1 suggests the driver to change the light distribution of the headlights to high beam. Proposals for changing the light distribution can be made by, for example, displaying it on the HMI 60 or transmitting it by a voice message.

At night, it may be difficult to recognize landmarks that are not provided with lighting or the like from the captured image of the camera 10. Therefore, during the daytime, localization is performed based on various landmarks, while at night, it may be preferable that the landmarks used for localization are limited to internal lighting signs, signs with street lights and other lights arranged nearby, traffic lights, and electric bulletin boards and the like. An internally illuminated sign refers to a sign in which a light source is provided inside a sign board. It may be preferable that the map data includes whether or not it can be detected even at night as the attribute information of the landmark. Whether or not it can be detected even at night may be set based on the probe data at night. For example, a landmark detected with a predetermined probability in probe data collected at night may be set as a landmark that can be recognized even at night.

[Method for Downloading Map Tiles]

The download of the map information from the server 3 needs to be executed within the limited communication band between the server 3 and the vehicle, and efficient communication is required. Here, a map system 1 that can efficiently and completely download map tiles related to the download of map information will be described.

This map system 1 realizes the download of map tiles in different flows depending on whether or not the destination to which the vehicle travels is set. Hereinafter, the case where the destination is not set and the case where the destination is set will be described.

<Destination is not Set>

Figure 19:
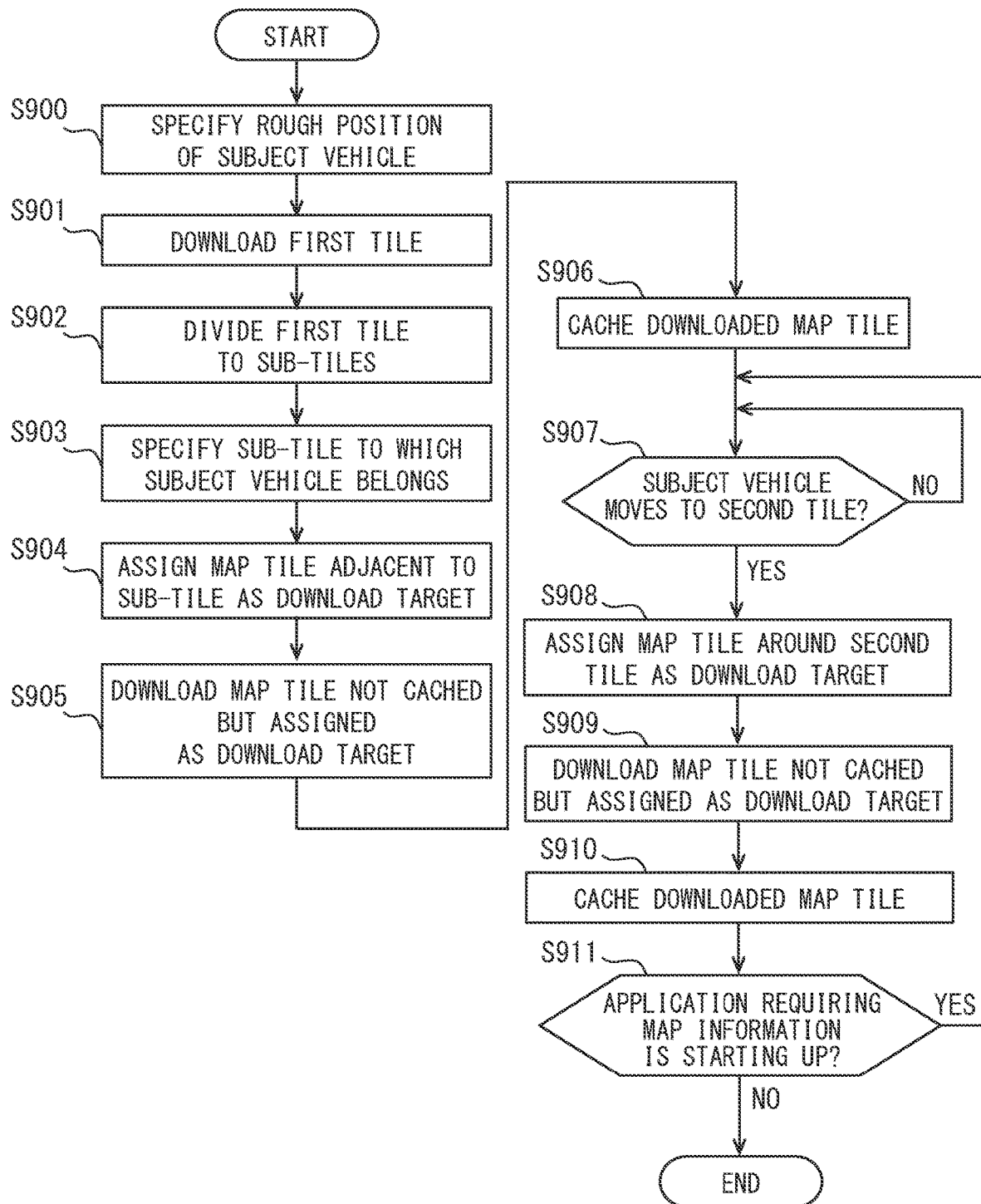
FIG. 19 is a flowchart showing an example of control when a destination is not set.

A specific flow will be described with reference to FIGS. 19 and 20. As shown in FIG. 19, first, step S900 is executed. Step S900 is a step in which the main processor 40 identifies a rough position of the own vehicle by GPS or the like. By this step, the area where the own vehicle exists is grasped. The series of processes illustrated in FIG. 19 may be started with the turning on of the traveling power source as a trigger. In addition, the series of processes illustrated in FIG. 19 may be started when the map utilization function or the automatic driving function is activated.

Next, step S901 is executed. Step S901 is a step in which the main processor 40 downloads the map tile corresponding to the area where the own vehicle exists. The main processor 40 requests the server 3 to distribute the map data of the map tile corresponding to the position of the own vehicle. For example, the main processor 40 transmits the tile ID of the area, to which the own vehicle position belongs, to the server 3. The server 3 delivers the map tiles requested by the vehicle. When the server 3 does not have the map data of the requested area (for example, when the expiration date has expired), the server 3 returns a signal indicating that it does not have the map data of the requested area. For example, a signal in which an invalid value (for example, "Null") is set at a predetermined position in the data format is returned.

Here, as an example, the map data may not exist in the memory 80 when the running power is turned on. In the configuration in which the map data is left in the memory 80, step S901 may be omitted when the map tile corresponding to the area where the own vehicle exists is stored in the memory 80. Further, here, as an example, necessary map data is specified from the vehicle side and requested to the server 3. Alternatively, the distribution mode of the map data may not be limited to this mode. The vehicle may be configured to transmit the current position to the server 3, and the server 3 determines map data corresponding to the reported vehicle position and distributes the map data to the vehicle.

Figure 20:
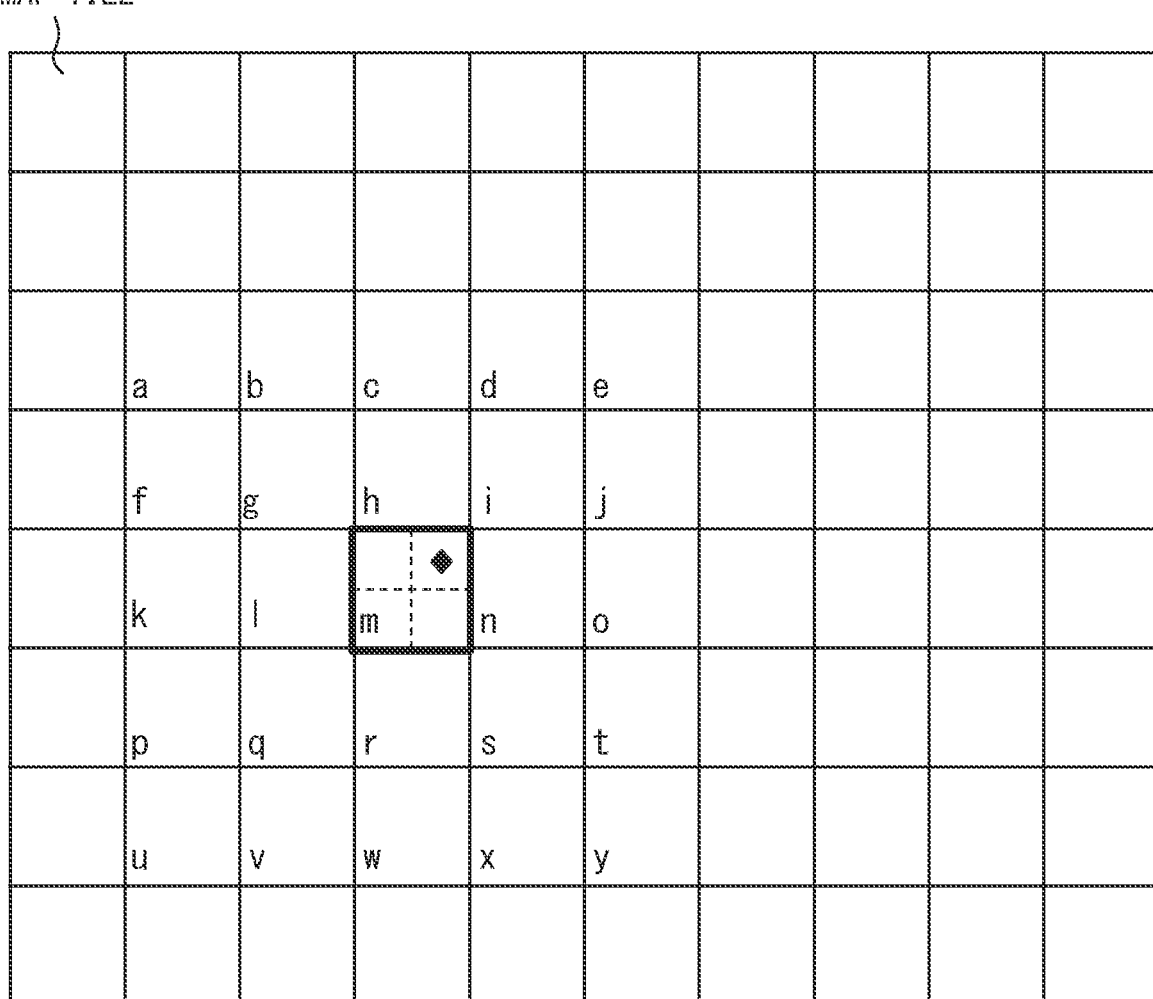
FIG. 20 is a diagram showing an example of a map tile as a download target.

FIG. 20 shows an example of map tiles. In FIG. 20, 80 map tiles are shown. A unique ID is assigned to each of the map tiles stored in the server 3, but here, for convenience, 25 map tiles are assigned serial codes a to y. Here, when the rough position of the own vehicle specified in step S900 is the rhombus shown in FIG. 20, the map tile defined as m corresponds to the first tile. Hereinafter, the map tile corresponding to the area where the own vehicle exists is particularly referred to as the first tile.

Next, step S902 is executed. Step S902 is a step in which the main processor 40 divides the first tile into sub tiles. As shown in FIG. 20, the main processor 40 is set to divide the map tile m, which is the first tile, into four square regions and execute the subsequent processing.

Next, step S903 is executed. Step S903 is a step in which the main processor 40 identifies the sub tile to which the own vehicle belongs from among the plurality of sub tiles. In the example shown in FIG. 20, the own vehicle belongs to the upper right sub tile in the divided map tile m.

Next, step S904 is executed. Step S904 is a step of designating a map tile adjacent to the sub tile to which the own vehicle belongs as a download target. In the example shown in FIG. 20, the first tile is the map tile m, and the sub tile to which the own vehicle belongs is the sub tile located in the upper right. Therefore, the map tiles designated as download targets in step S904 are the map tiles h, i, and N. The map tile adjacent to the sub tile corresponds to a candidate for the map tile that can be moved next when the vehicle moves across the map tile. In other words, the map tile adjacent to the sub tile corresponds to the map tile that the vehicle may pass through. From one viewpoint, a map tile existing at a position where a vehicle can enter within a predetermined time (for example, 0.5 hours) may correspond to a map tile in which a vehicle is relatively likely to pass. In addition, map tiles that exist within a predetermined distance from the current position of the vehicle may also be map tiles that the vehicle may pass through.

Next, step S905 is executed. Step S905 is a step of downloading a map tile that is designated as a download target and is not cached in the memory 80 (that is, has not been acquired). As described above, the map tiles h, i, and n correspond to the download targets. When any of these has already been downloaded and stored in the memory 80, the corresponding map tile is not downloaded.

Next, step S906 is executed. Step S906 is a step of caching the downloaded map tiles in the memory 80. The cached map tile can be used without downloading as long as the corresponding data remains in the memory 80.

Next, step S907 is executed. Step S907 is a step of determining whether or not the own vehicle has moved to a second tile different from the first tile. For example, when the vehicle moves from the map tile m to the map tile i, this step is determined to be "YES". In this example, the map tile i corresponds to the second tile. When the vehicle continues to exist in the first tile, the process of step S907 is continued. When the determination in this step is "YES", the process proceeds to step S908.

Step S908 is a step of designating the map tiles around the second tile as the download target. When the vehicle moves from map tile m to map tile i, the second tile is map tile i, and the map tiles specified to be downloaded are eight map tiles c, d, e, h, j, m, n, and o.

Next, step S909 is executed. Step S909 is a step of downloading a map tile that is designated as a download target and is not cached in the memory 80. As mentioned above, eight map tiles c, d, e, h, j, m, n and o are download targets, but the map tiles h, m and n were already downloaded and cached in the previous step, and therefore, they will not be downloaded. That is, the number of map tiles to be downloaded in step S909 is substantially five. Then, as long as the vehicle is continuously running after the first tile is set, the maximum number of map tiles to be downloaded after moving to the second tile is five in all situations. That is, even if all the map tiles around the map tile to which the vehicle is disposed are not downloaded, when at most five map tiles are downloaded, it is possible to surely acquire information on the map tiles that the subject vehicle is expected to move next.

Next, step S310 is executed. Step S310 is a step of caching the downloaded map tiles in the memory 80. The cached map tile can be used without downloading as long as the corresponding data remains in the memory 80.

Next, step S311 is executed. Step S310 is a step in which the main processor 40 determines whether or not an application that requires map information is being executed. An application that requires map information is an application related to map utilization, such as automatic steering control while specifying the position of the own vehicle. While the application that requires map information is activating, it is necessary to continue to download the map tile at the destination where the vehicle is traveling, and the flow from step S907 to step S311 is repeated. That is, the map tiles around the destination map tile are set as download candidates, and the uncached map tiles are continuously downloaded. On the other hand, when the application that utilizes the map information is stopped and the application is not activated at the time of executing step S311, this flow ends.

In the above example, an example is described such that the vehicle moves from the initial sub tile in the first tile to which the vehicle is disposed initially to the second tile directly without moving to another sub tile in the first tile. Alternatively, another example will also be briefly described.

For example, the map tile m is the first tile, and the vehicle existing in the upper right sub tile has moved to the lower right sub tile of the same first tile. In this case, in step S904, the map tiles as download targets are the map tiles h, i, and n when the vehicle is located in the upper right sub tile, and the map tiles n, r, and s when the vehicle moves to the lower right sub tile. When the vehicle subsequently moves to the map tile r, the map tiles to be downloaded in step S909 are five map tiles I, q, v, w, and x.

As described above, by adopting the map system 1 of the present disclosure, it is possible to comprehensively download the map tiles corresponding to the area where the vehicle is expected to travel with the minimum number of downloads. In the above configuration, as a download policy when the destination is not set after the power for driving the vehicle is turned on, three map tiles adjacent to the sub tile to which the own vehicle belongs among the sub tiles obtained by dividing the first tile into four and the first tile are set as the download targets. The above process related to map download may be triggered by the activation of the automatic driving function or the activation of the map utilization function based on the user input to the HMI 60 after the driving power source is turned on. The first tile, on one aspect, is a map tile that corresponds to the position of the vehicle at the time the running power is turned on. In another aspect, the first tile corresponds to the map tile to which the vehicle position belongs at the time when the automatic driving function is activated or when the map utilization function is activated.

<Case where Destination is Set>

Next, the flowchart when the destination is set will be specifically described with reference to FIGS. 21 and 22.

Figure 21:
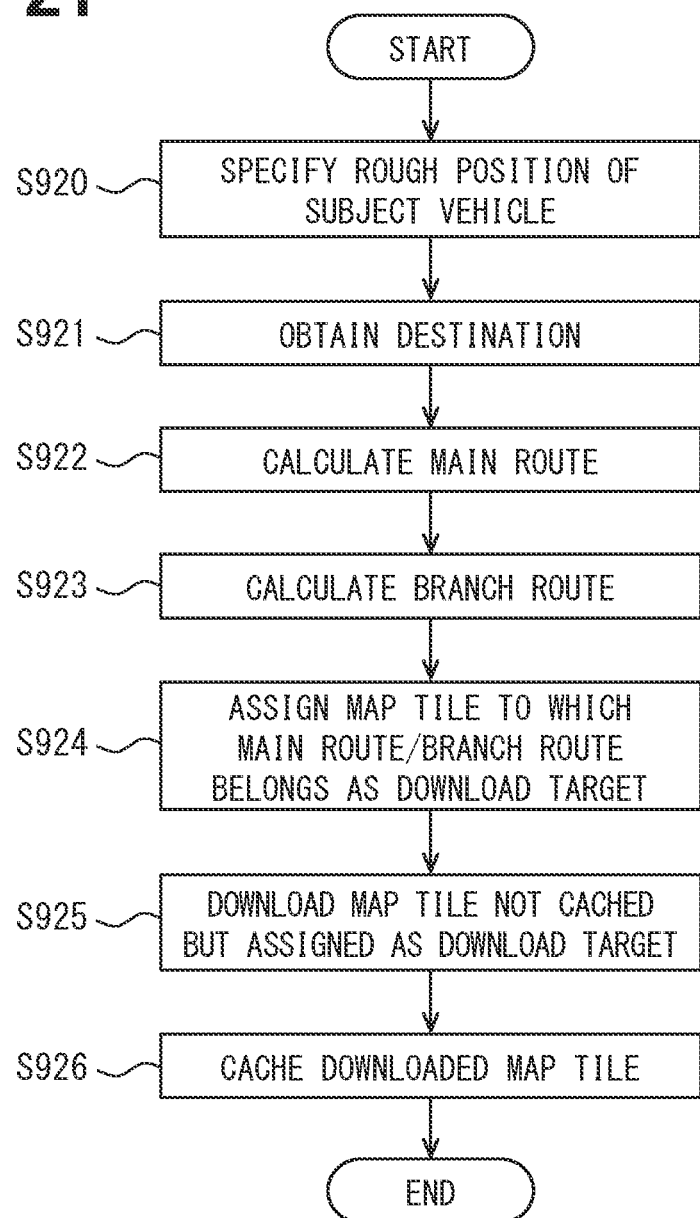
FIG. 21 is a flowchart showing control when a destination is set.
Figure 22:
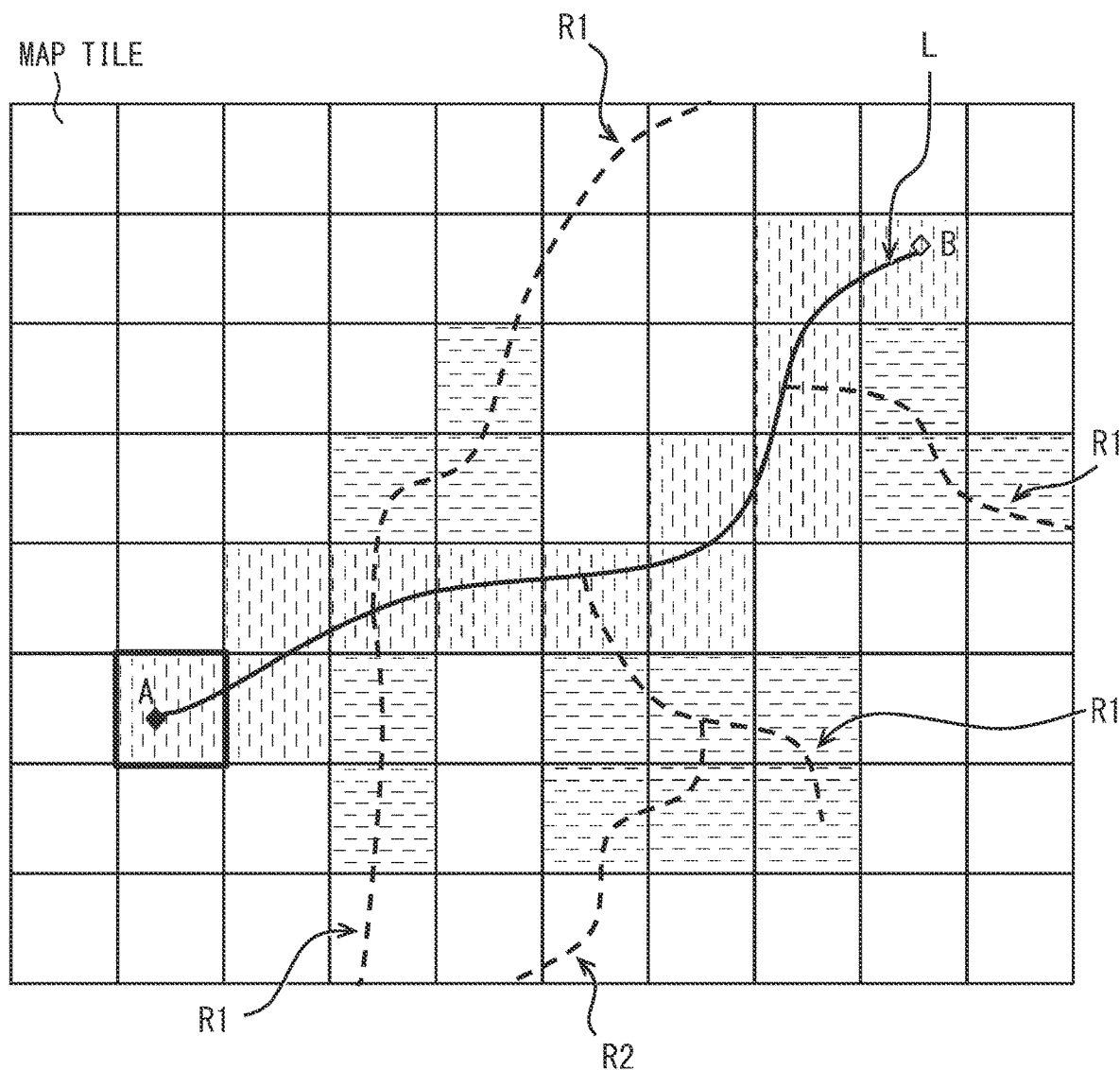
FIG. 22 is a diagram showing an example of a map tile as a download target.

As shown in FIG. 21, first, step S920 is executed. Step S920 is a step in which the main processor 40 identifies a rough position of the own vehicle by GPS or the like. By this step, the area where the own vehicle exists is grasped. In the example shown in FIG. 22, the position of the own vehicle is indicated by a point A (i.e., a black-painted rhombus).

Next, step S921 is executed. Step S921 is a step of acquiring the global coordinates of the set destination. The destination can be set by an active instruction of the driver who is a user, an automatic setting from an external instruction system, or other means. Further, in addition to the operation by the car navigation system mounted on the vehicle, the destination may be set by the map system 1 receiving the destination set by the mobile communication device. In the example shown in FIG. 22, the destination is indicated by a point B (i.e., a white diamond).

Next, step S922 is executed. Step S922 is a step of calculating the main route L based on the position of the own vehicle specified in step S920 and the coordinates of the destination acquired in step S921. The main route L is a travel route recommended for the own vehicle to move from the current position to the destination so as to satisfy the specified conditions. In the example shown in FIG. 22, it is shown as a solid line connecting the current position A and the destination B.

Next, step S923 is executed. Step S923 is a step of calculating the branch path R. The branch road R is a route connected to the main route L, and is a route on which the vehicle may leave the main route L and travel. The branch path R includes a first branch path R1 that directly branches from the main path L, and a second branch path R2 that is not directly connected to the main path L but branches from the first branch path R1.

Next, step S924 is executed. Step S924 is a step of designating the map tile to which the main route L and the branch road R belong as the download target. All map tiles to which the main route L belongs are download targets. On the other hand, for the map tile to which the branch road R belongs, two tiles that are the map tile to which the branch road R belongs and are continuous from the map tile to which the main route L belongs are designated as download targets. Regarding the map tiles related to the branch road R, the number of tiles continuous from the map tile to which the main route L belongs may not be limited, and the number of two tiles may be one example. In the example shown in FIG. 22, the map tile to be downloaded is hatched.

Next, step S925 is executed. Step S925 is a step of downloading a map tile that is designated as a download target and is not cached in the memory 80. When there is a map tile that has been downloaded in the past and stored in the memory 80, the corresponding map tile may not be downloaded.

Next, step S926 is executed. Step S926 is a step of caching the downloaded map tiles in the memory 80. The cached map tile can be used without downloading as long as the corresponding data remains in the memory 80.

By going through the above steps, it is possible to appropriately select the map tiles to be downloaded for the main route from the current position to the destination and the branch road that may travel away from the main route.

It may be preferable to set the download priority for a plurality of map tiles designated as download targets. For example, the closer the map tile is to the map tile to which the vehicle belongs, the higher the download priority is set. As a result, the map tiles are downloaded in the order of arrival of the map tiles, so that the map tiles can be efficiently downloaded without omission while effectively utilizing the communication band.

Further, the map tile to which the main route L belongs may be preferentially downloaded as compared with the map tile to which the branch road R belongs. Since the vehicle has a higher probability of traveling on the main route L than the branch road R, the map tiles can be efficiently downloaded while effectively utilizing the communication band.

Further, when there is an area in which it is known in advance that the communication state between the vehicle and the server 3 deteriorates among the routes where the vehicle is predicted to travel and includes the main route L and the branch road R, the priority may be given to downloading corresponding map tiles. For example, when it is expected to travel in a difficult communication section such as a mountainous area or a tunnel where the communication condition deteriorates, while traveling in an urban area where the communication condition is good, the map tiles corresponding to the mountainous area/tunnel section (that is, the communication difficult section) may be downloaded in advance. The download priority may be set higher in the order of, for example, the map tile corresponding to the current position (that is, the first tile), the map tile adjacent to the first tile and the main route passes through, and the communication difficulty section.

Although some examples of prioritizing the map tiles to be downloaded have been described above, it may not be limited to these examples. Further, the priority may be set by appropriately combining these conditions.

Further, regarding the map tiles specified as the download target, an example of downloading the map tiles corresponding to both the main route L and the branch road R has been described. Alternatively, a system for downloading the map tiles corresponding to only the main route L may be used. Further, it is not necessary to adopt all the routes connected to the main route L as the branch road R. A narrow street connected to the main route may not be adopted as a branch road R. Further, among the roads connected to the main route L, a road having the same rank or higher as the road constituting the main route may be set as the branch road R. A road having the same rank as a certain road means, for example, a road having the same road type (national roads, state roads, narrow streets). For state roads, roads of the same rank or higher refer to national roads and state roads. In the United States, road types may be divided into interstate highways, US highways, state roads, and municipal roads in descending order of road rating. Further, a road having the same number of lanes as the main route or more may be adopted as a road of the same rank or higher. Whether or not to adopt the road connected to the main route as the branch road R may be determined by comparing the road scale of the main route near the connection point (e.g., substantially an intersection) with the scale of the connecting road. The road scale corresponds to the above-mentioned road rating and number of lanes.

Furthermore, in the above, when the destination is set, the configuration for systematically downloading the map tile in which the own vehicle is likely to pass on the road is disclosed. Alternatively, it may not be limited to this feature. Even when the destination is not set, the map tile through which the own vehicle travel path goes may be set as the download target. More specifically, among the map tiles through which the vehicle travel path passes, a predetermined number (for example, 3) of map tiles existing on the vehicle traveling direction side from the current position may be set as download targets. According to such a configuration, even when the destination is not set, the map tile in which the own vehicle is likely to pass on the road may be downloaded in advance as in the case where the destination is set.

The planned map tile download method described above may only be applied to static map data. All the dynamic map data of the map tiles that the vehicle is likely to pass through may be downloaded at once. This is because the amount of dynamic map data may be expected to be smaller than that of static map information. Further, the main processor 40 may be configured to change the timing and rules for downloading the data according to the types such as static information and dynamic information. For example, the dynamic map data may be sequentially downloaded in real time, while the static map data may be configured to be downloaded on a monthly or weekly basis. The various configurations and methods described above may be applied not only when the vehicle is traveling on a motorway such as an expressway, but also when the vehicle is traveling on an ordinary road.

Here, in the above, the case where the rough position of the own vehicle can be specified by using GPS or the like within a predetermined preparation time (for example, 30 seconds) after the power for traveling is turned on has been described. However, in reality, it may not be always possible to specify the position of the own vehicle within a predetermined preparation time after the power for traveling is turned on. When the vehicle is parked in a place where GPS radio waves do not enter, such as an underground parking lot, it may be difficult to specify the position coordinates of the own vehicle. In view of such circumstances, when the vehicle is parked (for example, when the shift position is set to the parking position), it may be preferable that the main processor 40 may store the own vehicle position coordinates specified at that time to the storage unit 82 or the like. According to this configuration, even when the vehicle is parked in a place where GPS radio waves do not reach, the location information recorded in the storage unit 82 can be referred to roughly determine the position of the vehicle at the timing when the driving power is turned on. As a result, the first tile can be specified.

When the automatic driving function that can be executed is restricted due to the condition of the vehicle and the external environment, the user may be notified via the HMI 60, for example, by displaying an icon on the display. For example, when the position of the own vehicle cannot be specified or the map data cannot be acquired, the main processor 40 notifies the occupants that the automatic driving function of level three or higher cannot be executed via the HMI 60. In the above, the case where the map data is configured to be distributed in map tile units has been illustrated. Alternatively, the same feature may be applied to the case where the map data is configured to be distributed in patch units. That is, it can be implemented by replacing the above map tile with a patch or a patch-corresponding area.

[Modifications of the Vehicle Side System Configuration]

Figure 23:
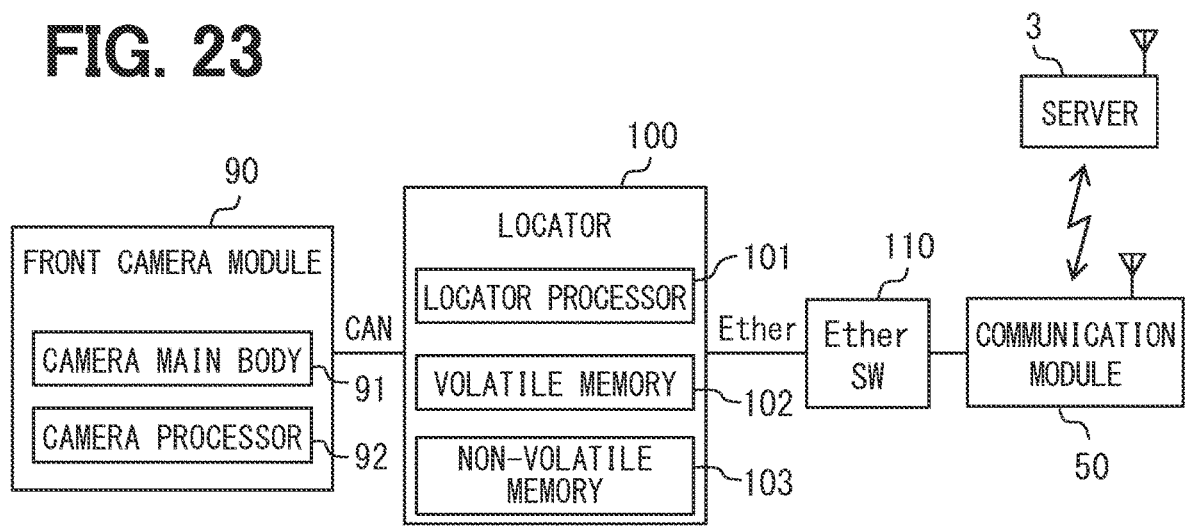
FIG. 23 is a block diagram showing a modified example of the configuration of the in-vehicle system.

The configuration of the in-vehicle system 2 constituting the map system 1 may not be limited to the configuration shown in FIG. 2. For example, as shown in FIG. 23, the in-vehicle system 2 may be realized by using the front camera module 90, the locator 100, the Ethernet switch 110, and the communication module 50. "Ethernet" is a registered trademark. Further, in FIG. 23, the sensor 30 and the HMI 60 are not shown.

The front camera module 90 includes a camera body 91, a camera processor 92, and a memory (not shown). The camera body 91 has a configuration corresponding to the above-mentioned camera 10. The camera processor 92 corresponds to the image processor 20. Further, as a more preferable embodiment, the camera processor 92 is configured to be capable of performing position calculation (that is, localization) using the image recognition result and the map data in a complementary manner. In addition, the camera processor 92 has a function of controlling the vehicle (for example, steering control) by using at least one of the image recognition result and the map data. The front camera module 90 sequentially (for example, every 100 milliseconds) provides the locator 100 with data of feature information and vehicle information (for example, current position, yaw rate, and the like) as a result of image recognition. Data communication between the front camera module 90 and the locator 100 may be realized by CAN (Control Area Network: registered trademark), FlexRay (registered trademark), Ethernet (registered trademark), USB, UART, or the like.

The locator 100 is a device that identifies the current position using the map data provided by the server 3. The locator 100 includes a locator processor 101, a volatile memory 102, and a non-volatile memory 103. The locator 100 has a function as a positioning sensor 30a. The locator processor 101 sequentially acquires the image recognition result and the vehicle information provided from the front camera module 90, and uploads them to the server 3 as probe data. Further, the locator 100 downloads map data according to the position of the own vehicle from the server 3 via the communication module 50 or the like, and stores the map data in the non-volatile memory 103. Such a locator 100 corresponds to an ECU that performs processing related to transmission/reception of map data in one aspect.

The locator 100 sequentially expands the data of the section related to the traveling of the own vehicle among the maps downloaded from the server 3 into the volatile memory 102, and sequentially provides the data to the front camera module 90. The developed map data around the own vehicle is used for localization and steering control by the front camera module 90. The localization and steering control may be configured to be executed by the locator 100 instead of the front camera module 90. The arrangement of the functions provided in each configuration can be changed as appropriate.

The section in which the own vehicle travels refers to a road within a predetermined distance from the current position, for example, in the direction of travel of the own vehicle (basically forward). The predetermined distance here is a parameter that defines the reading range of the map data, and is, for example, 200 meters. The reading range may be 100 meters in front of the own vehicle, 400 meters, 500 meters, or the like. The reading range may be adjusted according to the vehicle speed and the type of travel path. For example, the faster the vehicle speed, the longer the read range is set. Further, when the traveling road is an expressway, the reading range may be set longer than when the traveling road is a general road. For convenience, local map data including detailed road shape information (curvature, gradient, width, and the like) within a predetermined distance ahead of the own vehicle is referred to as forward map data. The forward map data corresponds to the map data around the current position.

The locator 100 is connected to the communication module 50 via, for example, an Ethernet switch 110. Further, the locator 100 is connected to the automatic operation ECU, the body ECU, the operation support device, and the like so as to be able to communicate with each other via the Ethernet switch 110 or directly. In the configuration shown in FIG. 23, the locator 100 controls the transmission and reception of map data overall. Further, according to the configuration shown in FIG. 23, the processing that the main processor 40 is in charge of is shared by the image processor 20 and the locator processor 101. Therefore, the load on each processor can be reduced.

The image frame captured by the front camera module 90 may be configured to be output to the multimedia ECU as a continuous video signal. The video signal may be transmitted in a predetermined format such as LVDS (Low voltage differential signaling). Further, the Ethernet switch 110 existing between the locator 100 and the communication module 50 may be an arbitrary element. The locator 100 and the communication module 50 may be directly connected by a USB cable or the like. In addition, the locator 100 may be provided by using a navigation ECU or a multimedia ECU. The navigation ECU is an ECU that executes map display and route guidance processing for occupants. The multimedia ECU is an ECU that provides functions such as audio, video reproduction, and web browsing. According to the configuration in which the map data transmission/reception and management functions are added to the existing ECU, the system introduction cost can be reduced.

Figure 24:
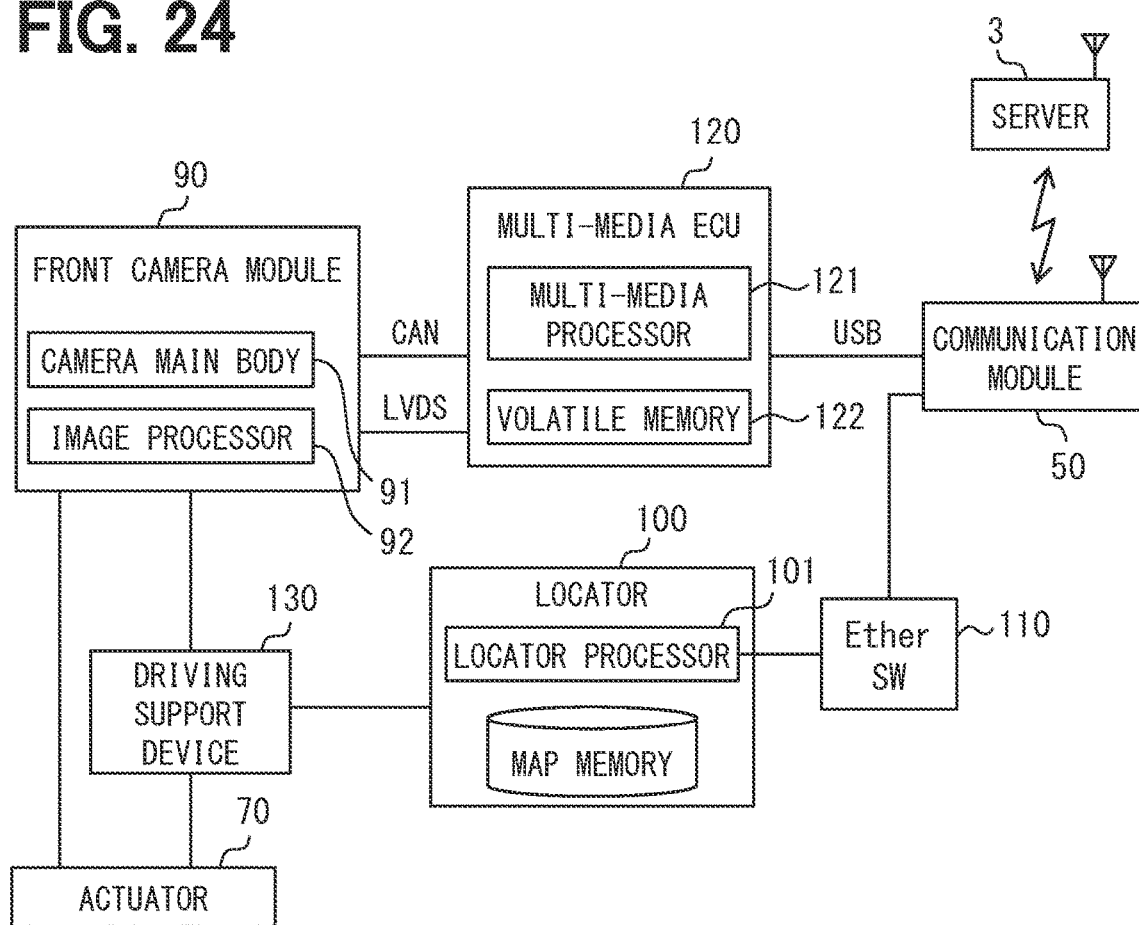
FIG. 24 is a block diagram showing a modified example of the configuration of the in-vehicle system.

Further, in the in-vehicle system 2, the system for downloading map data from the server 3 and the system for uploading probe data to the server 3 may be separated. For example, in the example shown in FIG. 24, the multimedia ECU 120 acquires the image recognition result and the vehicle information from the front camera module 90, packages them as probe data, and uploads them to the server 3 via the communication module 50. That is, the multimedia ECU 120 controls the upload of the probe data to the server 3. Further, in the configuration shown in FIG. 24, the locator 100 downloads the map data from the server 3 via the communication module 50, and sequentially provides the front map data to the front camera module 90 via the driving support device 130. That is, the locator 100 controls the map download. The driving support device 130 sequentially provides the front map data provided by the locator 100 to the front camera module 90. Further, when it becomes difficult to continue the automatic driving control by the front camera module 90, the driving support device 130 automatically travels the vehicle for a predetermined time/a predetermined distance by using the front map data instead of the front camera module 90. According to the above configuration, robustness against system abnormality can be enhanced.

[Addition]

The disclosure in this specification and drawings etc. is not limited to the exemplified embodiment. The disclosure encompasses the exemplified embodiments and modifications by those skilled in the art based thereon. For example, the present disclosure is not limited to the combinations of components and/or elements shown in the embodiments. The present disclosure may be implemented in various combinations. The present disclosure may have additional portions that may be added to the embodiments. The present disclosure encompasses omission of components and/or elements of the embodiments. The present disclosure encompasses the replacement or combination of components and/or elements between one embodiment and another. The disclosed technical scope is not limited to the description of the embodiment. Several technical scopes disclosed are indicated by descriptions in the claims and should be understood to include all modifications within the meaning and scope equivalent to the descriptions in the claims.

The control and the method therefor which have been described in the present disclosure may be implemented by a special purpose computer programmed to execute one or more functions executed by computer programs. Also, the device and the method therefor which have been described in the present disclosure may be also realized by a special purpose hardware logic circuit. Alternatively, the device and the method described in the present disclosure may be implemented by one or more special purpose computers configured by a combination of a processor executing a computer program and one or more hardware logic circuits. The computer programs may be stored, as instructions to be executed by a computer, in a tangible non-transitory computer-readable storage medium.

The control unit here refers to various processors such as the main processor 40, the image processor 20, the server processor 31, the camera processor 92, the locator processor 101, and the multimedia processor 121. Software stored in a tangible memory and a computer executing the software, only the software, only hardware, or combination of them may be possible to provide a method and/or function provided by the above described various processors. A part or all of the functions included in the communication microcomputer 123 may be realized as hardware. A configuration in which a certain function is implemented as hardware includes a configuration in which the function is implemented by using one or more ICs or the like. As the processor, various processors such as a CPU, an MPU (Micro Processor Unit), a GPU (Graphics Processing Unit), and a data flow processor (DFP: Data Flow Processor) can be adopted. Further, one device (for example, the front camera module 90) may be realized by combining a plurality of types of processors such as a CPU, MPU, GPU, and DFP. Further, for example, some of the functions to be provided by the main processor 40 may be realized by using an FPGA (Field-Programmable Gate Array), an ASIC (Application Specific Integrated Circuit), or the like.

DESCRIPTION OF REFERENCE NUMERALS

1 indicates Map system, 2 indicates In-vehicle system (vehicle side device, vehicle control device), 3 indicates Server, 31 indicates Server processor, 10 indicates Imaging device (camera, peripheral monitoring sensor), 20 indicates Image processor, 30 indicates Status acquisition unit (Sensor), 40 indicates Main processor, 50 indicates Communication module, 60 indicates HMI, 62 indicates a road segment, 70 indicates Actuator, 80 indicates Memory, 90 indicates Front camera module, 100 indicates Locator, 110 Ethernet switch, 120 indicates Multimedia ECU, and 130 indicates Driving support device.

The controllers and methods described in the present disclosure may be implemented by a special purpose computer created by configuring a memory and a processor programmed to execute one or more particular functions embodied in computer programs. Alternatively, the controllers and methods described in the present disclosure may be implemented by a special purpose computer created by configuring a processor provided by one or more special purpose hardware logic circuits. Alternatively, the controllers and methods described in the present disclosure may be implemented by one or more special purpose computers created by configuring a combination of a memory and a processor programmed to execute one or more particular functions and a processor provided by one or more hardware logic circuits. The computer programs may be stored, as instructions being executed by a computer, in a tangible non-transitory computer-readable medium.

It is noted that a flowchart or the processing of the flowchart in the present application includes sections (also referred to as steps), each of which is represented, for instance, as S100. Further, each section can be divided into several sub-sections while several sections can be combined into a single section. Furthermore, each of thus configured sections can be also referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A vehicle-side device for autonomously driving a vehicle along a road segment using map data that includes at least one of coordinate information of a landmark disposed along the road and coordinate information of a road edge, the vehicle-side device comprising:
at least one processor, wherein:
the map data is distributable from a predetermined server to the vehicle in patch units, which are data sets for different areas;
the processor is configured to:
acquire a position of the vehicle based on a detection result of a positioning sensor mounted on the vehicle;
download the map data in patch units from the server that manages the map data; and
set a patch as a download target including a road which has a possibility that the vehicle passes through and is determined based on a current position of the vehicle, wherein:
the map data is configured to be distributable to the vehicle from a predetermined server in map tile units which respectively provide rectangular areas as the patch and are prepared by dividing a map recording area into a plurality of parts;
the processor is further configured to:
download the map data in the map tile units from the server; and
set a map tile corresponding to an area where the vehicle is disposed as a first tile and the download target when a destination of the vehicle is not set;
the first tile is divided into four sub tiles; and
the processor is further configured to set three sub tiles among the four sub tiles as download targets which are adjacent to a remaining one of the four sub tiles to which the vehicle is disposed.

2. The vehicle-side device according to claim 1, wherein:
the processor is further configured to:
acquire a traveling direction of the vehicle from a sensor mounted on the vehicle;
specify a travelling path on which the current position of the vehicle is disposed; and
set the patch as the download target that corresponds to the traveling path and is disposed on a traveling direction side of the vehicle.

3. The vehicle-side device according to claim 1, wherein:
when the vehicle moves to a second tile different from the first tile, the processor is further configured to set a plurality of the map tiles disposed around the second tile as download targets.

4. The vehicle-side device according to claim 1, wherein:
the processor is configured to download an unacquired map tile among the map tiles set as the download targets.

5. The vehicle-side device according to claim 1, wherein:
the processor is further configured to:
store a parked position in a non-volatile memory when the vehicle is parked; and
set the first tile by estimating the parked position stored in the non-volatile memory as the current position until the positioning sensor specifies the current position from when a travelling power source of the vehicle turns on.

6. The vehicle-side device according to claim 1, wherein:
the processor is further configured to:
acquire a traveling direction of the vehicle from a sensor mounted on the vehicle;
specify a travelling path on which the current position of the vehicle is disposed; and
set the map tile, which is disposed on a traveling direction side of the vehicle and corresponds to the travelling path, as the download target under a condition that the destination of the vehicle is not set.

7. The vehicle-side device according to claim 1, wherein:
in a case where the destination of the vehicle is set, the processor is configured to calculate a main route from the position of the vehicle to the destination and a branch route connecting to the main route at a time when the destination is set; and
the processor is configured to set the patch which includes the main route and the branch route as the download target.

8. The vehicle-side device according to claim 7, wherein:
the processor downloads a patch closer to the patch in which the vehicle is disposed preferentially among patches as download targets which include the main route and the branch route.

9. The vehicle-side device according to claim 7, wherein:
the processor downloads a patch which includes the main route preferentially among patches which include the main route and the branch route.

10. The vehicle-side device according to claim 7, wherein:
the processor preferentially downloads a patch, which includes a predetermined communication difficult section in which a communication state between the vehicle and the server is estimated to be deteriorated in advance, among routes which include the main route and the branch route and through which the vehicle is estimated to travel.

11. The vehicle-side device according to claim 7, wherein:
the processor selects a connection road having a road scale equal to or larger than the main route as the branch route among roads connected to the main route, the road scale corresponding to a road rating and a number of lanes.

12. The vehicle-side device according to claim 1, wherein:
the processor is further configured to:
acquire a peripheral object data, representing the landmark disposed in a vicinity of the vehicle, from a peripheral monitoring sensor mounted on the vehicle;
analyze the peripheral object data to calculate the position of the landmark detected by the peripheral monitoring sensor; and determine the position of the vehicle based on the position of the landmark calculated from the peripheral object data and a downloaded map data.

13. The vehicle-side device according to claim 12, wherein:
the processor is further configured to:
cache the map data downloaded from the server in a memory; and
determine the position of the vehicle based on a cached map data without downloading the map data when the cached map data is the download target.

14. The vehicle-side device according to claim 13, wherein:
the map data includes static map information and dynamic map information; and
the processor is configured to: store downloaded static map information in a non-volatile memory for a predetermined period of time without storing the dynamic map information in the non-volatile memory.

15. The vehicle-side device according to claim 1 wherein:
when there is an application related to a traveling control of the vehicle and having a restricted function in a case where the map data corresponding to the current position of the vehicle cannot be acquired, the processor executes a process for notifying an occupant of the application.

16. A method for autonomously driving a vehicle along a road segment using map data including coordinate information of a landmark disposed along a road, and executed by at least one processor, wherein:
the map data is distributable from a predetermined server to the vehicle in patch units, which are data sets for different areas, the method comprising:
acquire a position of the vehicle based on a detection result of a positioning sensor mounted on the vehicle; and
set a patch as a download target including a road which has a possibility that the vehicle passes through and is determined based on a current position of the vehicle, wherein
the map data is configured to be distributable to the vehicle from a predetermined server in map tile units which respectively provide rectangular areas as the patch and are prepared by dividing a map recording area into a plurality of parts,
the method further comprising:
downloading the map data in the map tile units from the server;
setting a map tile corresponding to an area where the vehicle is disposed as a first tile and the download target when a destination of the vehicle is not set, the first tile being divided into four sub tiles; and
setting three sub tiles among the four sub tiles as download targets which are adjacent to a remaining one of the four sub tiles to which the vehicle is disposed.

17. A non-transitory computer-readable storage medium which stores program instructions for autonomously driving a vehicle along a road segment using map data including coordinate information of a landmark disposed along a road,
the program instructions configured to cause one or more processors to:
acquire a position of the vehicle based on a detection result of a positioning sensor mounted on the vehicle; and
set a map data of an area, including a road with a possibility that the vehicle passes through the road and is determined based on the current position of the vehicle, as a download target wherein
the map data is configured to be distributable to the vehicle from a predetermined server in map tile units which respectively provide rectangular areas as the map data of the area and are prepared by dividing a map recording area into a plurality of parts,
the program instructions configured to further cause the one or more processors to:
download the map data in the map tile units from the server;
set a map tile corresponding to an area where the vehicle is disposed as a first tile and the download target when a destination of the vehicle is not set, the first tile being divided into four sub tiles; and
set three sub tiles among the four sub tiles as download targets which are adjacent to a remaining one of the four sub tiles to which the vehicle is disposed.

* * * * *